US010836093B2

(12) United States Patent
Sueoka et al.

(10) Patent No.: US 10,836,093 B2
(45) Date of Patent: Nov. 17, 2020

(54) FOAMED STRUCTURE AND RESIN PANEL

(71) Applicant: Kyoraku Co., Ltd., Kyoto (JP)

(72) Inventors: Masaaki Sueoka, Tokyo (JP); Tatsuya Fukuda, Kanagawa (JP); Tadatoshi Tanji, Kanagawa (JP); Kenji Iwasaki, Aichi (JP); Ryosuke Oki, Aichi (JP)

(73) Assignee: Kyoraku Co., Ltd., Kyoto (JP)

(*) Notice: Subject to any disclaimer, the term of this patent is extended or adjusted under 35 U.S.C. 154(b) by 282 days.

(21) Appl. No.: 16/076,367

(22) PCT Filed: Feb. 15, 2017

(86) PCT No.: PCT/JP2017/005414
§ 371 (c)(1),
(2) Date: Aug. 8, 2018

(87) PCT Pub. No.: WO2017/141936
PCT Pub. Date: Aug. 24, 2017

(65) Prior Publication Data
US 2019/0039279 A1 Feb. 7, 2019

(30) Foreign Application Priority Data

Feb. 15, 2016 (JP) .................................. 2016-025826
Feb. 25, 2016 (JP) .................................. 2016-034016
Sep. 29, 2016 (JP) .................................. 2016-190646

(51) Int. Cl.
*B29C 51/12* (2006.01)
*B65D 6/34* (2006.01)
(Continued)

(52) U.S. Cl.
CPC .............. *B29C 49/04* (2013.01); *B29C 49/20* (2013.01); *B29C 51/02* (2013.01); *B29C 51/12* (2013.01);
(Continued)

(58) Field of Classification Search
CPC .................................. B29C 51/12; B32B 3/06
See application file for complete search history.

(56) References Cited

U.S. PATENT DOCUMENTS 5,129,628 A 7/1992 Vesper
5,787,665 A 8/1998 Carlin et al.
(Continued)

FOREIGN PATENT DOCUMENTS

JP S58-85007 U 6/1983
JP 10-018485 A 1/1998
(Continued)

OTHER PUBLICATIONS

Translation of WO-2013161287-A1 (Year: 2013).*
(Continued)

*Primary Examiner* — Xiao S Zhao
*Assistant Examiner* — John J Derusso
(74) *Attorney, Agent, or Firm* — Maier & Maier, PLLC

(57) ABSTRACT

A resin panel according to an embodiment includes a core material, a reinforcing material, a skin material covering the core material and the reinforcing material, and a fastened member. A reinforcing material has a first plate provided on a front surface of the core material, a second plate provided on a back surface of the core material, and a connecting plate connecting the first plate and the second plate. The fastened member is attached to the skin material by a fastening member penetrating the skin material and the first plate or the second plate of the reinforcing material.

4 Claims, 45 Drawing Sheets

(51) Int. Cl.
  *B65D 1/46*  (2006.01)
  *B65D 1/48*  (2006.01)
  *B32B 3/06*  (2006.01)
  *B29C 49/04* (2006.01)
  *B29C 49/20* (2006.01)
  *B29C 51/02* (2006.01)
  *B29C 65/00* (2006.01)
  *B29C 65/78* (2006.01)
  *B60R 13/02* (2006.01)
  *B29K 105/04* (2006.01)
  *B29C 51/10* (2006.01)
  *B29C 43/34* (2006.01)
  *B29K 701/12* (2006.01)
  *B29L 31/30* (2006.01)
  *B32B 5/18*  (2006.01)

(52) U.S. Cl.
  CPC ...... *B29C 65/7808* (2013.01); *B29C 66/0062* (2013.01); *B65D 1/46* (2013.01); *B65D 1/48* (2013.01); *B65D 11/26* (2013.01); *B65D 11/28* (2013.01); *B29C 51/105* (2013.01); *B29C 2043/3433* (2013.01); *B29C 2049/044* (2013.01); *B29C 2049/2004* (2013.01); *B29K 2105/04* (2013.01); *B29K 2701/12* (2013.01); *B29L 2031/3005* (2013.01); *B32B 3/06* (2013.01); *B32B 5/18* (2013.01); *B32B 2305/08* (2013.01); *B60R 13/02* (2013.01)

(56) References Cited

U.S. PATENT DOCUMENTS

| | | | |
|---|---|---|---|
| 2010/0104788 | A1 | 4/2010 | Kitano et al. |
| 2013/0089693 | A1 | 4/2013 | Kitano et al. |
| 2014/0205809 | A1 | 7/2014 | Ishii et al. |
| 2015/0306844 | A1 | 10/2015 | Fukuda et al. |
| 2016/0354991 | A1 | 12/2016 | Sueoka |

FOREIGN PATENT DOCUMENTS

| | | | |
|---|---|---|---|
| JP | H10-266455 | A | 10/1998 |
| JP | 2000-062537 | A | 2/2000 |
| JP | 4009707 | B2 | 11/2007 |
| JP | 2010-174577 | A | 8/2010 |
| JP | 2011-088447 | A | 5/2011 |
| JP | 2012-158075 | A | 8/2012 |
| JP | 2013-067148 | A | 4/2013 |
| JP | 2014-037150 | A | 2/2014 |
| JP | 2014-128938 | A | 7/2014 |
| JP | 2015-164763 | A | 9/2015 |
| JP | 2016-187891 | A | 11/2016 |
| WO | 2008-123158 | A1 | 10/2008 |
| WO | WO-2013161287 | A1 * | 10/2013 ........... B60R 13/011 |

OTHER PUBLICATIONS

The extended European Search Report dated Aug. 9, 2019, including the Supplementary European Search Report and the European Search Opinion, in connection with corresponding EP Application No. 17753192.8 (7 pgs.).

Chinese Office Action dated Oct. 28, 2019, in connection with corresponding CN Application No. 201780009936.2 (13 pgs., including machine-generated English-language translation).

Korean Office Action dated Dec. 16, 2019, in connection with corresponding KR Application No. 10-2018-7022418 (16 pgs., including machine-generated English-language translation).

International Search Report dated May 16, 2017 during the prosecution of International Patent Application PCT/JP2017/005414.

* cited by examiner

A-A

WHEN L1<L3

WHEN L1=L3

WHEN L1>L3

WHEN CUTOUT IS PROVIDED

WHEN RECESS IS PROVIDED

ENLARGED VIEW OF CL PORTION

ARROW VIEW A

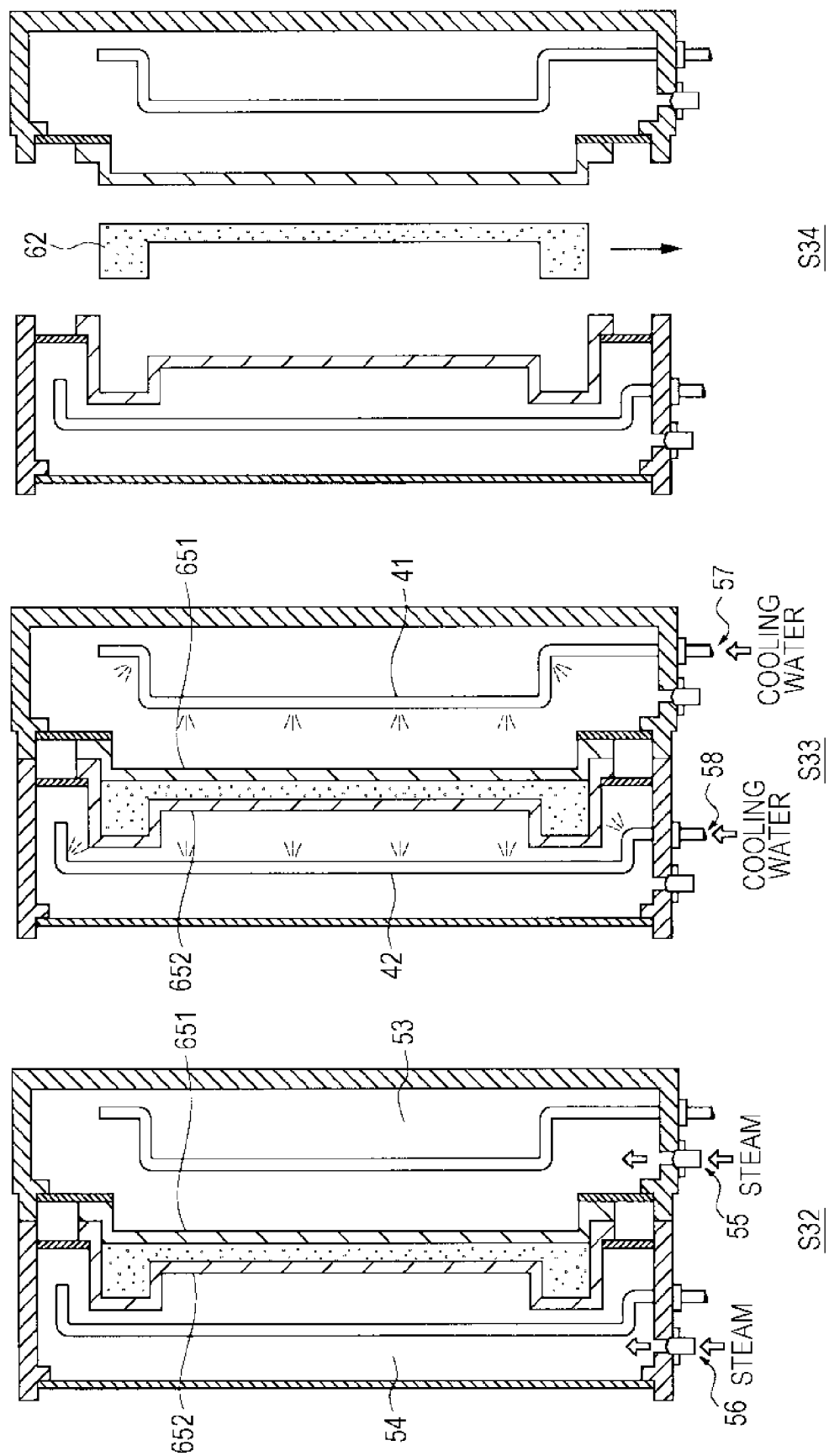

F-F

ENLARGED VIEW OF G1 PORTION

ENLARGED VIEW OF G2 PORTION

C-C

C-C

FOAMED STRUCTURE AND RESIN PANEL

CROSS-REFERENCE TO RELATED APPLICATIONS

This is a U.S. national phase application under 35 U.S.C. § 371 of International Patent Application No. PCT/JP2017/005414, filed Feb. 15, 2017, and claims benefit of priority to Japanese Patent Application No. 2016-025826, filed Feb. 15, 2016, Japanese Patent Application No. 2016-034016, filed Feb. 25, 2016 and Japanese Patent Application No. 2016-190646, filed Sep. 29, 2016. The entire contents of these applications are hereby incorporated by reference.

FIELD OF TECHNOLOGY

The present invention relates to a foamed structure and a resin panel.

BACKGROUND

Conventionally, a resin panel has been widely used for an automobile, a building material, sports and leisure, and the like. The resin panel is a laminate including a foamed structure including one or a plurality of foams made of a foamed resin covered with a skin material sheet. This resin panel is also called a sandwich panel.

Conventionally, a member (fastened member) such as a hinge may be attached to a skin material of the resin panel using a fastening means such as a rivet. For example, a parcel board attached with a hinge part as a fastened member is described in JP-A-2000-062537. The hinge part of this parcel board is a portion which contains two upper and lower sewn nonwoven fabrics and can be bent.

The foamed structure in which a metallic reinforcing material is inserted is known as a conventional resin panel (for example, JP-A-2014-128938 and JP-A-2015-164763). For example, JP-A-2014-128938 describes the foamed structure in which a first core material and a second core material, which are obtained by cutting a foam provided with a linear groove portion at the groove portion, are respectively fitted into a reinforcing material from one side and the other side of the reinforcing material.

SUMMARY

Conventionally, a member (fastened member) such as a hinge is attached to the resin panel using the fastening means such as the rivet. In this case, the fastened member is fastened by utilizing a hole opened in a resin sheet on the front side or the back side. In that case, a thickness of the resin sheet must be increased in order to support a load applied to the fastened member. This has been a factor inhibiting a weight reduction.

Therefore, in one aspect of the present disclosure, it is an object to make the resin panel lighter in weight than the conventional one, and to make it possible to firmly attach the fastened member to the panel.

In the conventional foamed structure, when the core material is constituted by the first core material and the second core material which are divided with the reinforcing material as a boundary, a dimensional error of the core material in the foamed structure may occur. This error is due to an assembling error (a positional deviation) when the first core material and the second core material are assembled to the reinforcing material. When the dimensional error of the core material in the foamed structure is large, an adverse effect such as poor appearance of the resin panel occurs due to the dimensional error of the core material.

Therefore, in another aspect of the present disclosure, it is an object to improve dimensional accuracy of the foam in the foamed structure having the reinforcing material attached to the foam.

Conventionally, when a skin material is molded on a surface of the foamed structure including the reinforcing material interposed between two foams, the reinforcing material may relatively move with respect to the foam in a molding step. Then, defect that the skin material cannot be molded, or poor appearance of the skin material after molding occurs.

From such a viewpoint, in still another aspect of the present disclosure, it is an object to reliably inhibit relative movement of the reinforcing material with respect to the foam in the foamed structure including the reinforcing material interposed between two foams.

SUMMARY

An aspect of the present disclosure is a resin panel including: a core material; a reinforcing material having a first plate provided on a front surface of the core material, a second plate provided on a back surface of the core material, and a connecting plate connecting the first plate and the second plate; a skin material covering the core material and the reinforcing material; and a fastened member which is attached to the skin material by a fastening member penetrating the skin material and the first plate or the second plate of the reinforcing material.

Another aspect of the present disclosure is a foamed structure including: a reinforcing material including a first plate and a second plate which extend linearly while facing each other and a connecting plate which connects the first plate and the second plate; and a foam having a linear accommodating portion for accommodating the reinforcing material, and a first foamed portion and a second foamed portion formed with the accommodating portion interposed therebetween. The accommodating portion has: a connecting portion for connecting the first foamed portion and the second foamed portion; and a projecting portion projecting from at least one foamed portion among the first foamed portion and the second foamed portion toward the other foamed portion, and at least a part of the projecting portion is interposed between the first plate and the second plate of the reinforcing material.

Still another aspect of the present disclosure includes a reinforcing material having a pair of elongated plate-shaped portions facing each other with a predetermined amount of gap interposed therebetween, and a foam. The foam is formed on a front surface or a back surface and includes an accommodating portion in which the reinforcing material is disposed, and a fitting portion projecting from at least one end of both ends of the reinforcing material into the gap of the reinforcing material and fitted with the reinforcing material. A thickness of the fitting portion in a direction in which the pair of plate-shaped portions is facing each other increases from a tip end of a portion of the reinforcing material projecting into the gap toward the one end of the reinforcing material.

According to one aspect of the present disclosure, it is possible to make the resin panel lighter than the conventional one and to firmly attach the fastened member to the panel.

According to another aspect of the present disclosure, it is possible to improve the dimensional accuracy of the foam when the reinforcing material is attached to the foam in the foamed structure.

According to still another aspect of the present disclosure, in a foamed structure in which a reinforcing material is interposed between two foams, it is possible to reliably inhibit relative movement of the reinforcing material with respect to the foam.

BRIEF DESCRIPTION OF THE DRAWINGS

FIG. 25B is a view for explaining the step of molding the foam of the third embodiment.

DETAILED DESCRIPTION (1) First Embodiment

A resin board which is a first embodiment of a resin panel of the present invention will be described below.

Figure 1:
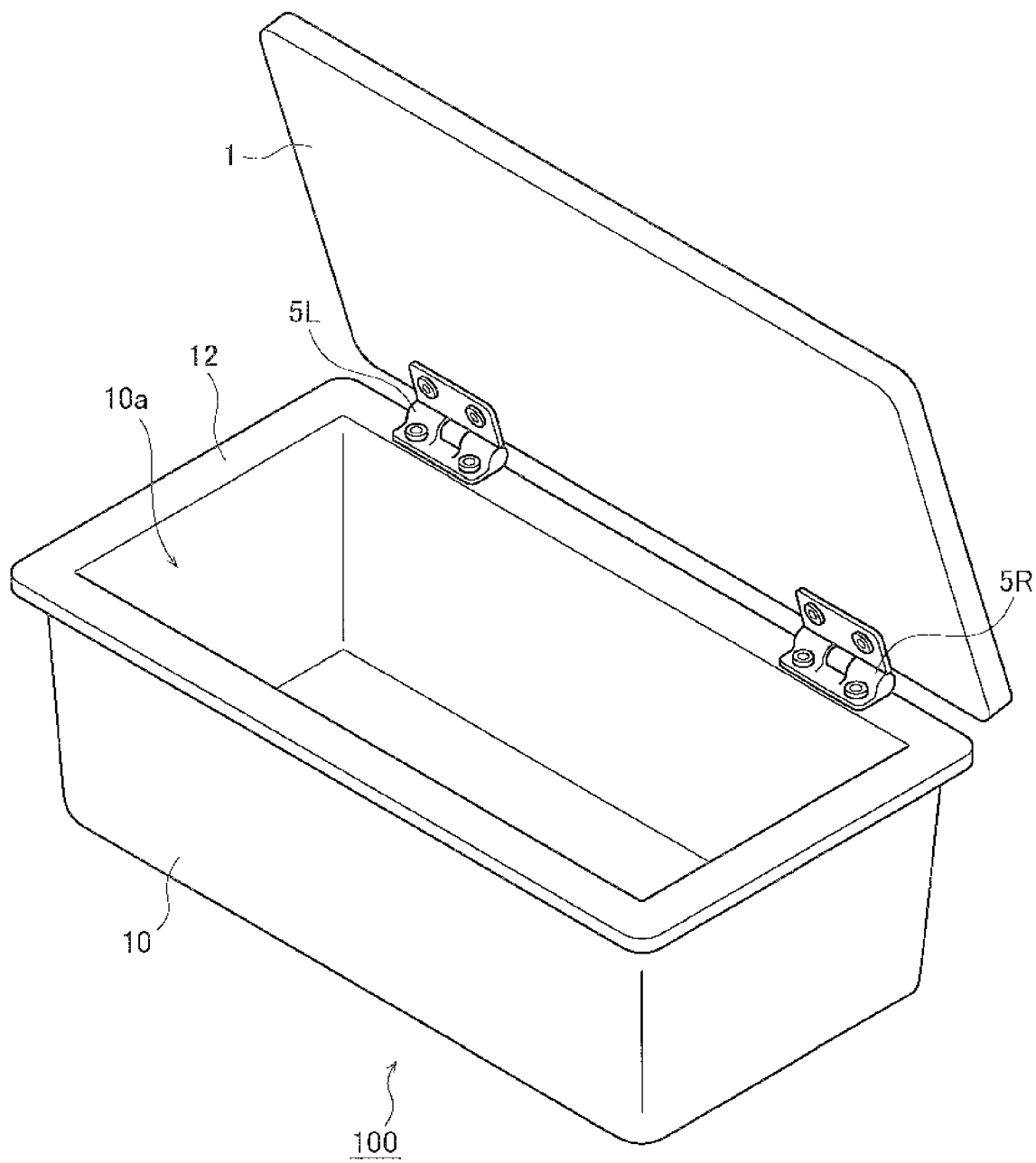
FIG. 1 is a perspective view of a resin container of a first embodiment.

FIG. 1 is a perspective view of a resin container 100 including a resin board 1 of the first embodiment. As shown in FIG. 1, the resin container 100 includes a container body 10 and the resin board 1 serving as a lid of the container body 10. The resin board 1 has hinge members 5L and 5R. The resin board 1 and the container body 10 are connected by the hinge members 5L and 5R so that a storage space 10a of the container body 10 can be opened and closed by the resin board 1. That is, the resin board 1 is rotatable around the hinge members 5L and 5R with respect to the container body 10. The hinge members 5L and 5R are connected to a hinge attaching surface 12 of the container body 10 by rivets. The hinge members 5L and 5R of the present embodiment are examples of members to be fastened.

(1-1) Structure of Resin Board

Next, a structure of the resin board 1 of the present embodiment will be described with reference to FIGS. 2 to 5.

Figure 2:
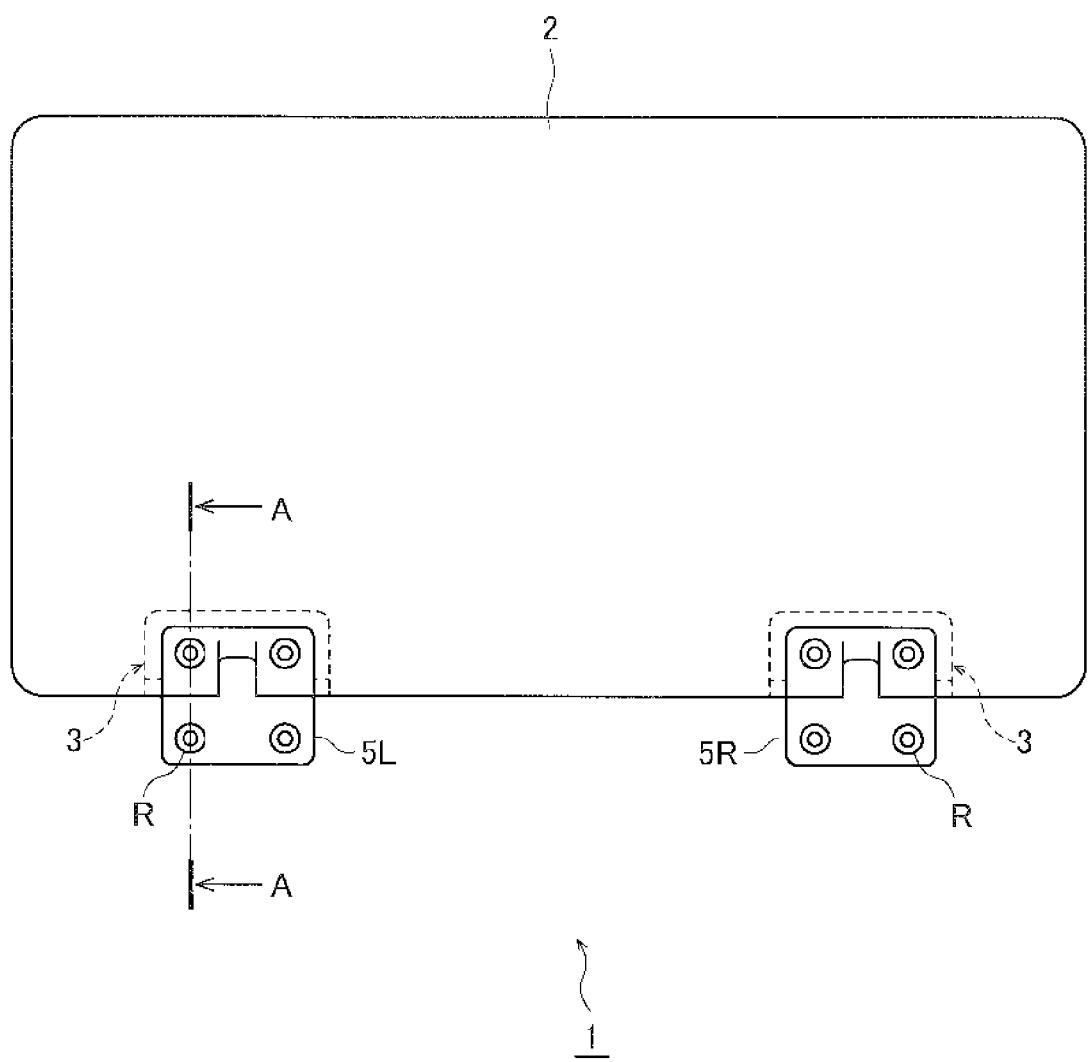
FIG. 2 is a plan view of a resin board of the first embodiment.

FIG. 2 is a plan view of the resin board 1 of the first embodiment.

Figure 3:
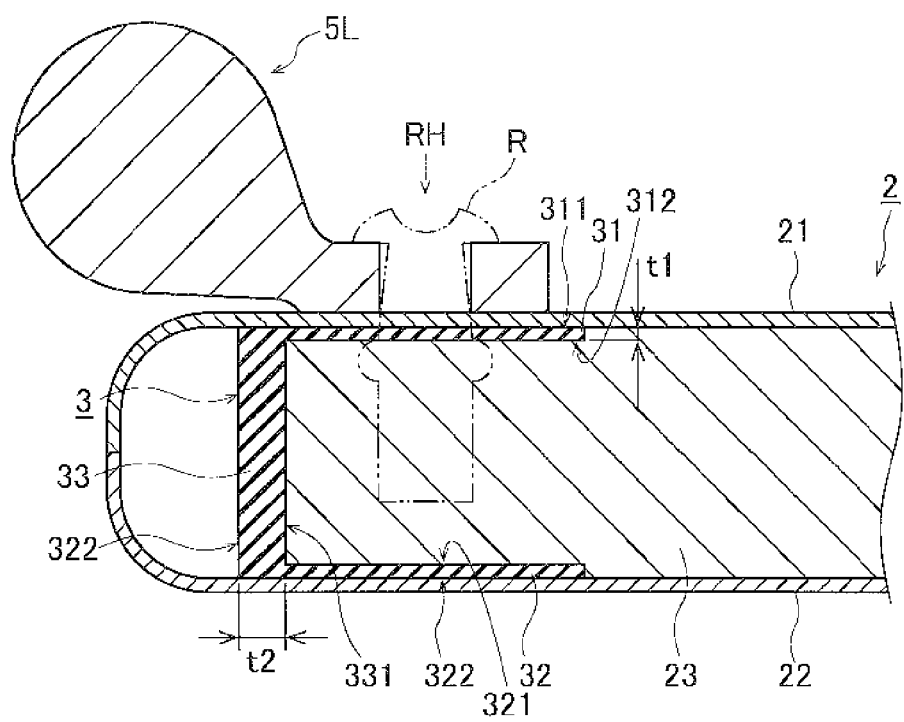
FIG. 3 is an enlarged cross-sectional view taken along a line A-A of FIG. 2.

FIG. 3 is an enlarged cross-sectional view taken along a line A-A of FIG. 2.

Figure 4:
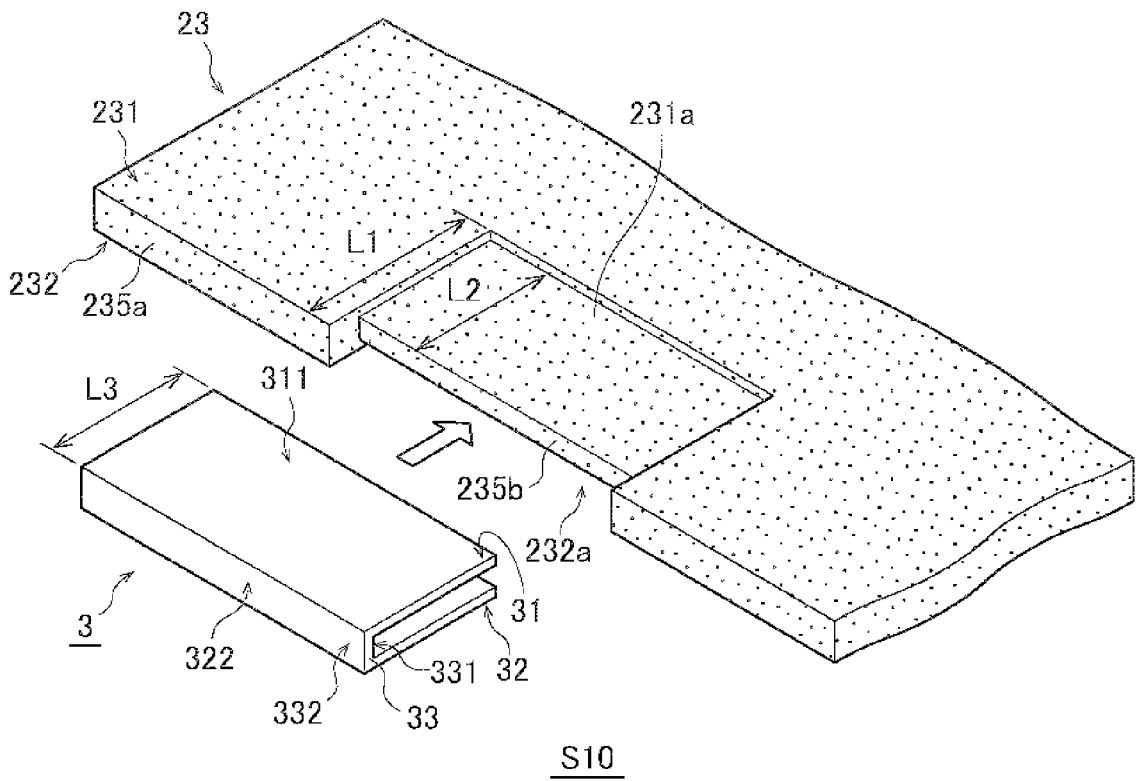
FIG. 4 is a view for explaining an example of attaching a reinforcing material to a core material in the resin board of the first embodiment.
Figure 4:
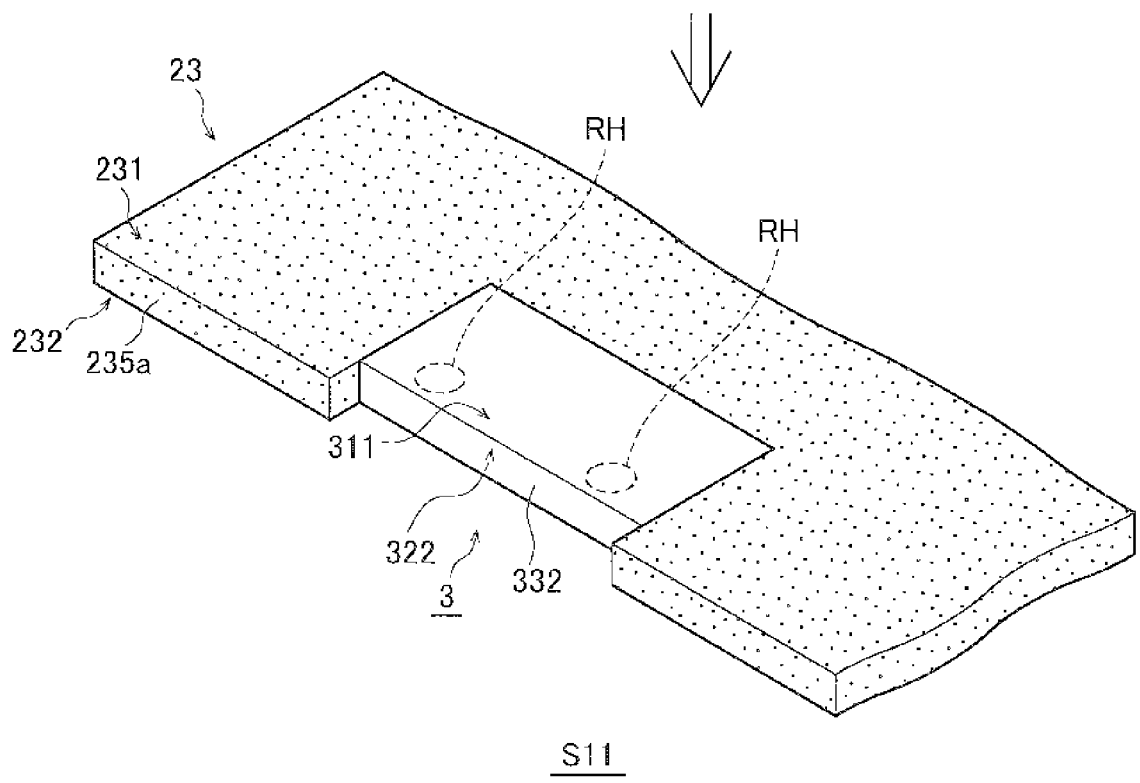

FIG. 4 is a view for explaining an example of attaching a reinforcing material 3 to a core material 23 in the resin board 1 of the first embodiment.

Figure 5:
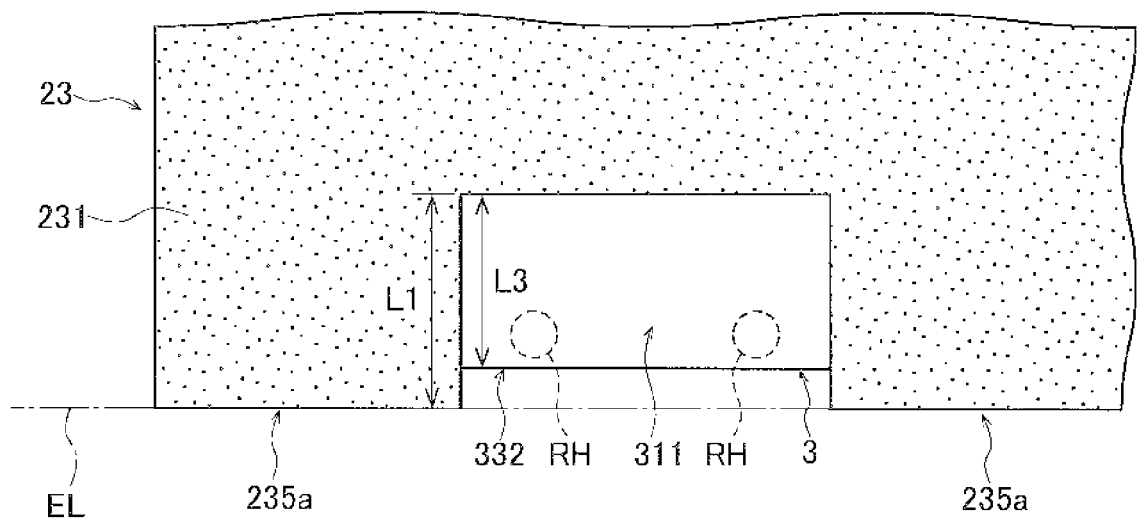
FIG. 5 is a plan view showing a part of the resin board of the embodiment to which the reinforcing material is attached.

FIG. 5 is a plan view showing a part of the resin board 1 of the embodiment to which the reinforcing material 3 is attached.

As shown in FIG. 1 and FIG. 2, the resin board 1 has a substantially rectangular parallelepiped shape and has a resin laminate 2 and the hinge members 5L and 5R (hereinafter, individually or collectively also referred to as "hinge member 5"). As will be described below, the reinforcing material 3 is incorporated in the resin laminate 2. The hinge members 5L and 5R are fastened together with the reinforcing material 3 in the vicinity of an outer edge of the resin laminate 2 by rivets R (at four places for each hinge member in an example shown in FIG. 2).

Referring to FIG. 3, the resin laminate 2 has a sandwich structure including the core material 23 sandwiched by a first resin sheet 21 and a second resin sheet 22 which are resin sheets of a thermoplastic resin respectively constituting a front surface and a back surface thereof. The first resin sheet 21 and the second resin sheet 22 cover the core material 23 and the reinforcing material 3 and constitute the skin material of the resin board 1.

Resin materials of the first resin sheet 21 and the second resin sheet 22 are not limited. The resin material may be a foamed resin or a non-foamed resin. However, in order to ensure stiffness of the resin board 1, these resin sheets are preferably formed of the non-foamed resin. For example, in consideration of moldability, in skin material sheets SA and SB, polystyrene (PS) and styrene ethylene butylene styrene block copolymer resin (SEBS) may be mixed in polypropylene (PP) as a main material.

A volume ratio of the core material 23 to the resin board 1 is large. Therefore, the core material 23 is preferably made of the foamed resin foamed by using a foaming agent for weight reduction. For example, the resin material of the core material 23 includes a material containing the foaming agent added to any one of polyolefin such as polypropylene or polyethylene and an acrylic derivative such as polyamide, polystyrene, or polyvinyl chloride, or a mixture of two or more thereof. The core material 23 is molded, for example, by a bead method in-mold foam molding method.

As the foaming agent, any of a physical foaming agent, a chemical foaming agent, and a mixture thereof may be used. As the physical foaming agent, an inorganic physical foaming agent such as air, carbonic acid gas, nitrogen gas, water, or the like, and an organic physical foaming agent such as butane, pentane, hexane, dichloromethane, or dichloroethane, and further a supercritical fluid thereof can be used.

An expansion ratio of the core material 23 is in a range of 1.5 to 15 times. A typical expansion ratio is 4 times. The expansion ratio is preferably 2.5 to 10 times. Note that the expansion ratio is a value obtained by dividing a density of a mixed resin before foaming by an apparent density of the foamed resin after foaming.

The first resin sheet 21, the second resin sheet 22, and the core material 23 may be molded using the resin material mixed with a glass filler in order to increase stiffness and strength.

For example, the glass filler includes glass fiber cloth such as glass fiber, glass cloth or glass nonwoven fabric, glass bead, glass flake, glass powder, milled glass and the like. Examples of glass types include E glass, C glass, A glass, S glass, D glass, NE glass, T glass, quartz, low dielectric constant glass, and high dielectric constant glass.

Not limited to the glass filler, inorganic fillers such as talc, calcium carbonate, Wollastonite, magnesium-based material, carbon fiber, or the like may be mixed in order to increase the stiffness.

As shown in FIG. 3, in the resin board 1 of the present embodiment, the reinforcing material 3 is attached to the core material 23. The reinforcing material 3 includes a first plate 31 provided on the front surface of the core material 23, a second plate 32 provided on the back surface of the core material 23, and a connecting plate 33 connecting the first plate 31 and the second plate 32. The reinforcing material 3 has a U-shaped cross-section. The first plate 31 of the reinforcing material 3 has a front side plate surface 311 in contact with the first resin sheet 21 and a back side plate surface 312 in contact with the core material 23. The second plate 32 of the reinforcing material 3 has a front side plate surface 321 in contact with the core material 23 and a back side plate surface 322 in contact with the second resin sheet 22. The connecting plate 33 has an inner plate surface 331 in contact with a side wall surface of the core material 23 and an outer plate surface 332 forming an end surface of the reinforcing material 3.

A material of the reinforcing material 3 is not particularly limited. However, the material of the reinforcing material 3 is preferably made of a metal such as aluminum or a hard plastic in order to ensure strength of the resin board 1. The reinforcing material 3 is molded by, for example, extrusion molding.

As shown in FIG. 3, attaching openings RH (openings through which the rivets R pass) are provided in the hinge members 5L and 5R. The rivet R (an example of a fastening member) is fastened to the resin laminate 2 through the opening RH. That is, in the resin board 1 of the present embodiment, the hinge members 5L and 5R are attached to a front side of the resin board 1 by the rivet R penetrating the first resin sheet 21 which is the skin material and the first plate 31 of the reinforcing material 3. When fastening the rivet R, holes are drilled for the rivet R to penetrate the first resin sheet 21 and the reinforcing material 3 at a fastening position on the first resin sheet 21. The rivet R is inserted into the holes.

In the reinforcing material 3, a plate thickness t1 of the first plate 31 which the rivet R penetrates is preferably less than a plate thickness t2 of the connecting plate 33. This is due to the following reasons. Firstly, by reducing the plate thickness t1 of the first plate 31, it is possible to easily perform an operation of drilling the hole for fastening the rivet R, and to reduce the weight. Secondly, the connecting plate 33 is a portion to which a load is greatly applied when the hinge member 5 operates. Therefore, it is preferable to increase the plate thickness t2 of the connecting plate 33 in order to increase strength of the connecting plate 33.

In the resin board 1 of the present embodiment, even when the plate thickness t1 of the first plate 31 and further a thickness of the second plate 32 are made relatively small, it is possible to ensure necessary stiffness and strength. This is due to the following reasons. Firstly, as will be described below, when manufacturing the resin board 1, the core material 23 and the reinforcing material 3 are welded to molten resin to be the first resin sheet 21 and the second resin sheet 22. Therefore, the first resin sheet 21, the core material 23, and the reinforcing material 3 have an integral structure in the reinforcing material 3 and its surroundings. Secondly, as shown in FIG. 3, the reinforcing material 3 has a form of sandwiching the core material 23. Therefore, the resin board 1 is configured to favorably obtain the necessary stiffness and strength in any direction of opening and closing of the hinge member 5.

The necessary stiffness and strength can be ensured by the reinforcing material 3. Therefore, the first resin sheet 21 and the second resin sheet 22 can be thinned.

As shown in FIG. 4, in the resin board 1 of the present embodiment, a recess 231a and a recess 232a are respectively formed on an outer edge of a front surface 231 and an outer edge of a back surface 232 of the core material 23. As shown in order of Steps S10 and S11 in FIG. 4, the reinforcing material 3 is attached to the core material 23 by inserting the reinforcing material 3 having the U-shaped cross-section from the outside into the recess 231a and the recess 232a. In a state where the reinforcing material 3 is attached to the core material 23, the first plate 31 of the reinforcing material 3 is placed in the recess 231a of the core material 23, and the second plate 32 of the reinforcing material 3 is placed in the recess 232a of the core material 23. The inner plate surface 331 of the connecting plate 33 of the reinforcing material 3 is in contact with a side wall surface 235b of the core material 23. In the drawing shown in Step S11, positions (two positions) of the openings RH for fastening the rivets R are indicated by dotted lines.

In the state where the reinforcing material 3 is attached to the core material 23, recessed amounts of the recesses 231a and 232a are preferably set so that the front surface 231 of the core material 23 and the front side plate surface 311 of the first plate 31 of the reinforcing material 3 are flush with each other, and the back surface 232 of the core material 23 and the back side plate surface 322 of the second plate 32 of the reinforcing material 3 are flush with each other. Thus, the front surface and the back surface of the resin board 1 are both flat. Therefore, an appearance of the resin board 1 is not impaired.

As shown in FIG. 4, a depth of the recess 231a with reference to a side wall surface 235a of the core material 23 is defined as L1, a width in an attachment direction of the recess 231a of the reinforcing material 3 is defined as L2, and a width in the attachment direction of the first plate 31 of the reinforcing material 3 is defined as L3. Here, when the reinforcing material 3 is engaged with the recess 231a without any gap, L3=L2+t2 (t2 is the plate thickness of the connecting plate 33 of the reinforcing material 3 as shown in FIG. 3) is satisfied. In this case, the core material is preferably set so that L1>L3 is satisfied. In other words, it is preferable to set the core material 23 so that L1>L2+t2 is satisfied. That is, as shown in FIG. 5, in a state where the reinforcing material 3 is attached to the core material 23, it is preferable that the outer plate surface 332 of the reinforcing material 3 is located inside a reference line EL defined by the side wall surface 235a (that is, the outer edge of the core material 23) of the core material 23 in a plan view.

Note that the reference line EL means an imaginary line defined by the outermost peripheral edge of the core material 23. For example, as shown in FIG. 4, in the core material 23 of the present embodiment, the side wall surface 235b of a portion where the recesses 231a and 232a are formed is located inside the side wall surface 235a of a portion where the recesses 231a and 232a are not formed. The reference line EL is determined by the imaginary line of the side wall surface 235a which is the outermost peripheral edge of the core material 23 as viewed in a plan view.

Figure 6C:
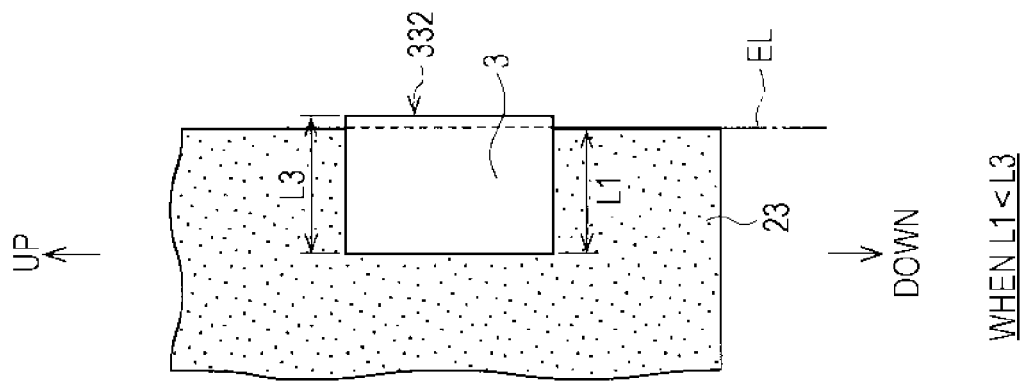
FIGS. 6A to 6C are views each explaining a preferable arrangement example of the reinforcing material with respect to the resin board.
Figure 6B:
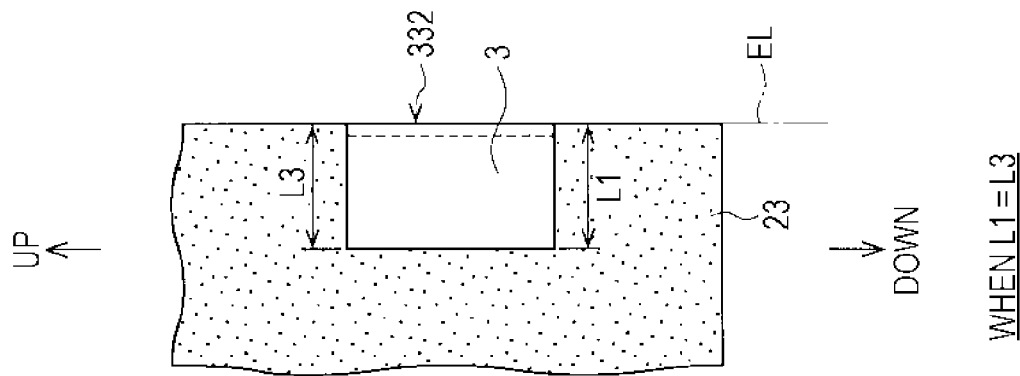
Figure 6A:
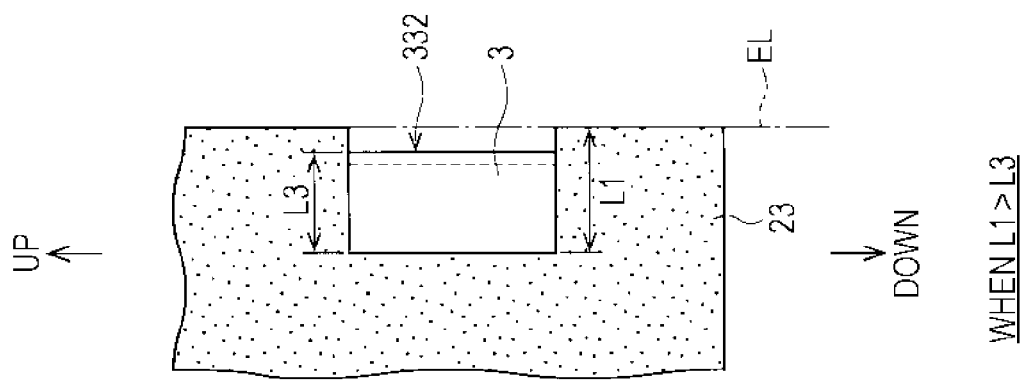

It will be further described that L1>L3 is preferable with reference to FIGS. 6A to 6C.

FIGS. 6A to 6C show three patterns regarding a relationship between the depth L1 of the recess 231a and the width L3 in the attachment direction of the first plate 31 of the reinforcing material 3 with reference to the side wall surface 235a. FIG. 6A is an example of the present embodiment. This is the case of L1>L3 as shown in FIG. 5. FIG. 6B and FIG. 6C are different from the example of the present embodiment. These figures are reference examples respectively showing a case of L1=L3 and a case of L1<L3.

As will be described below, the core material 23 to which the reinforcing material 3 is attached is welded to a molten resin sheet when clamping split mold blocks. At this time, as shown in FIG. 6A, in the case where the first plate 31 and the second plate 32 of the reinforcing material 3 are disposed inside the reference line EL defined by the outer edge of the core material 23 when the core material 23 is viewed in a plan view (that is, in the case of L1>L3), when a longitudinal direction of the core material 23 is aligned with the vertical direction for welding with the molten resin sheet (that is, when it is arranged DOWN in FIG. 6A is vertically downward), a side wall of the recess 231a of the core material 23 supports the connecting plate 33 of the reinforcing material 3. From this fact, it is difficult for the reinforcing material 3 to fall off from the core material 23. Therefore, it is possible to reduce a possibility that the reinforcing material 3 falls off from the core material 23 and damages the mold.

As shown in FIG. 6A, when L1>L3, the outer plate surface 332 of the reinforcing material 3 is separated inward from the side wall surface 235a of the core material 23. Therefore, at the time of manufacturing the resin board 1 to be described below, even when the core material 23 is slightly displaced from a molten resin sheet P so that the inner plate surface 331 of the reinforcing material 3 slightly approaches a pinch-off part of the split mold block, there is a low possibility that the split mold blocks pinch the reinforcing material 3 when clamping the split mold blocks.

As shown in FIG. 6B, when L1=L3, the side wall of the recess 231a of the core material 23 supports the connecting plate 33 of the reinforcing material 3. This point is the same as in the case of FIG. 6A. However, since the outer plate surface 332 of the reinforcing material 3 is not inside the reference line EL, a holding force of the reinforcing material 3 by the core material 23 is not sufficient as compared with that in the case of FIG. 6A.

As shown in FIG. 6C, when L1<L3, the outer plate surface 332 of the connecting plate 33 of the reinforcing material 3 is outside the reference line EL. Therefore, the connecting plate 33 is not supported by the side wall of the recess 231a of the core material 23, and the holding force of the reinforcing material 3 by the core material 23 is small.

Therefore, there is a possibility that the reinforcing material 3 falls off from the core material 23 and damages the mold.

As shown in FIGS. 6B and 6C, when L1<L3 (in particular when L1<L3), the core material 23 is displaced from the molten resin sheet P at the time of manufacturing the resin board 1 to be described below, so that the inner plate surface 331 of the reinforcing material 3 approaches the pinch-off part of the split mold block. As a result, there is a possibility that the split mold blocks pinch the reinforcing material 3 when clamping the split mold blocks.

From the above, it is understood that it is preferable to set L1>L3.

(1-2) Method of Manufacturing Resin Board

Next, a method of manufacturing the resin board 1 of the present embodiment will be described with reference to FIGS. 7 to 11. FIGS. 7 to 11 are views for respectively explaining the method of manufacturing the resin board of the first embodiment in order.

Figure 7:
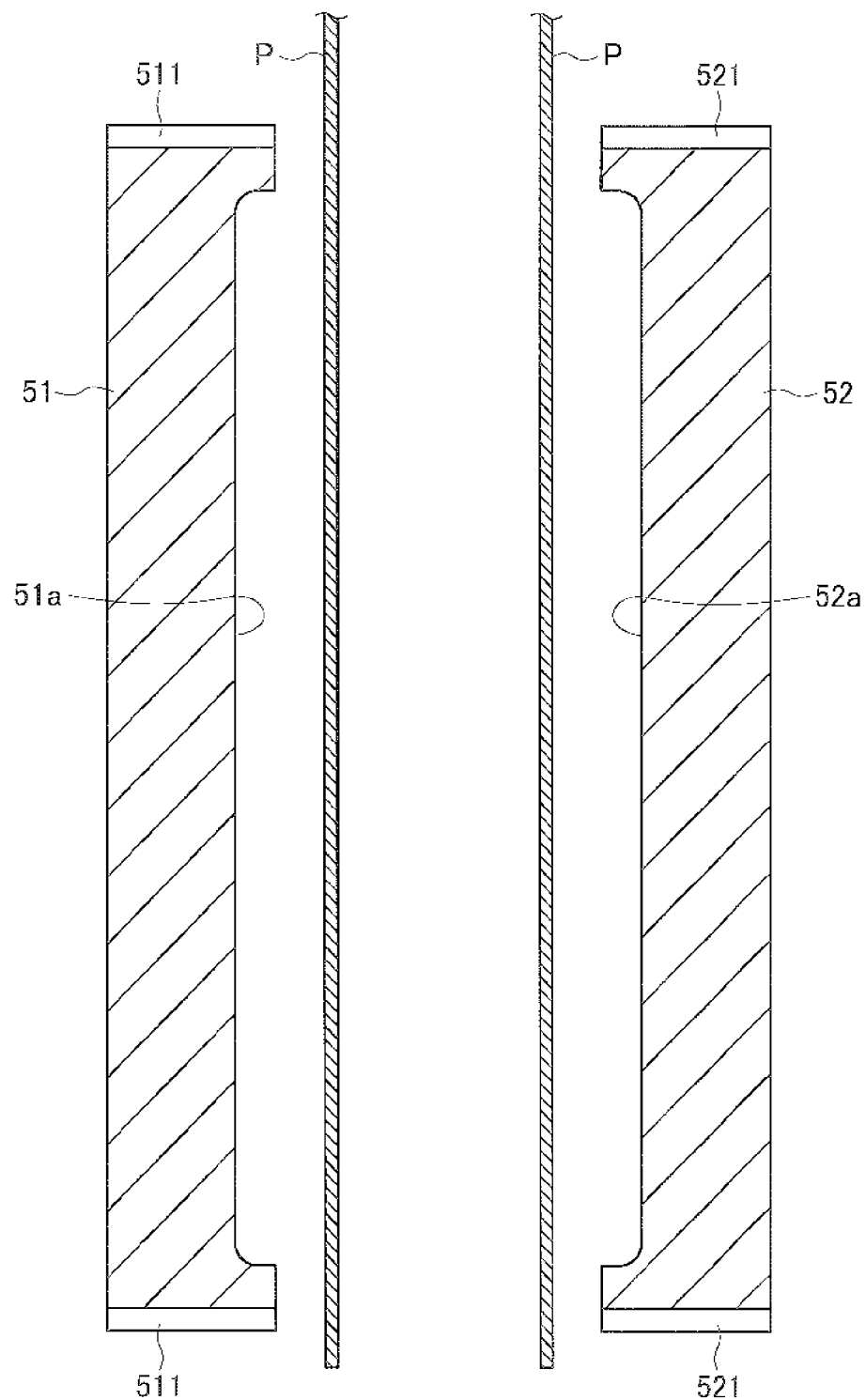
FIG. 7 is a view showing a method of manufacturing the resin board of the first embodiment.

First, as shown in FIG. 7, the molten resin sheets P and P are extruded vertically downward from an extruding machine (not shown) and supplied between forming surfaces 51a and 52a of a pair of split mold blocks 51 and 52. At this point, the pair of split mold blocks 51 and 52 is in an open position.

Each of the split mold blocks 51 and 52 is provided with a vacuum device (not shown) for sucking air in an enclosed space. The vacuum device includes a vacuum chamber and a communication path for communicating the vacuum chamber and the forming surface.

Figure 8:
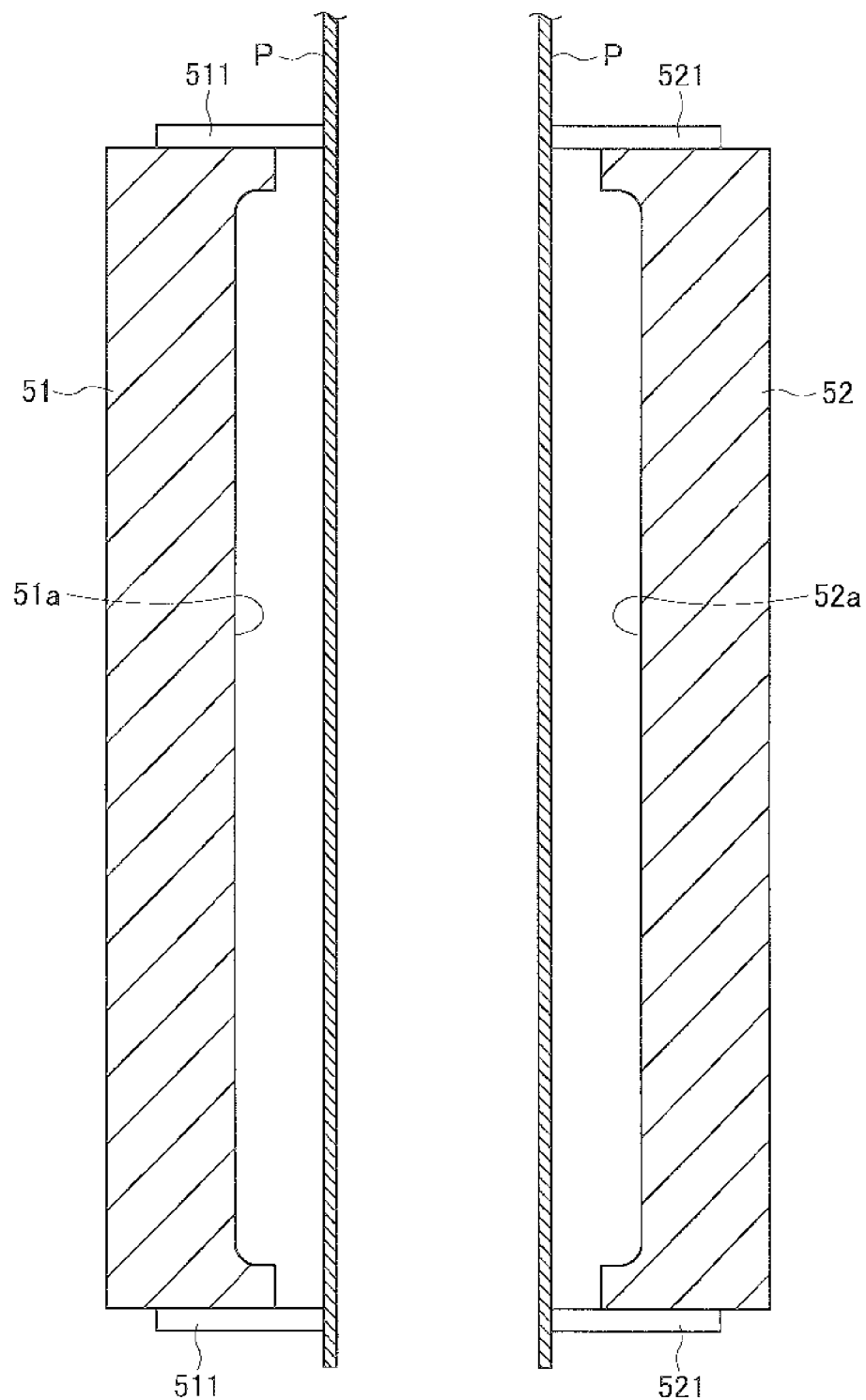
FIG. 8 is a view showing the method of manufacturing the resin board of the first embodiment.
Figure 9:
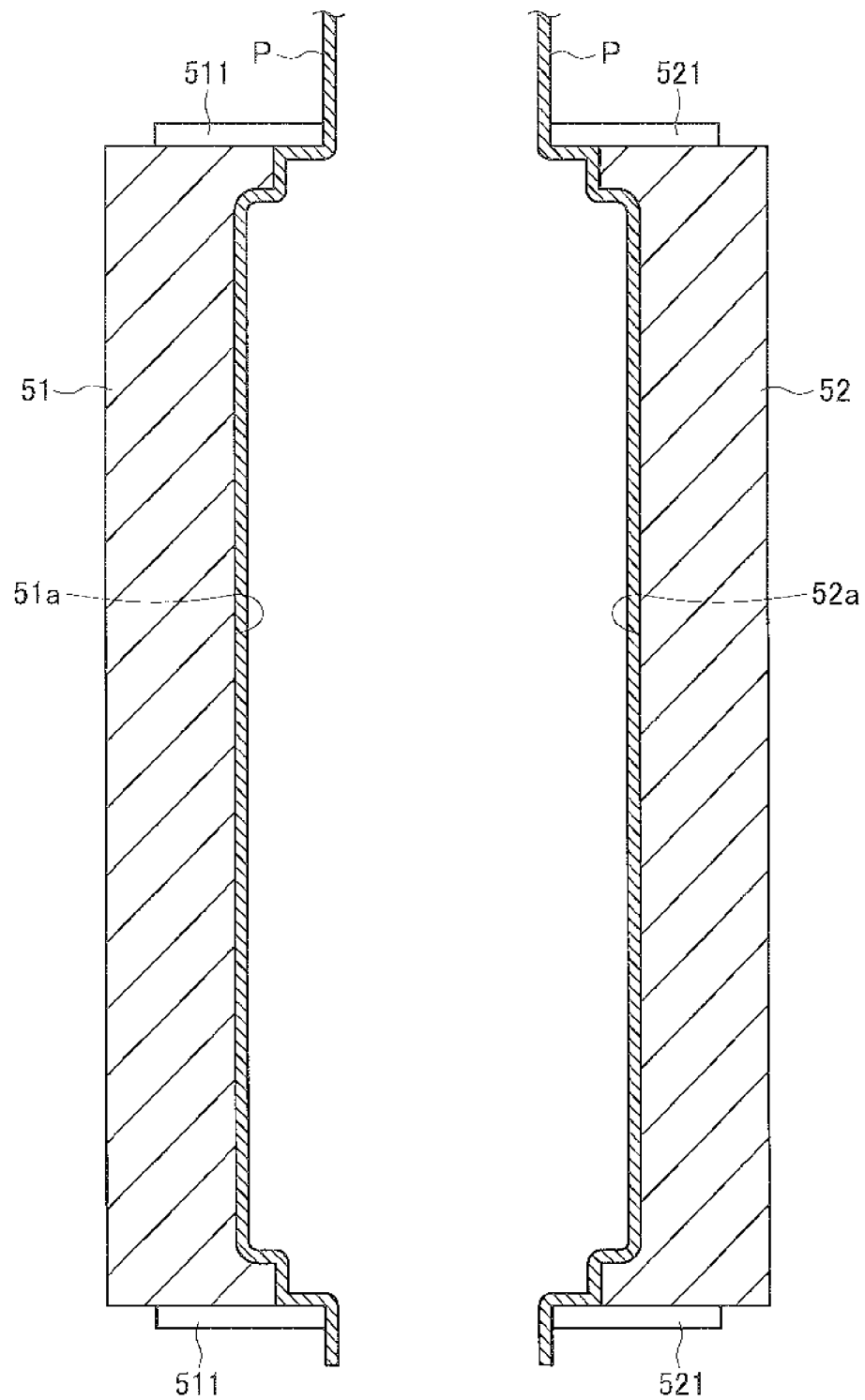
FIG. 9 is a view showing the method of manufacturing the resin board of the first embodiment.

Next, as shown in FIG. 8, sliding portions 511 and 521 around the forming surfaces 51a and 52a are projected, so that end surfaces thereof are brought into contact with the molten resin sheets P and P. Thus, the enclosed space is formed between the molten resin sheets P and P and the forming surfaces 51a and 52a of the pair of split mold blocks 51 and 52. Then, air in the enclosed space is sucked through a communication path provided between the vacuum chamber and the forming surfaces 51a and 52a. By this suction, the two molten resin sheets P and P are respectively pressed against the forming surfaces 51a and 52a of the pair of split mold blocks 51 and 52, and are shaped (formed) so as to conform to a shape along the forming surfaces 51a and 52a, that is, a substantially outer shape of the resin board 1, as shown in FIG. 9.

Figure 10:
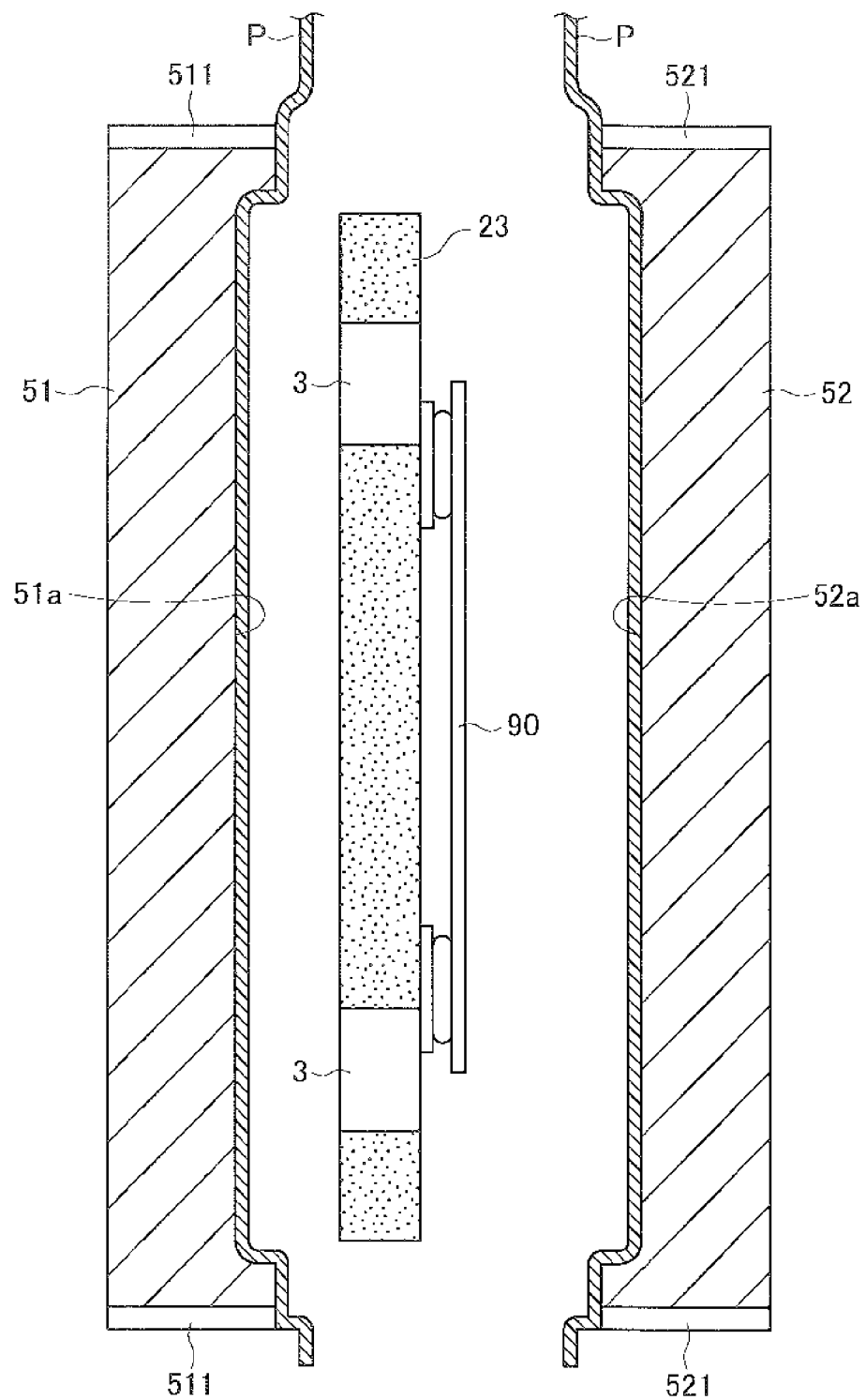
FIG. 10 is a view showing the method of manufacturing the resin board of the first embodiment.

Next, as shown in FIG. 10, the core material 23 to which the reinforcing material 3 is attached is held by a manipulator 90. Then, the core material 23 is positioned between the pair of split mold blocks 51 and 52 by using the manipulator 90. Then, the core material 23 is welded so as to be pressed against the molten resin sheet P formed on any one of the forming surfaces 51a and 52a. At this time, as shown in FIG. 5, the outer plate surface 332 of the reinforcing material 3 is formed inside the reference line EL defined by the outer edge of the core material 23. Therefore, there is a low possibility that the reinforcing material 3 falls off from the core material 23.

Figure 11:
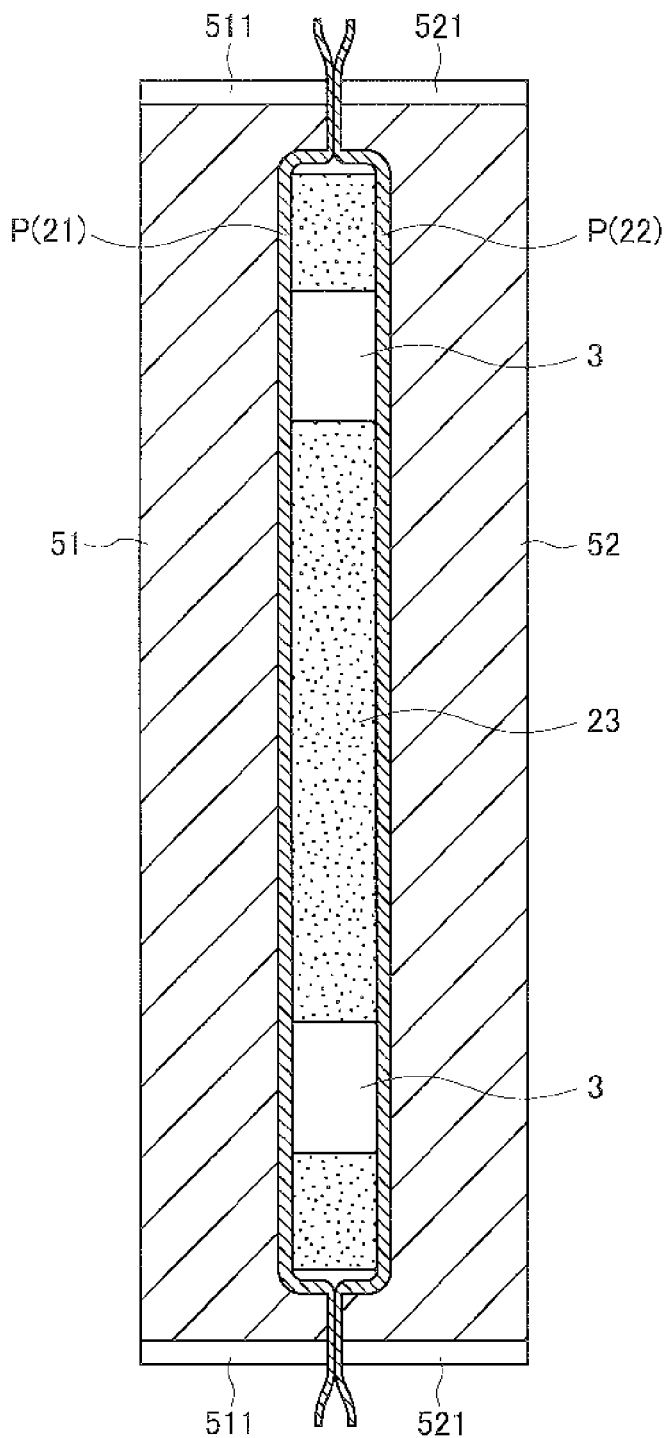
FIG. 11 is a view showing the method of manufacturing the resin board of the first embodiment.

After welding the core material 23 to any molten resin sheet P, the split mold blocks 51 and 52 are clamped as shown in FIG. 11. By this clamping, both the surfaces (the front surface 231 and the back surface 232) of the core material 23, and the first plate 31 and the second plate 32 of the reinforcing material 3 are welded to the molten resin sheets P and P. Thus, the core material 23, the reinforcing material 3, and the first resin sheet 21 and the second resin sheet 22 as the skin material are integrally joined around the reinforcing material 3. Further, peripheral edge of the pair of molten resin sheets P and P is welded in the pinch-off part (not shown) of the pair of split mold blocks 51 and 52. In this way, a parting line is formed.

Finally, the pair of split mold blocks 51 and 52 is again moved to the open position, and the molded resin board 1 is separated from the forming surfaces 51a and 52a. Then, burrs formed around the parting line are cut and removed by a cutter or the like. Thus, the resin board 1 is completed.

As described above, according to the resin board 1 of the present embodiment, the reinforcing material 3 placed on the front surface and the back surface of the core material 23 is covered with the skin material made of the first resin sheet 21 and the second resin sheet 22, and the hinge members 5L and 5R are attached to the skin material by the rivets R penetrating the skin material and the first plate 31 of the reinforcing material 3. Therefore, as compared with a conventional case where the hinge members are attached by the rivets by drilling only the skin material, in the resin board 1 of the present embodiment, the load of the hinge member can be supported by the reinforcing material 3. Therefore, the skin material can be thinned. For example, while the thickness of the conventional resin sheet was 2 mm, the thickness of the resin sheet of the resin board 1 of the present embodiment could be 1 mm.

As described above, according to the resin board 1 of the present embodiment, the weight can be reduced as compared with the conventional one, and the fastened member such as a hinge can be firmly attached.

Since the reinforcing material 3 only needs to be provided only at an attaching position of the hinge member, a size occupied in the entire resin board 1 can be relatively small.

(2) Second Embodiment

The resin board which is a second embodiment of the resin panel of the present invention will be described with reference to FIG. 12 and FIG. 13 below.

Figure 12:
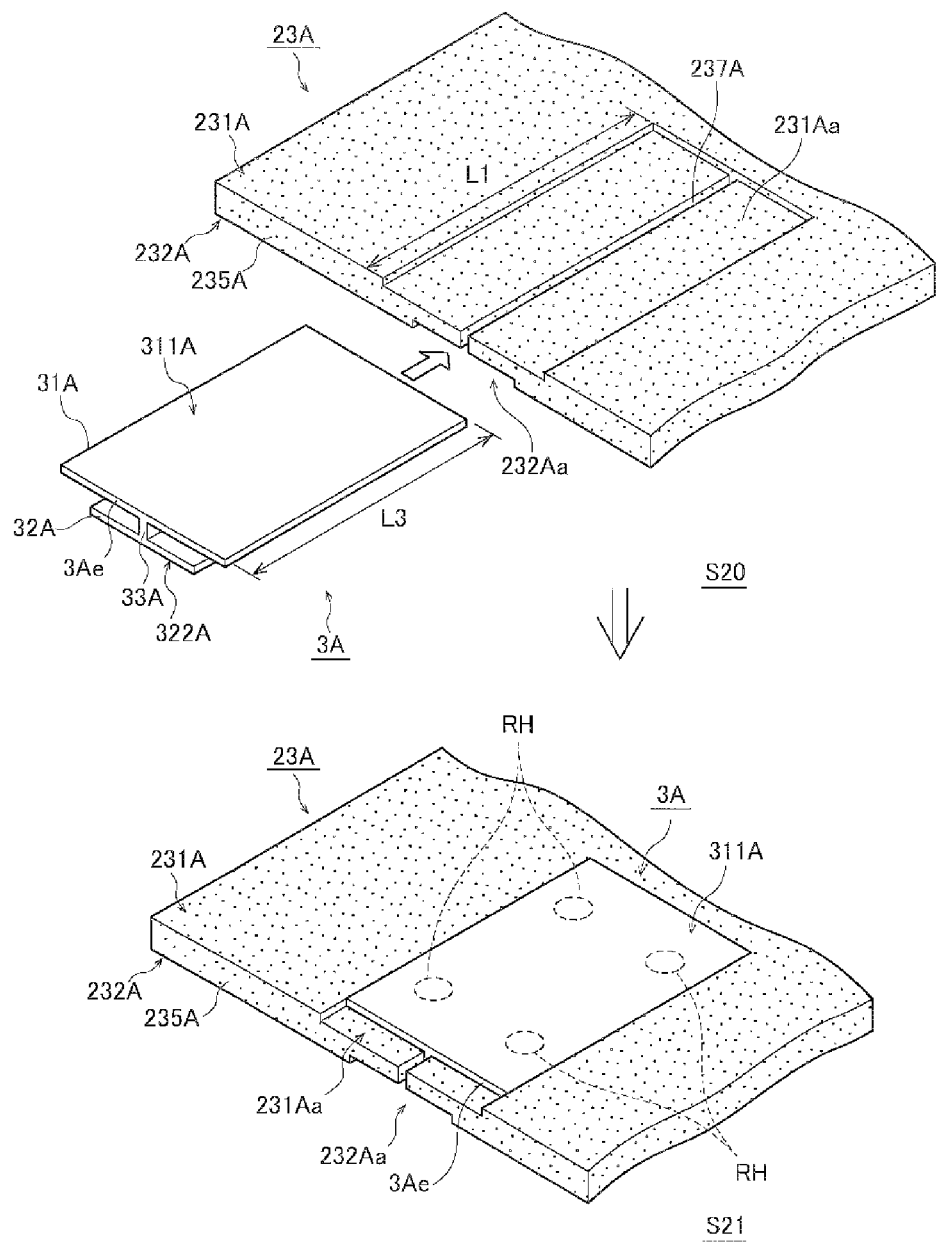
FIG. 12 is a view for explaining an example of attaching the reinforcing material to the core material in the resin board of a second embodiment.
Figure 13:
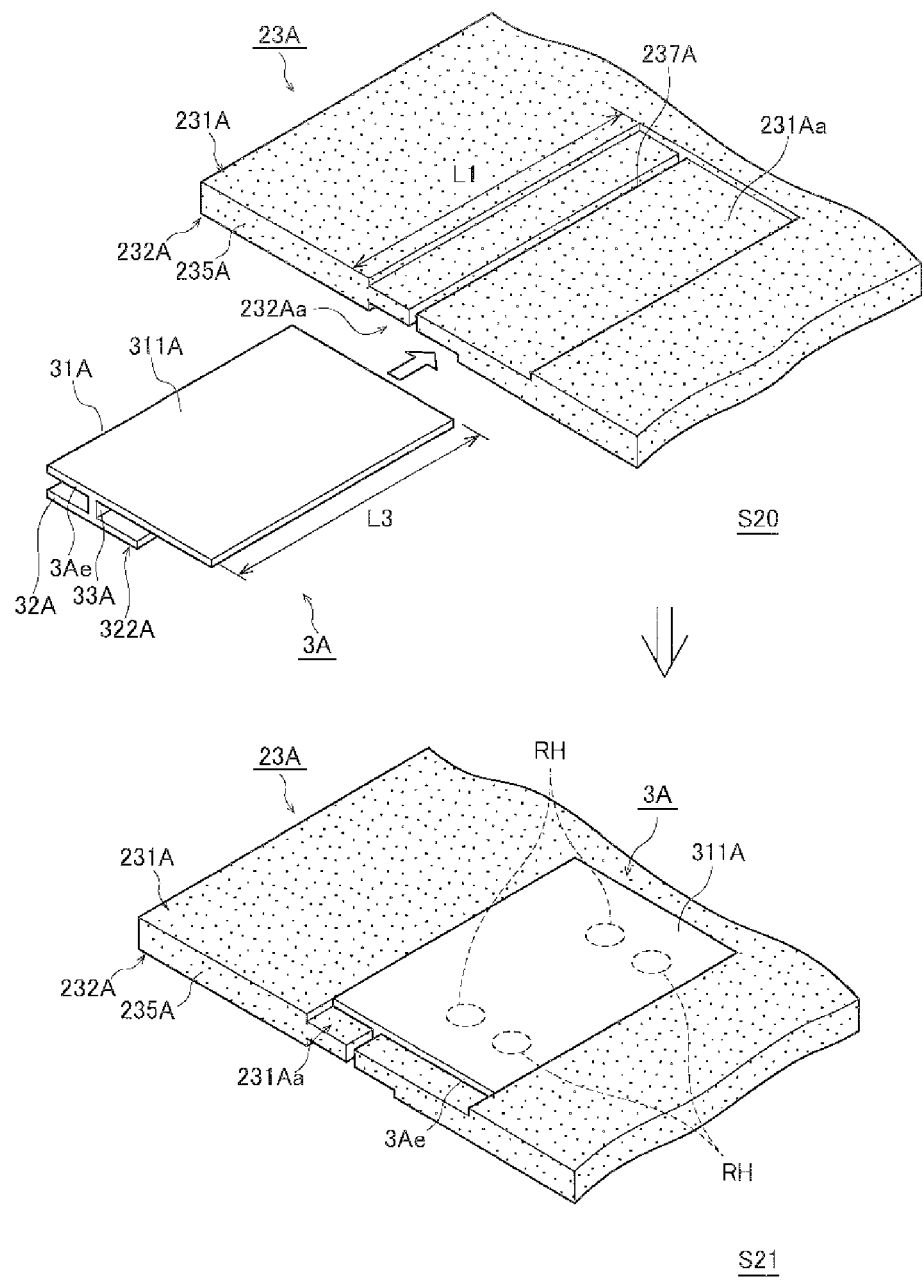
FIG. 13 is a view for explaining an example of attaching the reinforcing material to the core material in the resin board according to a modification of the second embodiment.

FIG. 12 is a view for explaining an example of attaching the reinforcing material to the core material in the resin board of the second embodiment. FIG. 13 is a view for explaining an example of attaching the reinforcing material to the core material in the resin board according to a modification of the second embodiment. Each of FIG. 12 and FIG. 13 corresponds to FIG. 4.

In the present embodiment, a mode of attaching the core material and the reinforcing material is different from that in the first embodiment. It should be noted that redundant descriptions of the same contents as those of the first embodiment will be omitted.

Referring first to FIG. 12, a reinforcing material 3A of the present embodiment includes a first plate 31A provided on a front surface 231A of a core material 23A, a second plate 32A provided on a back surface 232A of the core material 23A, and a connecting plate 33A connecting the first plate 31A and the second plate 32A. A cross-section of the reinforcing material 3A has a substantially H-shape. The connecting plate 33A connects central portions of the first plate 31A and the second plate 32A.

A recess 231Aa and a recess 232Aa are respectively formed on an outer edge of the front surface 231A and an outer edge of the back surface 232 A of the core material 23A. A cutout 237A into which the connecting plate 33A of the reinforcing material 3A is inserted is formed between the recess 231Aa and the recess 232Aa. The cutout 237A is formed by cutting with a cutter or the like after molding the core material 23. As shown in order of Steps S20 and S21 in FIG. 12, the reinforcing material 3A is attached to the core material 23A by inserting the connecting plate 33A of the reinforcing material 3A having an H-shaped cross-section into the cutout 237A. In a state where the reinforcing material 3A is attached to the core material 23A, the first plate 31A of the reinforcing material 3A is placed in the recess 231Aa of the core material 23A. Then, the second plate 32A of the reinforcing material 3A is placed in the recess 232Aa of the core material 23A.

In the reinforcing material 3A shown in FIG. 12, four openings RH (shown by dashed lines) of the hinge members 5L and 5R for fastening the rivets R are formed in the first plate 31A provided on the front side of the core material 23A. It is not necessary to form holes for fastening the rivets R in the second plate 32A provided on the back side of the core material 23A. Therefore, the second plate 32A is made smaller in width than the first plate 31A in order to reduce the weight.

In a state where the reinforcing material 3A is attached to the core material 23A, recessed amounts of the recesses 231Aa and 232Aa are preferably set so that the front surface 231A of the core material 23A and the front side plate surface 311A of the first plate 31A of the reinforcing material 3A are flush with each other, and the back surface 232A of the core material 23A and the back side plate surface 322A of the second plate 32A of the reinforcing material 3A are flush with each other. Thus, the front surface and the back surface of the resin board are both flat. Therefore, the appearance of the resin board is not impaired.

As shown in FIG. 12, when the depth of the recess 231Aa with reference to the side wall surface 235A of the core material 23A is L1 and the width in the attaching direction of the first plate 31A of the reinforcing material 3A is L3, the depth and the width are preferably set to satisfy L1>L3. That is, as shown in FIG. 12, in a state where the reinforcing material 3A is attached to the core material 23A, an end surface 3Ae of the reinforcing material 3A is preferably located on the inner side of the side wall surface 235A of the core material 23A (outer edge of the core material 23) in a plan view. In this way, the reinforcing material 3A enters the inner side of the side wall surface 235A of the core material 23A. Therefore, it is possible to reduce a possibility that the reinforcing material 3A falls off from the core material 23A and damages the mold during manufacture.

The end surface 3Ae of the reinforcing material 3A is separated inward from the side wall surface 235A of the core material 23A. Therefore, even when the reinforcing material 3A is slightly deviated to the outer side after it is attached to the core material 23A, it is possible to reduce the possibility that the split mold blocks pinch the reinforcing material 3A when clamping the split mold blocks during manufacturing the resin board of the present embodiment.

In the first embodiment, the inner plate surface 331 of the connecting plate 33 of the reinforcing material 3 is configured to contact the side wall surface 235b of the core material 23. Therefore, in order to dispose the reinforcing material 3 inner side than the side wall surface 235a, it is necessary to dispose the side wall surface 235b (the side wall surface of the portion of the recesses 231a and 232a) inner side than the side wall surface 235a in the core material 23. Therefore, in a portion of the inside of the skin material (a portion outside the reinforcing material 3 when the resin board 1 is viewed in a plan view; a portion between the outer plate surface 332 and the reference line EL in FIG. 5), a space in which the core material 23 is not present is formed. In contrast, in the present embodiment, the connecting plate 33A of the reinforcing material 3A is configured to be inserted into the cutout 237A. Therefore, the side wall surface 235A of the core material 23A can be flush with these recesses regardless of whether the side wall surface is at a position of the recesses 231Aa and 232Aa. Therefore, even when the reinforcing material 3A is disposed largely separated from and inside the side wall surface 235a, it is possible to inhibit a local reduction in strength and stiffness of the resin panel due to formation of the space in which the core material is not present.

In the example shown in FIG. 12, in a state where the reinforcing material 3A is attached to the core material 23A, the openings RH for rivets are located on both sides across the connecting plate 33A by two. However, a structure of the reinforcing material 3A or a position of the cutout 237A can be appropriately changed according to the fastening position of the rivet. For example, in an example shown in FIG. 13, in a state where the reinforcing material 3A is attached to the core material 23A, four rivet openings RH are located on one side of the connecting plate 33A. In this case, the position of the connecting plate 33A of the reinforcing material 3A is set according to the position of the cutout 237A.

The first and second embodiments of the present invention have been described in detail above. However, the resin panel of the present invention is not limited to the above embodiment. Of course, various improvements or modifications may be made without departing from the scope of the present invention.

Figure 14A:
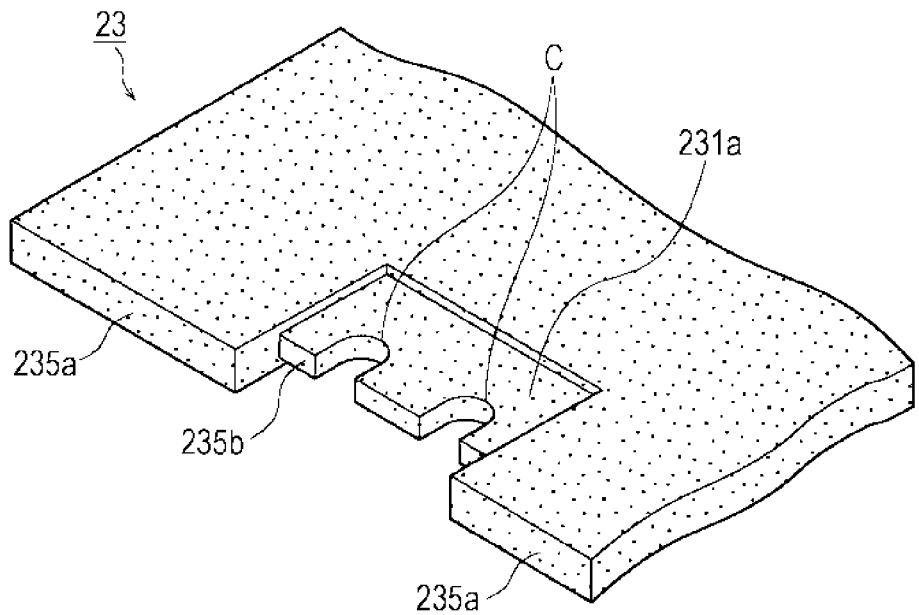
FIGS. 14A and 14B are views each showing the resin board according to the modification of the second embodiment.
Figure 14B:
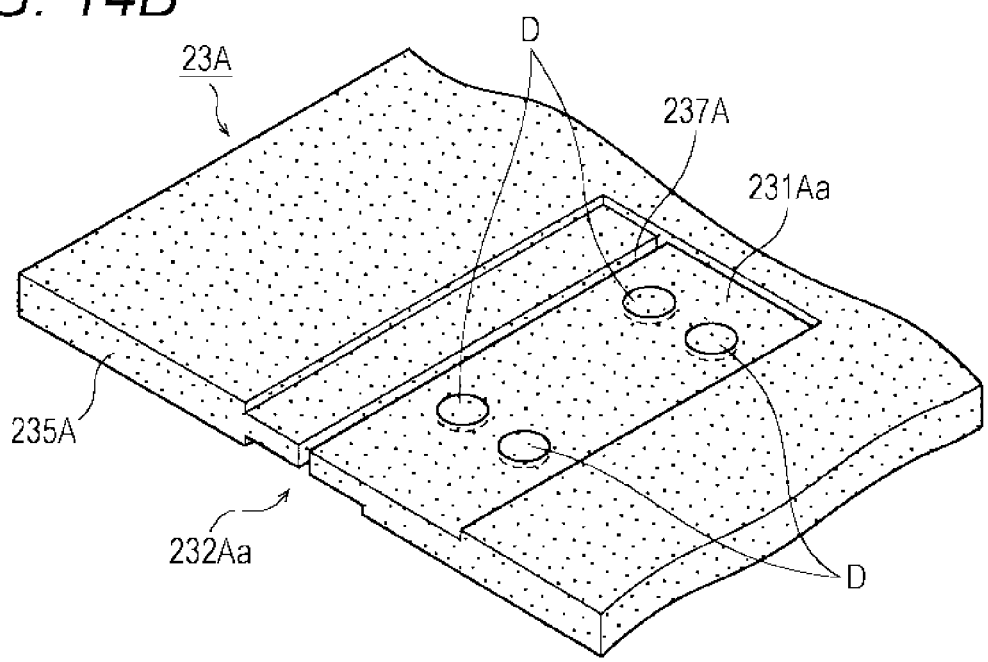

FIGS. 14A and 14B respectively show resin boards according to modifications of the embodiments. FIG. 14A is a perspective view showing a part of the modification of the core material 23 of the resin board according to the first embodiment. FIG. 14B is a perspective view showing a part of the modification of the core material 23A of the resin board according to the second embodiment.

The core material 23 shown in FIG. 14A is the modification in the case where the reinforcing material 3 having the U-shaped cross-section is attached as in the first embodiment described above. The core material 23 shown in FIG. 14A is different from the core material 23 shown in FIG. 4 in that a semicircular cutout C is formed at a position corresponding to the rivet opening RH in the recess 231a. By forming the cutout C at the position corresponding to the rivet opening RH, the core material 23 is not drilled when the resin laminate is drilled after molding. Therefore, the resin board 1 is not contaminated with cutting scraps of the core material 23.

The core material 23A shown in FIG. 14B is the modification in the case where the reinforcing material 3A having the H-shaped cross-section is attached as in the second embodiment described above. In the core material 23A shown in FIG. 14B, recesses D (four places) are formed at positions corresponding to the rivet openings RH in the recess 231Aa. This point is different from the core material 23A shown in FIG. 13. As in the case of FIG. 14A, when the resin laminate is drilled after molding, a cut amount of the core material 23 by drilling is reduced due to the recesses D. Therefore, a possibility of contamination of the resin board 1 with the cutting scraps of the core material 23 is reduced. In place of the recess D, a through-hole may be provided in the core material 23 at a position corresponding to the opening RH. However, in that case, left and right molds contact each other during mold clamping. Therefore, it is not preferable to provide the through-hole in this way in promoting wear of the mold. Therefore, in the case of FIG. 14B, the recess D is set in place of the through-hole.

In each of the embodiments described above, it is not always necessary that both the front surface and the back surface of the core material are respectively flush with the front side plate surface and the back side plate surface of the reinforcing material. Either one of the front side and the back side may be flush with each other depending on the intended use. For example, when only the front side is visible in a usual use state of the resin board, only the front side may be set to be flush with each other.

In the above-described embodiments, the case where the hinge members 5L and 5R are attached to the front side surface (the front surface of the first resin sheet 21) of the resin laminate 2 has been described. However, the position of the hinge member is not limited thereto. The hinge members 5L and 5R may be attached to the back side (the back surface of the second resin sheet 22) of the resin laminate 2. The surface to which the hinge member is attached is appropriately determined according to the function of the resin board.

In the embodiment described above, the plate thickness of the first plate (31 and 31A) of the reinforcing material and the plate thickness of the second plate (32 and 32A) may be different. For example, the hole may not be formed in the second plate (32 and 32A) not fastened by the rivets. Therefore, the plate thickness can be determined independently of the plate thickness of the first plate (31 and 31A).

In the embodiment described above, a hinge is cited as an example of the fastened member. However, the fastened member is not limited to this example. The fastened member may be any member as long as it can be attached using the fastening means. For example, the fastened member may be a metallic or resin bracket used for various purposes.

(3) Third Embodiment

(3-1) Resin Panel of Third Embodiment

Figure 15:
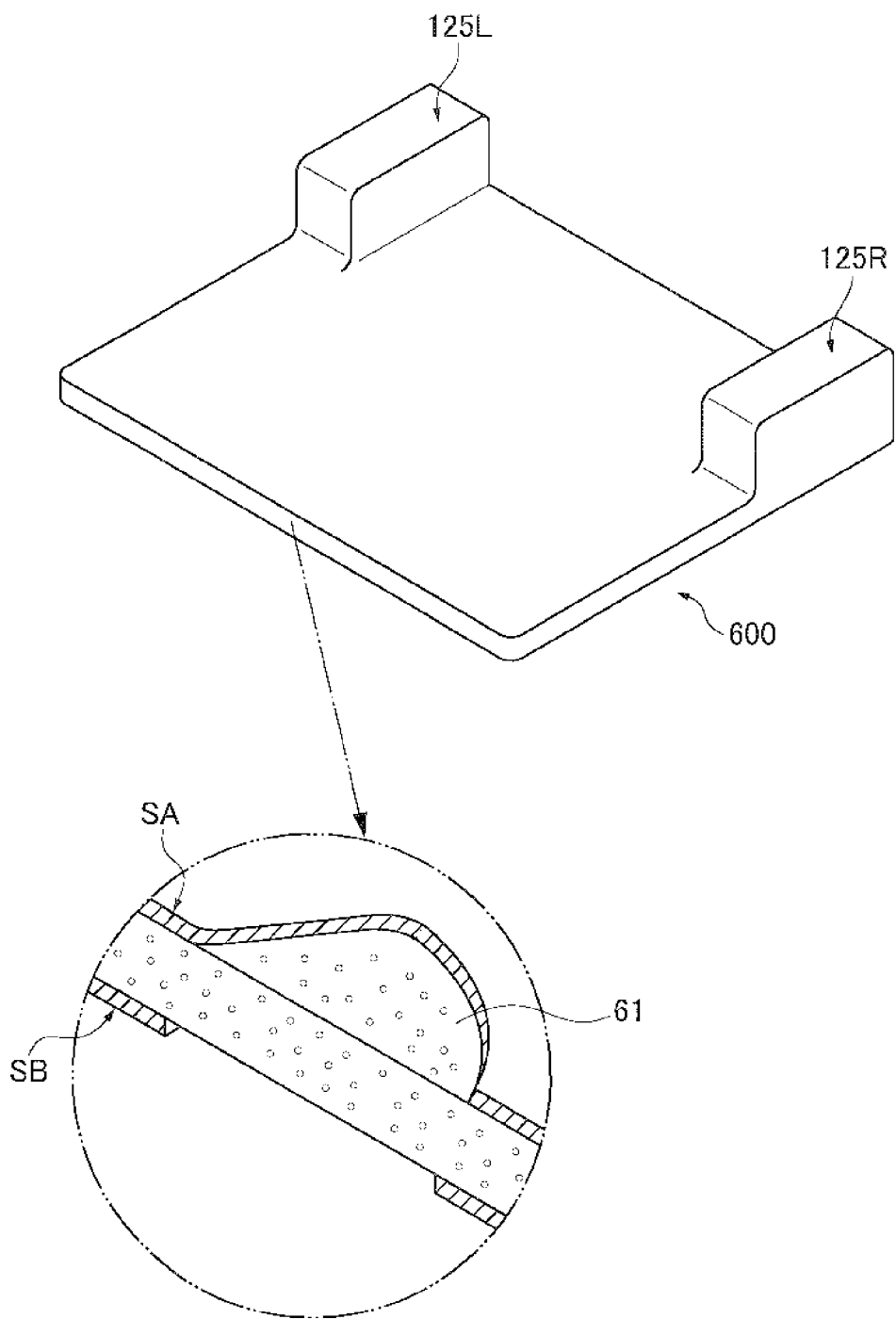
FIG. 15 is a perspective view of the resin panel of a third embodiment and an enlarged cut-away view of a part of the resin panel.

FIG. 15 is a perspective view of a resin panel 600 according to a third embodiment and an enlarged cut-away view of a part of the resin panel 600.

As shown in FIG. 15, the outer shape of the resin panel 600 according to the present embodiment has a sandwich structure in which a foamed structure 61 is sandwiched by the skin material sheets SA and SB which are the resin sheets of the thermoplastic resin respectively constituting the front surface and the back surface. As shown in FIG. 15, in the resin panel 600 of the present embodiment, a pair of left and right raised portions 125L and 125R rising from a flat portion is formed.

In the resin panel 600 of the present embodiment, the resin material of the skin material sheets SA and SB is not limited. The resin material may be a foamed resin or a non-foamed resin. The skin material sheets SA and SB are preferably formed of the non-foamed resin in order to ensure the stiffness of the resin panel 600. For example, in consideration of moldability, the resin material of the skin material sheets SA and SB may be the resin material obtained by mixing polystyrene (PS) and styrene ethylene butylene styrene block copolymer resin (SEBS) in polypropylene (PP) which is a main material.

For the purpose of increasing the stiffness and strength, the skin material sheets SA and SB and a foam 62 may be molded using the resin material mixed with the glass filler. As the glass filler, the same glass filler as the glass filler mentioned in the first embodiment may be used.

(3-2) Foamed Structure of The Present Embodiment

Next, the foamed structure 61 of the present embodiment will be described with reference to FIGS. 16 to 24.

Figure 16A:
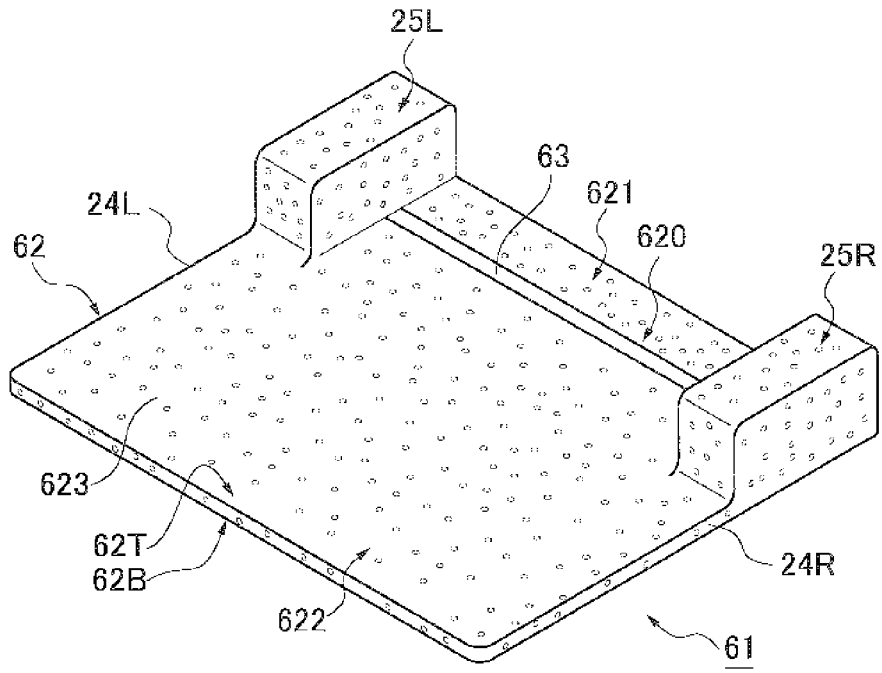
FIG. 16A is a perspective view of a foam of the third embodiment as seen from the front side and FIG. 16B is a perspective view of the foam of the third embodiment as seen from the back side.
Figure 16B:
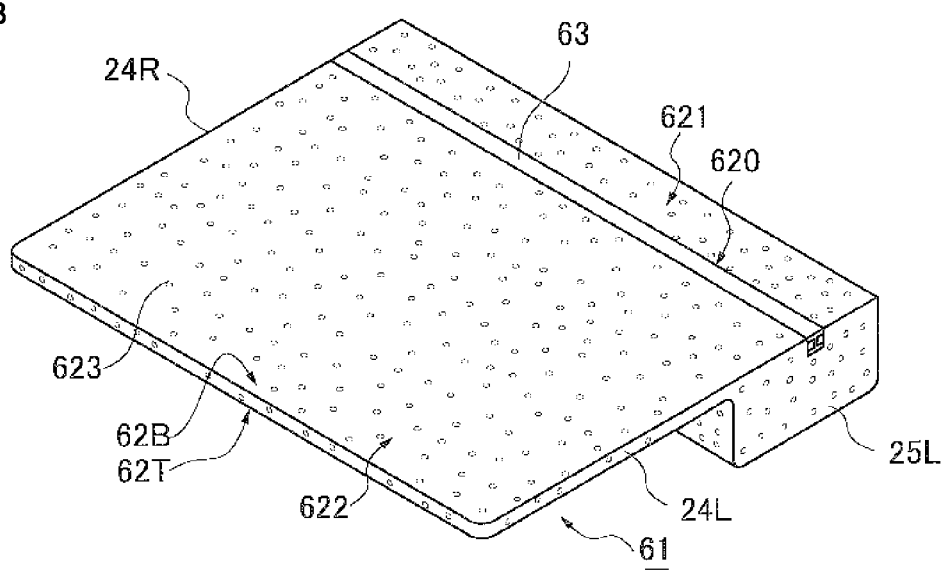
Figure 17:
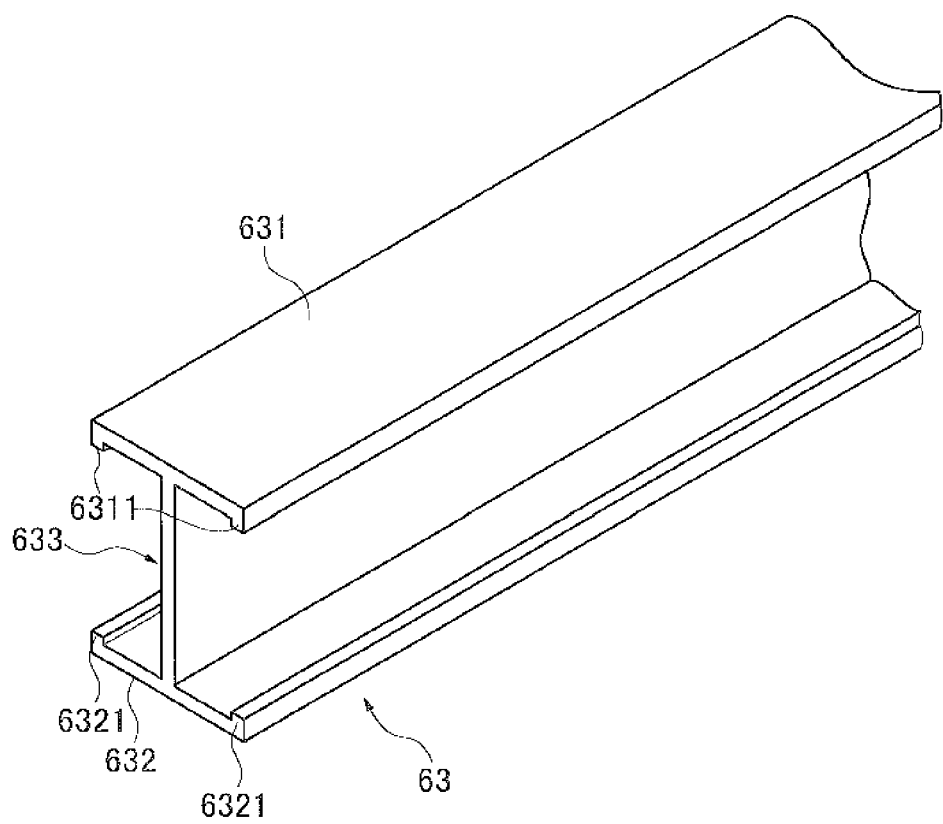
FIG. 17 is a perspective view of the reinforcing material of the third embodiment.
Figure 18:
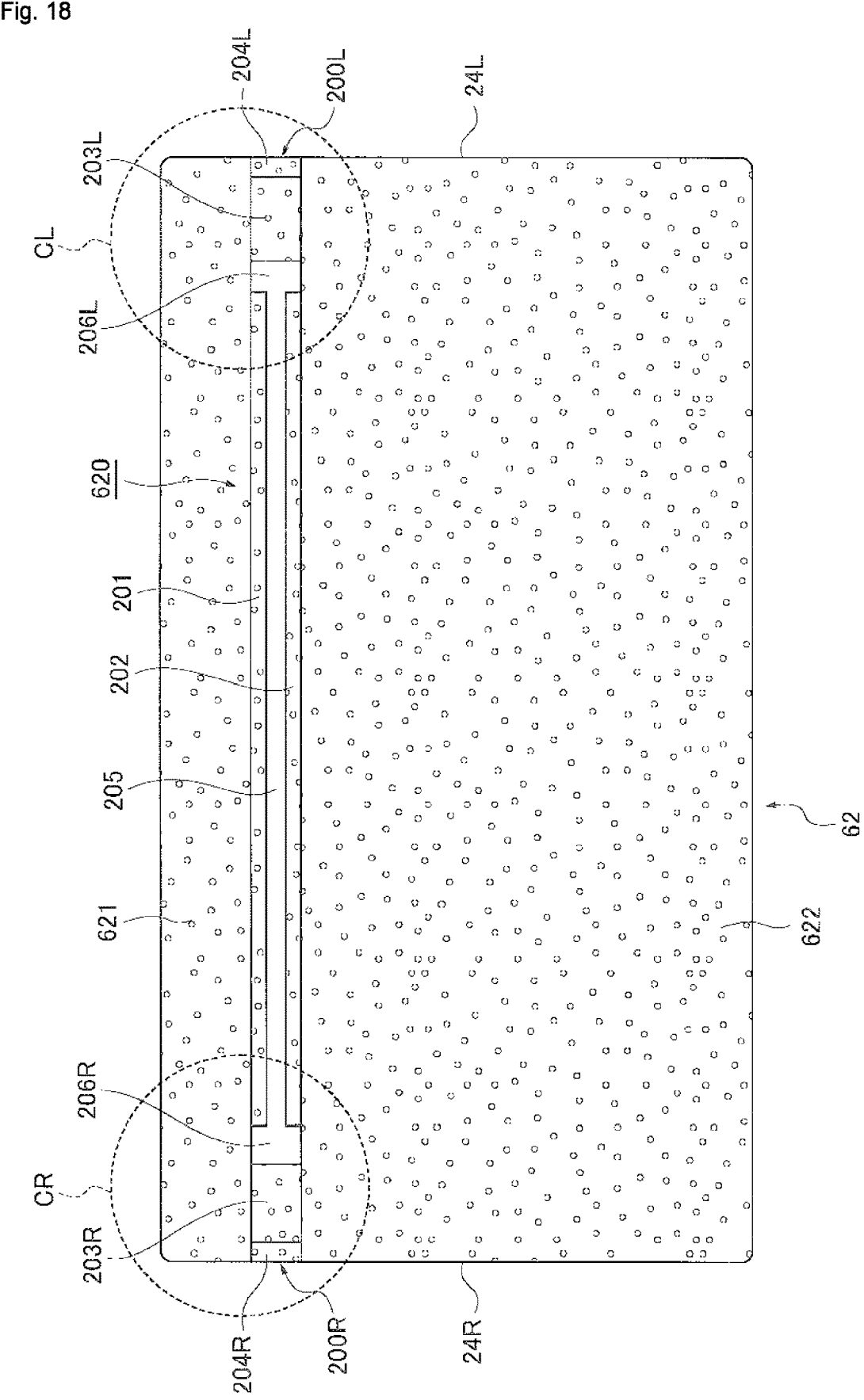
FIG. 18 is a plan view of the foam of the third embodiment.
Figure 19:
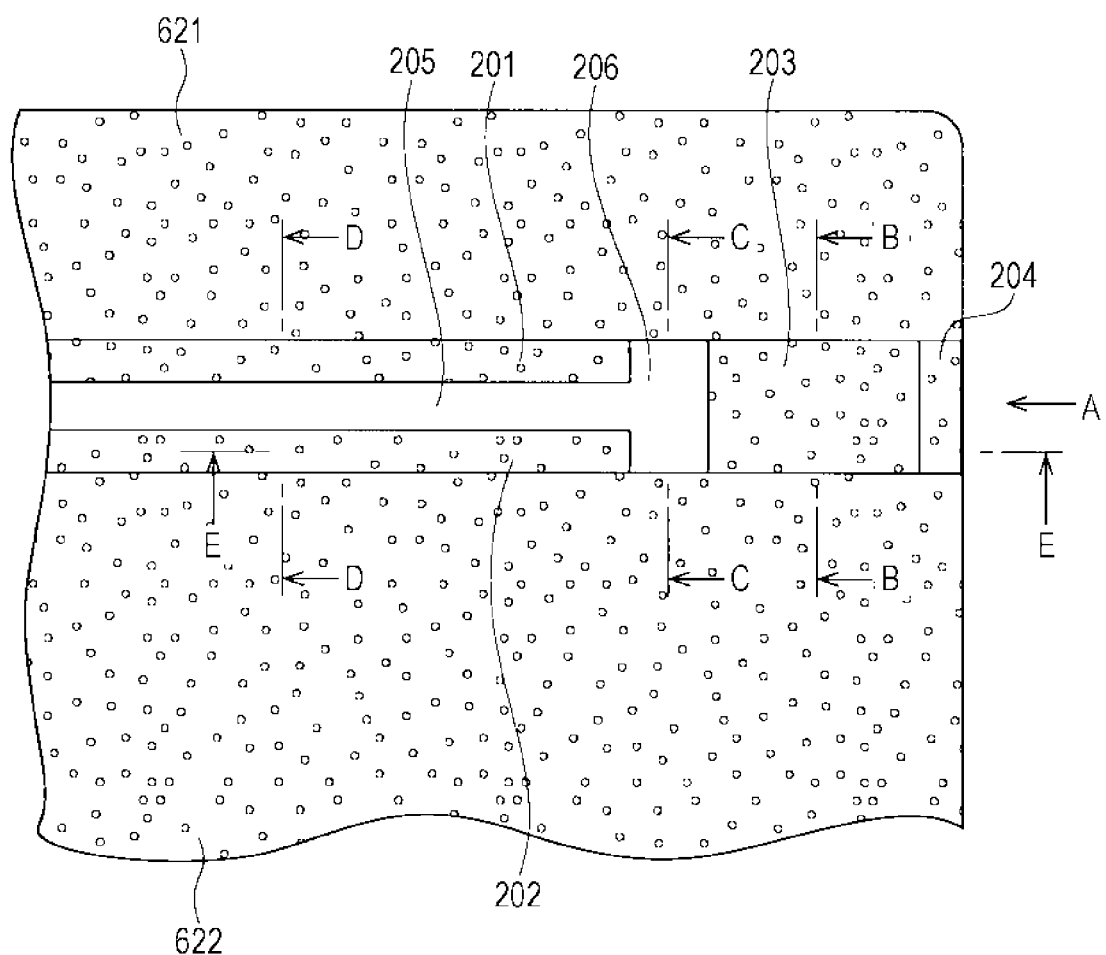
FIG. 19 is an enlarged view of a CL portion of the foam shown in FIG. 18.
Figure 20:
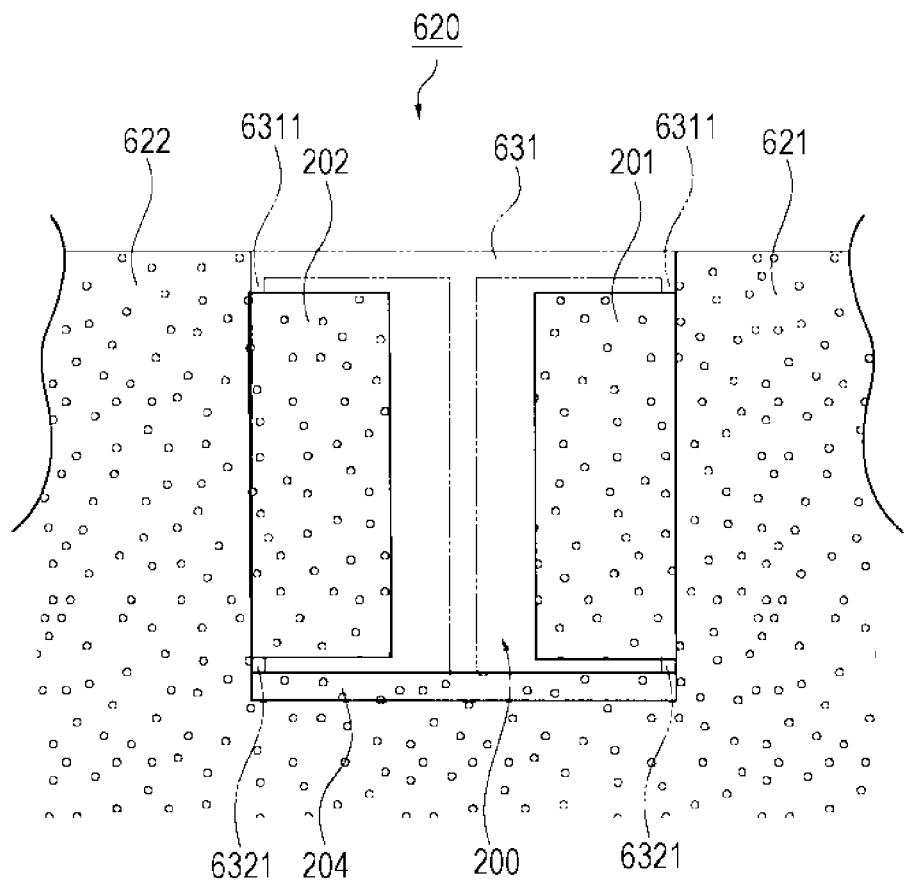
FIG. 20 is an arrow view as seen from an arrow A in FIG. 19.

FIG. 16A is a perspective view of the foam 62, which is a main part of the foamed structure 61 of the present embodiment, as seen from the front side. FIG. 16B is a perspective view of the foam 62 as seen from the back side. FIG. 17 is a perspective view of the reinforcing material 63 incorporated in the foam 62. FIG. 18 is a plan view of the foam 62. FIG. 19 is an enlarged view of a CL portion of the foam 62 shown in FIG. 18. FIG. 20 is an arrow view as seen from an arrow A in FIG. 19. FIGS. 21 to 24 are respectively cross-sectional views taken along lines B-B, C-C, D-D and E-E shown in FIG. 18.

Referring first to FIG. 16A, the foamed structure 61 has the foam 62 and a reinforcing material 63 locally attached to the foam 62 to ensure the stiffness and strength.

An overall shape of the foamed structure 61 is a shape obtained by removing the skin material sheets SA and SB from the resin panel 600 shown in FIG. 15. Therefore, the foamed structure 61 has the same shape as the whole shape of the resin panel 600 in FIG. 15. That is, the foamed structure 61 includes a flat portion 623 having a front surface 62T and a back surface 62B which are flat surfaces, and a pair of left and right raised portions 25L and 25R (hereinafter collectively or individually also referred to as "raised portion 25") rising from the front surface 62T.

A thickness of the flat portion 623 of the foam 62 is appropriately determined in order to ensure a target thickness as the resin panel 600 and further a target stiffness and strength of the resin panel 600. This thickness is not particularly limited.

The foam 62 is molded using, for example, the thermoplastic resin. The resin material is not limited. For example, the resin material includes a polyolefin such as polypropylene or polyethylene and an acrylic derivative such as polyamide, polystyrene or polyvinyl chloride, or a mixture of two or more kinds. The foam 62 occupies a large proportion of a volume of the foamed structure 61. Therefore, the foam 62 is made of the foamed resin foamed by using a foaming agent for weight reduction. The expansion ratio of the foamed resin to be the foam 62 is, for example, in a range of 10 to 60 times, typically 30 times. Note that the expansion ratio is the value obtained by dividing the density of the mixed resin before foaming by the apparent density of the foamed resin after foaming.

In the foamed structure 61, the reinforcing material 63 is attached to an accommodating portion 620 of the foam 62.

As shown in FIG. 17, the reinforcing material 63 includes a first plate 631 and a second plate 632 which extend linearly while facing each other, and a connecting plate 633 connecting the first plate 631 and the second plate 632. In an example shown in FIG. 17, the reinforcing material 63 has the H-shaped cross-section. In a state where the reinforcing material 63 is attached to the foam 62, surfaces of the first plate 631 and the second plate 632 of the reinforcing material 63 opposite to surfaces to which the connecting plate 633 is connected respectively constitute part of the front surface 62T and the back surface 62B of the foam 62.

Projections 6311 projecting toward the second plate 632 are provided at both ends of the first plate 631. Projections 6321 projecting toward the first plate 631 are provided at both ends of the second plate 632.

A material of the reinforcing material 63 is not particularly limited. However, the material of the reinforcing material 63 is preferably made of a metal such as aluminum or a hard plastic in order to ensure the strength of the resin panel 600. The reinforcing material 63 is molded by, for example, extrusion molding.

As shown in FIGS. 16A and 18, the foam 62 includes the linear accommodating portion 620 for accommodating the reinforcing material 63, and a first foamed portion 621 and a second foamed portion 622 formed sandwiching the accommodating portion 620.

As shown in FIGS. 18 and 20, the accommodating portion 620 is formed through from a first opening 200L provided on a first side surface 24L on the left side of the foam 62 to a second opening 200R provided on a second side surface 24R on the right side of the foam 62. The first opening 200L and the second opening 200R (hereinafter collectively or individually also referred to as "opening 200") are provided in order to insert the reinforcing material 63 from the first side surface 24L or the second side surface 24R into the accommodating portion 620.

As shown in FIG. 16A, in an example of the present embodiment, the pair of raised portions 25L and 25R is formed near both ends of the linear accommodating portion 620. In other words, the accommodating portion 620 and the raised portions 25L and 25R overlap each other in a plan view of the foam 62. The raised portions 25L and 25R are respectively formed corresponding to the raised portions 125L and 125R of the resin panel 600.

As shown in FIG. 18, the accommodating portion 620 for accommodating the reinforcing material 63 has a symmetrical structure.

Projecting portions 201 and 202 for restricting movement of the reinforcing material 63 in a direction perpendicular to the front surface 62T and the back surface 62B of the foam 62 are formed in a central portion of the accommodating portion 620. A through-hole 205 penetrating the front surface 62T and the back surface 62B of the foam 62 is provided between the projecting portions 201 and 202. A through-hole 206L and a through-hole 206R (hereinafter collectively or individually also referred to as "through-hole 206") are respectively provided on the first side surface 24L and the second side surface 24R at both ends in a longitudinal direction of the projecting portions 201 and 202 (that is, adjacent to one end and the other end of the projecting portions 201 and 202). Connecting portions 203L and 203R (hereinafter collectively or individually also referred to as "connecting portion 203") and projections 204L and 204R (hereinafter collectively or individually also referred to as "projection 204") are formed near the both ends of the accommodating portion 620.

Figure 23:
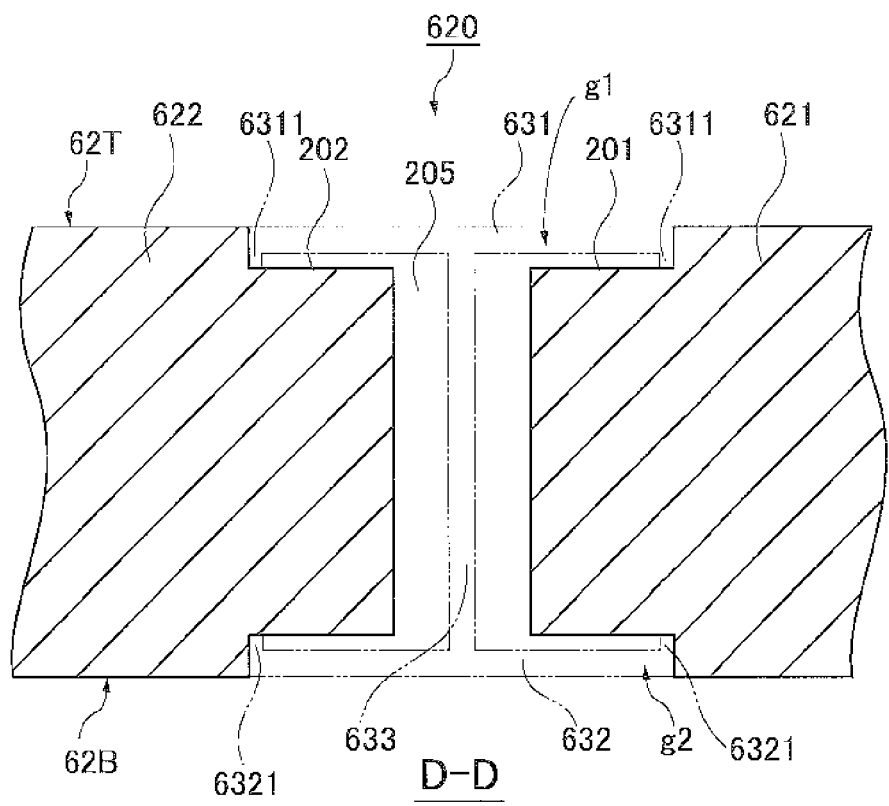
FIG. 23 is a cross-sectional view taken along a line D-D shown in FIG. 18.

As shown in FIG. 20 and FIG. 23, in a portion where the first foamed portion 621 and the second foamed portion 622 are not connected (that is, in a portion where the through-holes 206L, 205 and 206R are provided in the longitudinal direction of the accommodating portion 620 in FIG. 18), the projecting portion 201 projects from the first foamed portion 621 toward the second foamed portion 622 and the projecting portion 202 projects from the second foamed portion 622 toward the first foamed portion 621. The projecting portion 201 and the projecting portion 202 are facing each other across the through-hole 205.

As shown in FIG. 23, when the reinforcing material 63 is inserted into the accommodating portion 620, the connecting plate 633 of the reinforcing material 63 is disposed in the through-hole 205.

As shown in FIG. 23, a thickness of the projecting portions 201 and 202 of the accommodating portion 620 is less than that of the first foamed portion 621 and the second foamed portion 622. Thus, a groove g1 and a groove g2 are respectively formed on the front surface 62T side and the back surface 62B side with the through-hole 205 therebetween. The groove g1 on the front surface 62T side and the groove g2 on the back surface 62B side are respectively grooves in which the first plate 631 and the second plate 632 of the reinforcing material 63 are arranged. Preferably, a width of the groove g1 on the front surface 62T side and a width of the groove g2 on the back surface 62B side are respectively equal to or slightly more than that of the first plate 631 and the second plate 632 of the reinforcing material 63. Thus, when the reinforcing material 63 is attached to the foam 62, the movement in the width direction of the reinforcing material 63 is restricted.

The depth of the groove g1 on the front surface 62T side is preferably equal to the thickness including the projection 6311 of the first plate 631 of the reinforcing material 63. The depth of the groove g2 on the back surface 62B side is preferably equal to the thickness including the projection 6312 of the second plate 632 of the reinforcing material 63. Thus, when the reinforcing material 63 is accommodated in the accommodating portion 620, the first foamed portion 621, the accommodating portion 620, and the second foamed portion 622 are flush with each other on the front surface 62T side and the back surface 62B side. Therefore, the appearance is good when the resin panel 600 is completed.

As shown in FIG. 23, in a state where the reinforcing material 63 is accommodated in the accommodating portion 620, the projecting portion 201 and the projecting portion 202 is interposed between the first plate 631 and the second plate 632 of the reinforcing material 63 in a thickness direction of the foam 62. Therefore, after the reinforcing material 63 is attached to the foam 62, the movement of the reinforcing material 63 in the direction perpendicular to the front surface 62T and the back surface 62B of the foam 62 is restricted by the projecting portions 201 and 202. Therefore, the reinforcing material 63 does not fall off in the direction.

In a state where the reinforcing material 63 is accommodated in the accommodating portion 620, a tip end of the projection 6311 of the first plate 631 and a tip end of the projection 6312 of the second plate 632 of the reinforcing material 63 are respectively in contact with the projecting portion 201 and the projecting portion 202. Therefore, gaps are respectively formed between a main body (a portion other than the projection 6311) of the first plate 631 and a surface of the projecting portion 201, and between a main body (a portion other than the projection 6321) of the second plate 632 and a surface of the projecting portion 202.

Figure 24:
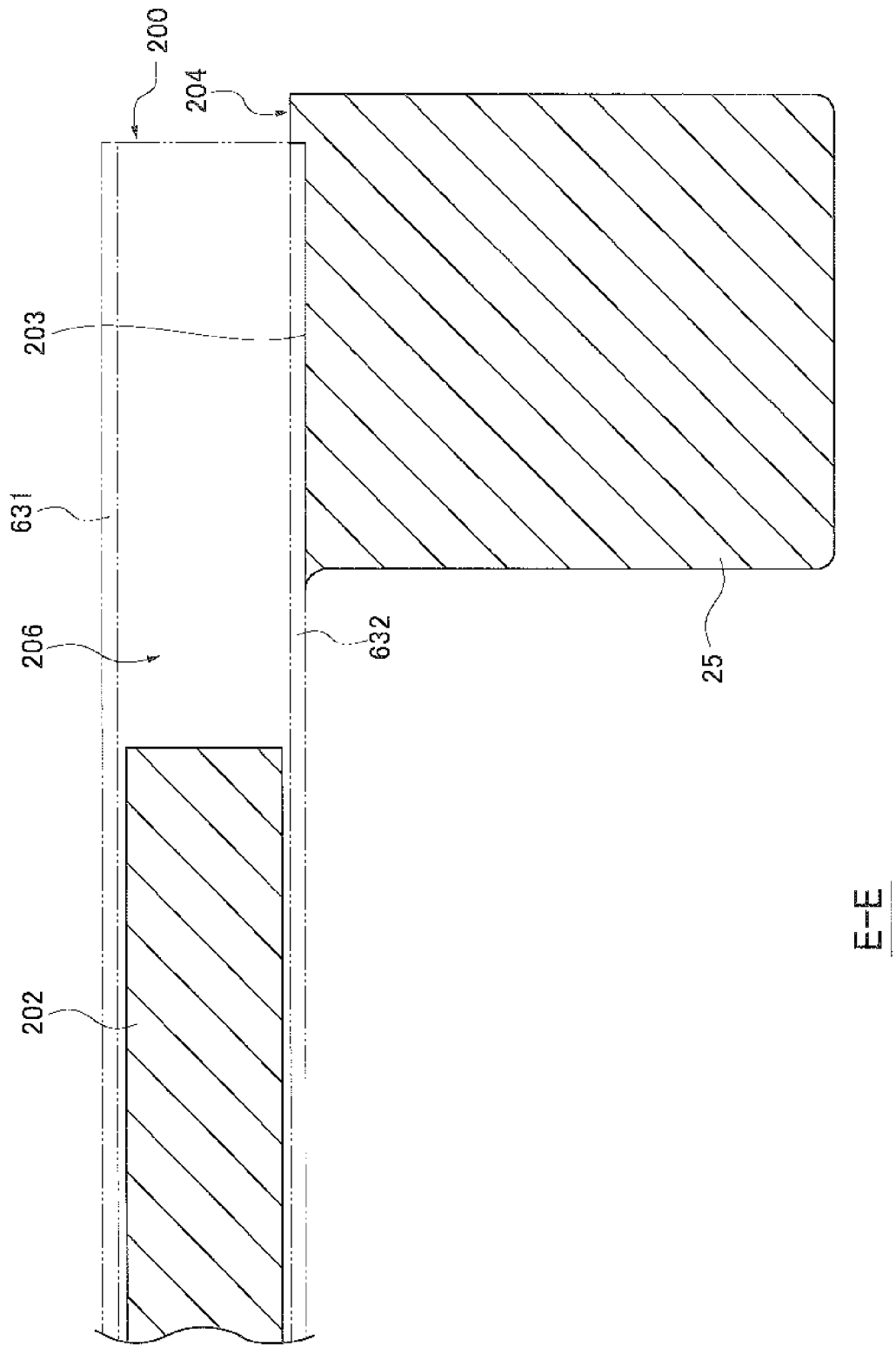
FIG. 24 is a cross-sectional view taken along a line E-E shown in FIG. 18.

As shown in FIG. 19, FIG. 20, and FIG. 24, in the accommodating portion 620, on the first side surface 24L and the second side surface 24R, the projection 204 for restricting the movement in the longitudinal direction of the reinforcing material 63 after the reinforcing material 63 is accommodated in the accommodating portion 620. That is, as shown in FIG. 24, in a state where the reinforcing material 63 is accommodated in the accommodating portion 620, the second plate 632 of the reinforcing material 63 contacts the projection 204. Thus, the movement of the reinforcing material 63 to the outside (the right side in FIG. 24) is restricted.

In the example of the present embodiment, the projection 204 is formed near an opening of the opening 200.

Figure 21:
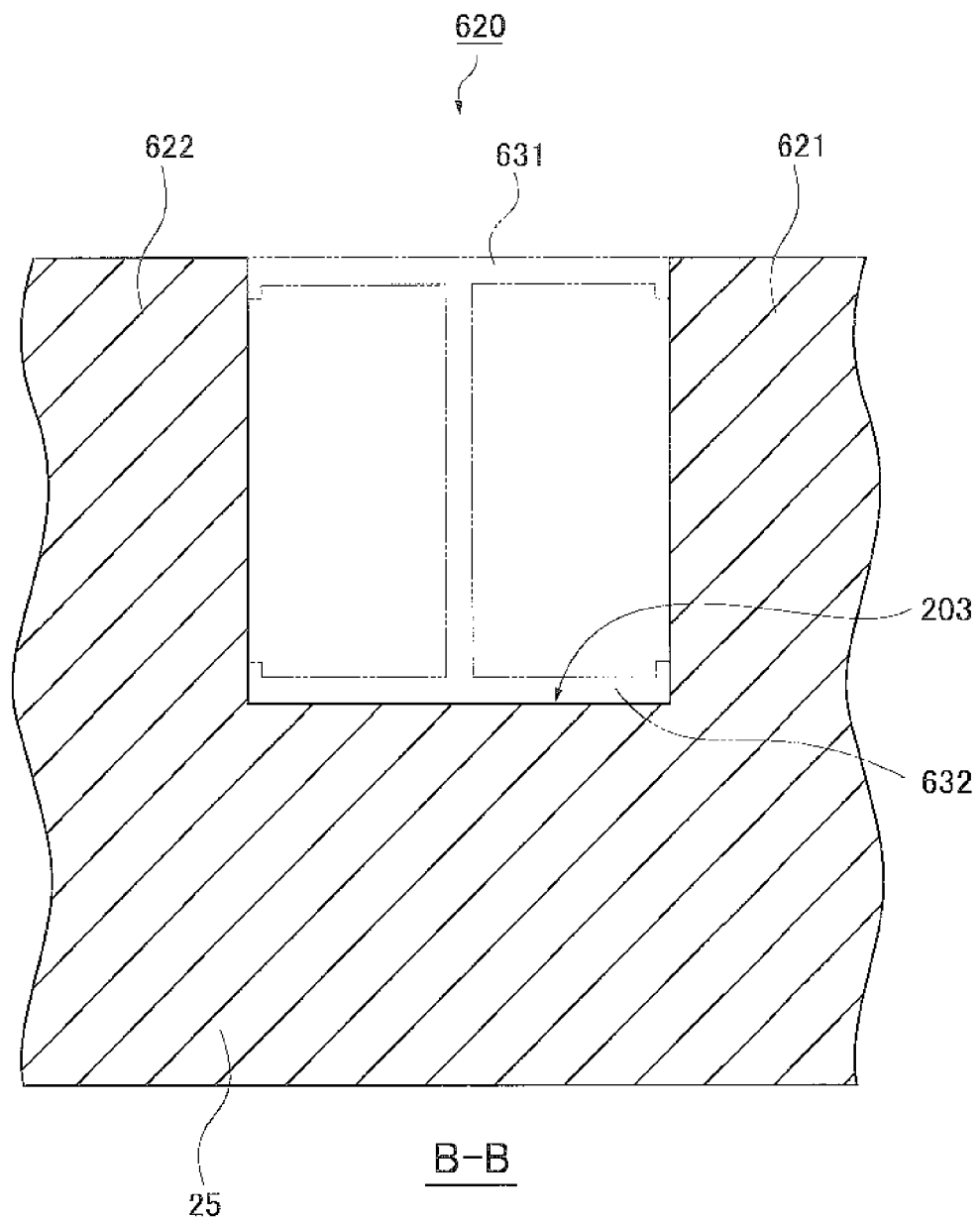
FIG. 21 is a cross-sectional view taken along a line B-B shown in FIG. 18.

As shown in FIG. 19, FIG. 21, and FIG. 24, the accommodating portion 620 has the connecting portion 203 connecting the first foamed portion 621 and the second foamed portion 622. The connecting portion 203 is provided so as not to make the first foamed portion 621 and the second foamed portion 622 separate from each other with the reinforcing material 63 interposed therebetween, and is provided to maintain an integral structure of the foam 62 before and after the reinforcing material 63 is accommodated in the accommodating portion 620. The connecting portion 203 is formed in the accommodating portion 620. Therefore, before and after the reinforcing material 63 is accommodated in the foam 62, there is no positional displacement between the first foamed portion 621 and the second foamed portion 622 with the reinforcing material 63 as a boundary. Therefore, dimensional accuracy of the foam 62 is high.

In the foam 62 of the present embodiment, the accommodating portion 620 and the raised portion 25 overlap each other in a plan view of the foam 62. Therefore, as shown in FIG. 24, the connecting portion 203 and the raised portion 25 have an integral structure. The connecting portion 203 is formed near the both ends in the longitudinal direction of the accommodating portion 620 (that is, near the opening 200), and supports both ends of the second plate 632 of the reinforcing material 63. This makes it possible to stably accommodate the reinforcing material 63 in the accommodating portion 620. That is, in FIG. 24, the reinforcing material 63 can be supported by the projecting portions 201 and 202 and the connecting portion 203 (at different positions in the longitudinal direction of the accommodating portion 620) in both an upward direction and a downward direction in FIG. 24. Therefore, after the reinforcing material 63 is accommodated in the accommodating portion 620, the reinforcing material 63 can be stably supported.

Figure 22:
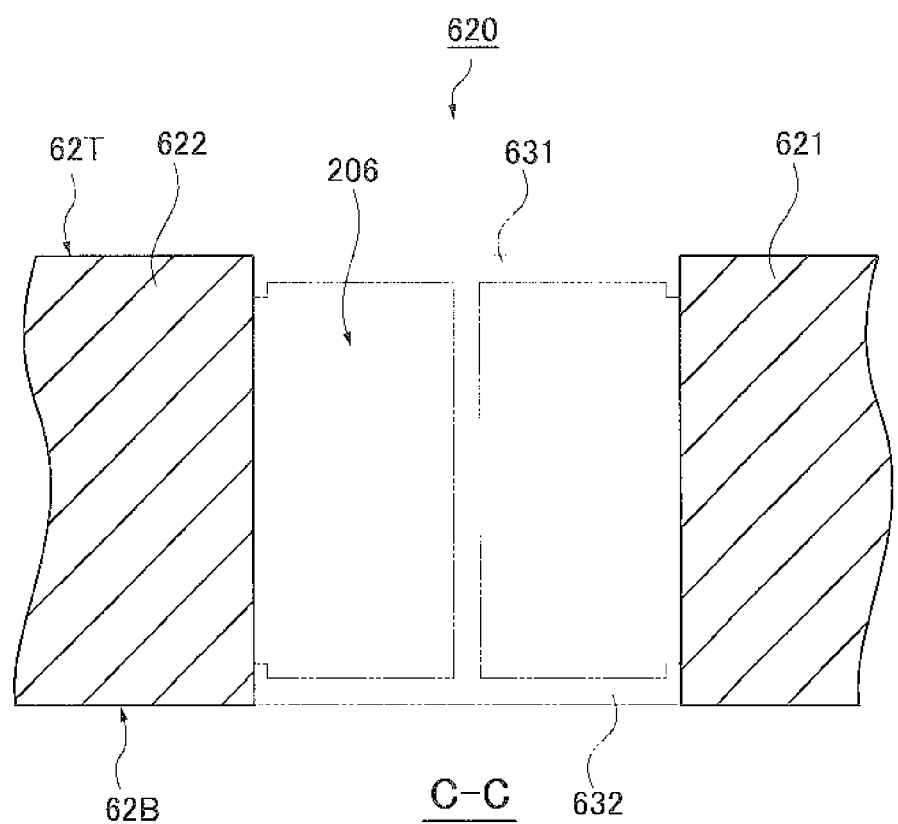
FIG. 22 is a cross-sectional view taken along a line C-C shown in FIG. 18.

As shown in FIGS. 19 and 22, a through-hole 206 is formed in the accommodating portion 620. The through-hole 206 is adjacent to one end in the longitudinal direction of the projecting portions 201 and 202 and penetrates the front surface 62T and the back surface 62B of the foam 62. In an example of the accommodating portion 620 of the present embodiment, the through-hole 206 is formed between both ends in the longitudinal direction of the projecting portions 201 and 202 and the connecting portion 203. By providing the through-hole 206 adjacent to the one end in the longitudinal direction of the projecting portions 201 and 202, it is easy to insert the reinforcing material 63 into the projecting portions 201 and 202 from the first opening 200L or the second opening 200R as described below.

(3-3) Method of Molding Foam

Figure 25A:
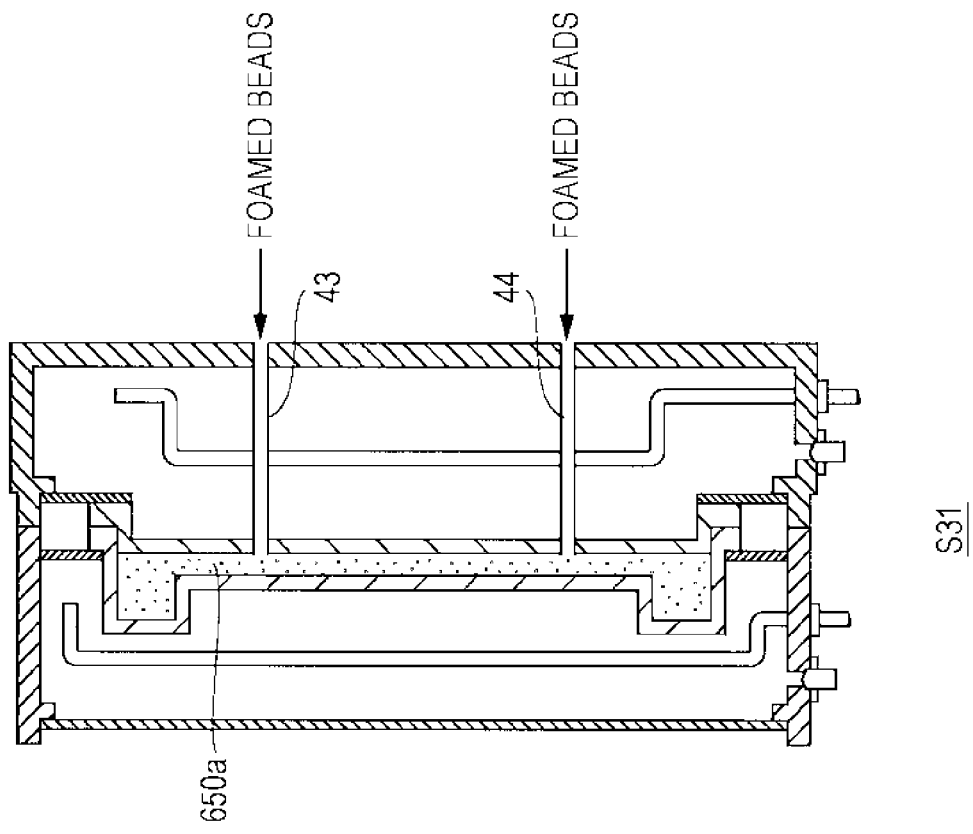
FIG. 25A is a view for explaining a step of molding the foam of the third embodiment.
Figure 25A:
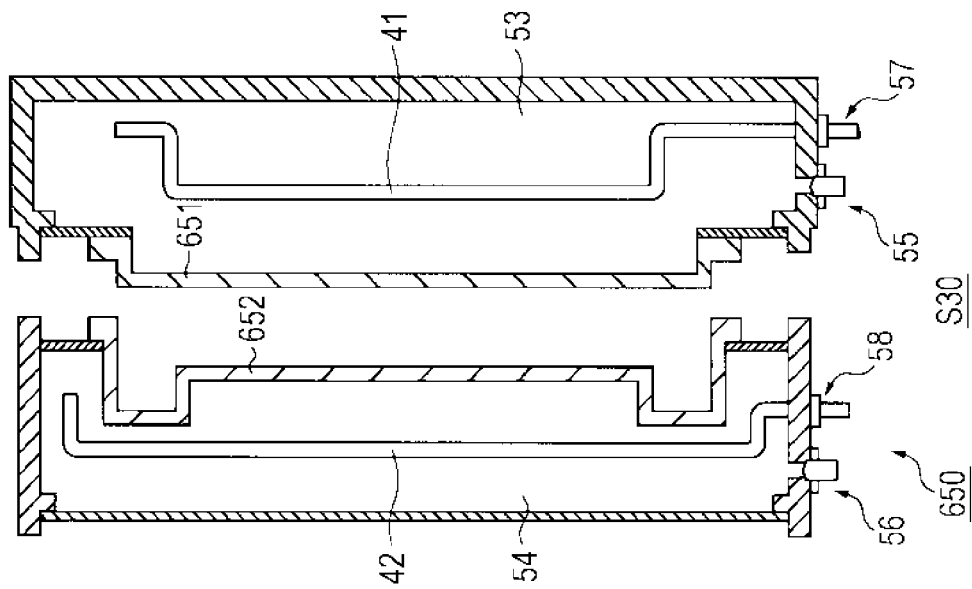

Next, a method of molding the foam 62 of the present embodiment will be described with reference to FIGS. 25A and 25B. FIGS. 25A and 25B are views for explaining steps of molding the foam 62 of the embodiment.

The foam 62 is molded by the bead method in-mold foam molding method using a molding apparatus 650 shown in FIGS. 25A and 25B. As shown in Step S30 of FIG. 25A, the molding apparatus 650 is provided with molds 651 and 652 facing each other. The molds 651 and 652 respectively constitute parts of empty chambers 53 and 54. Cooling pipes 41 and 42 are arranged in the empty chambers 53 and 54.

In FIG. 25A, when the molds 651 and 652 are closed from a state shown in Step S30, an enclosed space 650a is formed by the molds 651 and 652 as shown in Step S31. With the molds 651 and 652 closed, foamed beads are filled through feeders 43 and 44.

An amount of the foamed beads to be filled is, for example, 105 to 110% of the volume of the enclosed space 650a. Next, as shown in Step S32 of FIG. 25B, steam (for example, a steam pressure of 3.0 to 3.5 kgf/cm2) is injected into the empty chambers 53 and 54 from steam injection ports 55 and 56, for example, for 10 to 30 seconds. The steam enters gaps between cells in the foamed beads from fine pores formed in the mold and fuses the beads to each other. Then, as shown in Step S33 of FIG. 25B, cooling water is injected into the cooling pipes 41 and 42 from cooling water inlets 57 and 58 and sprayed onto the molds 651 and 652. In this way, the molds 651 and 652 and the foam 62 are cooled to solidify the foam 62. Then, as shown in Step S34 of FIG. 25B, the mold is opened and the foam 62 is taken out. The foam 62 is then placed in a room, for example, at 50 to 70° C. for 12 to 24 hours, thereby promoting curing and inhibiting sink marks and deformation of the foam 62.

As shown in FIGS. 18 and 19, the through-hole 206 is provided between the projecting portions 201 and 202 and the connecting portion 203 in the longitudinal direction of the accommodating portion 620. This is also to enable opening and closing of the molds 651 and 652. If the projecting portions 201 and 202 are extended to the outside of the state shown in FIGS. 18 and 19 and a part of the projecting portions 201 and 202 overlap the connecting portion 203 in a plan view of the foam 62, a part of the projecting portions 201 and 202 is an undercut. As a result, the mold cannot be opened or closed (an opening and closing direction of the mold is a direction perpendicular to a paper surface in FIG. 18).

(3-4) Method of Assembling Foamed Structure

Figure 26A:
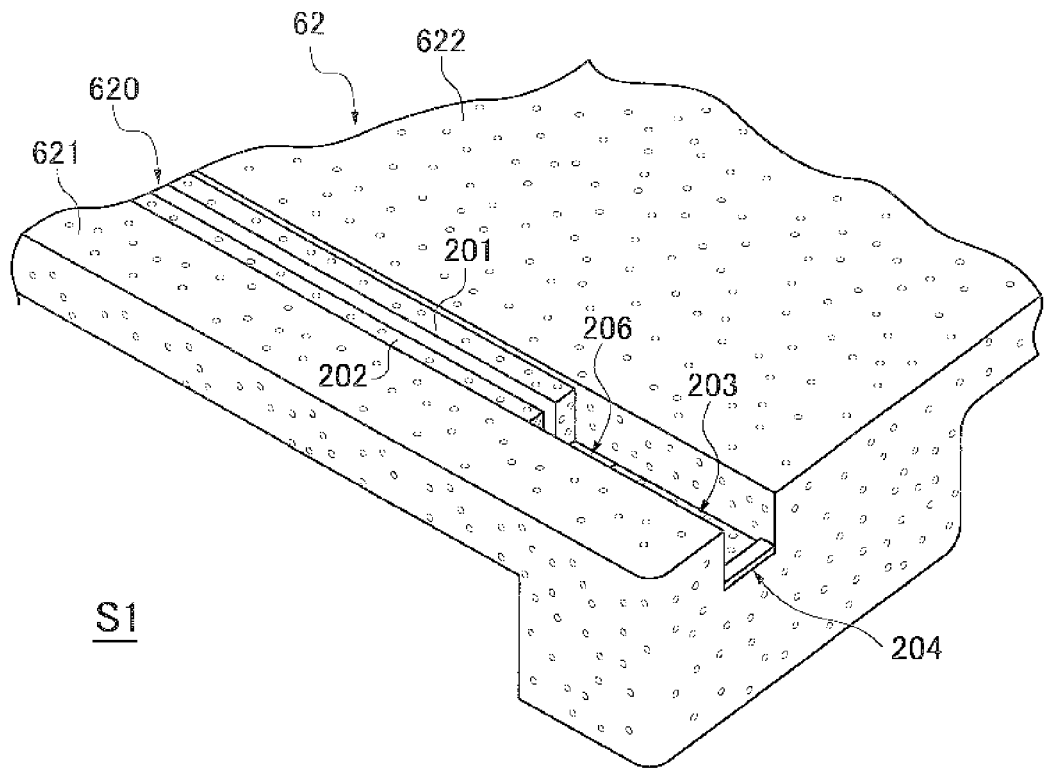
FIG. 26A is a view for explaining a procedure of attaching the reinforcing material to the foam of the third embodiment.
Figure 26A:
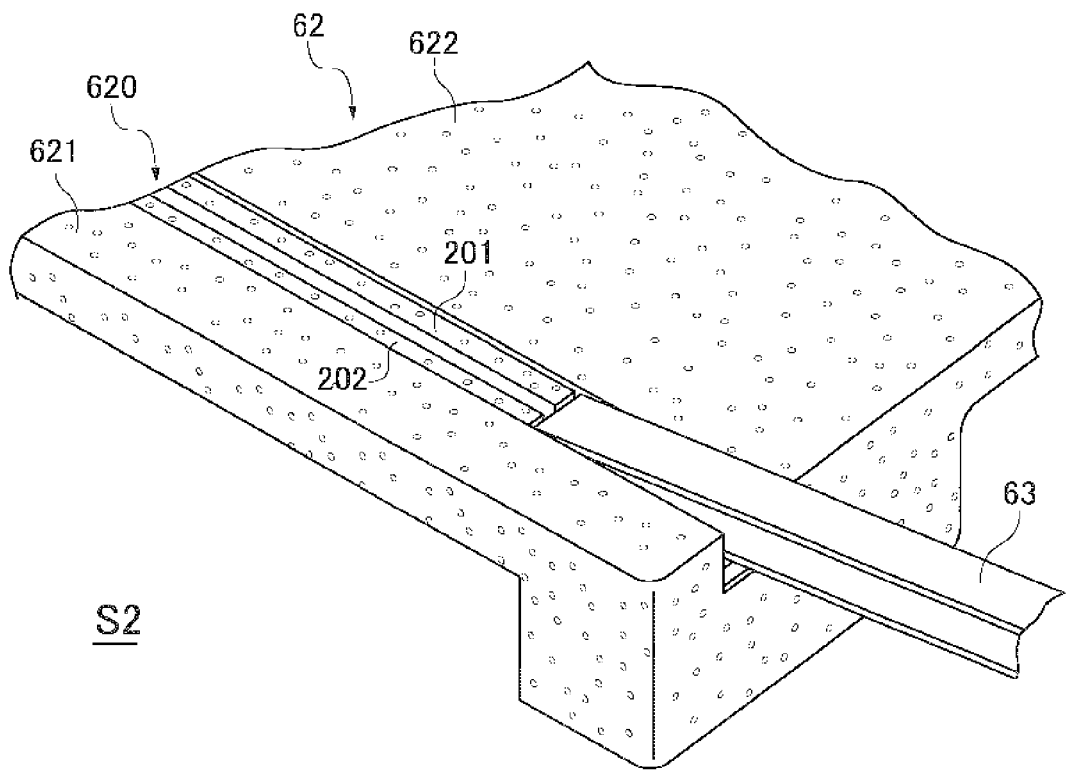
Figure 26B:
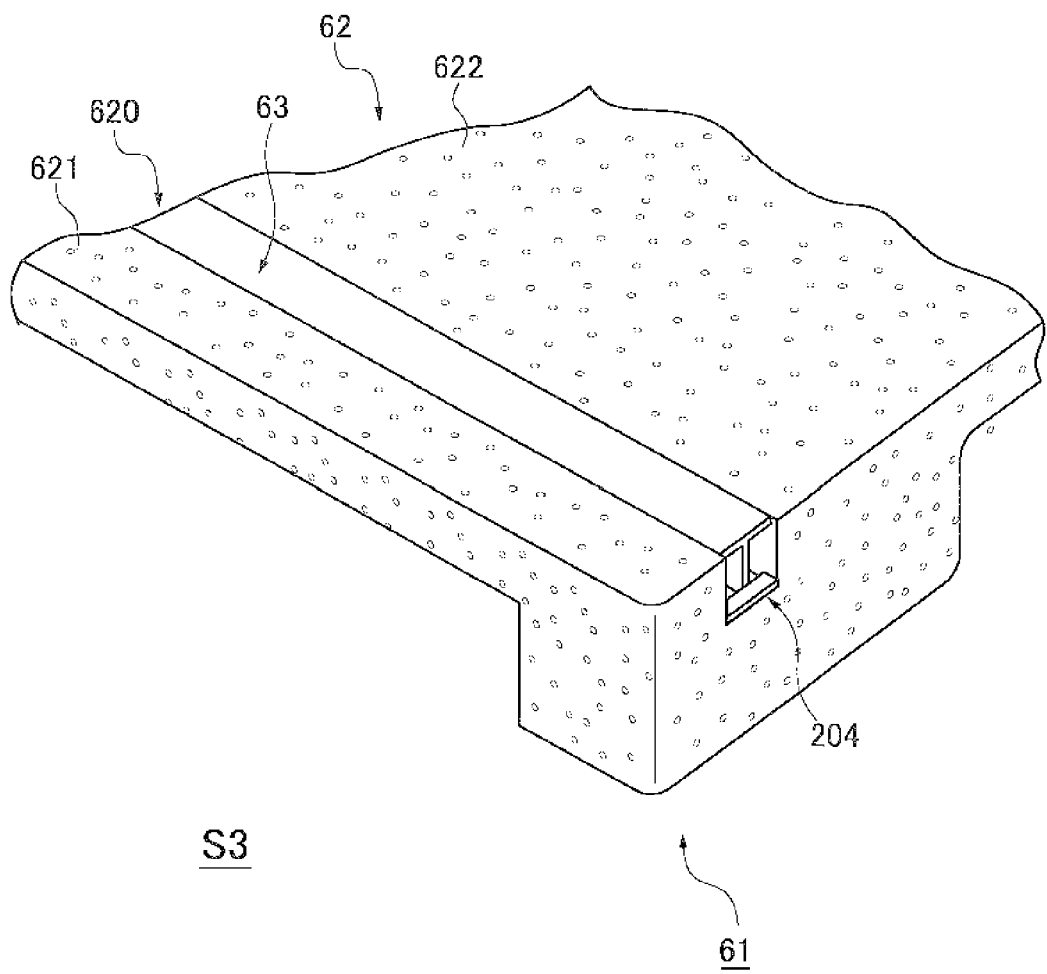
FIG. 26B is a view for explaining the procedure of attaching the reinforcing material to the foam of the third embodiment.

Next, a method of assembling the foamed structure 61 of the present embodiment will be described with reference to FIGS. 26A and 26B. FIGS. 26A and 26B are views for explaining a procedure for assembling the foamed structure 61 by attaching (inserting) the reinforcing material 63 to the foam 62 of the present embodiment.

As shown in FIG. 26A, to the foam 62 to which the reinforcing material 63 is not attached (Step S1), the reinforcing material 63 is inserted toward end portions of the projecting portions 201 and 202 from the first opening 200L of the first side surface 24L or the second opening 200R of the second side surface 24R so that the tip end of the reinforcing material 63 is obliquely downward (Step S2).

As described above, a through-hole 206 is formed adjacent to the one end in the longitudinal direction of the projecting portions 201 and 202 and penetrates the front surface 62T and the back surface 62B of the foam 62. Therefore, in Step S2, the tip end of the reinforcing material 63 is inserted into the through-hole 206, and the first plate 631 and the second plate 632 of the reinforcing material 63 can be respectively smoothly introduced into the groove g1 (see FIG. 23) on the front surface 62T side and the groove g2 (see FIG. 23) on the back surface 62B side, which are formed by the projecting portions 201 and 202. After the first plate 631 and the second plate 632 of the reinforcing material 63 are respectively introduced into the grooves g1 and g2, the reinforcing material 63 is further pushed in an insertion direction. At this time, as described above, the gaps are respectively formed between the main body (the portion other than the projection 6311) of the first plate 631 and the surface of the projecting portion 201, and between the main body (the portion other than the projection 6321) of the second plate 632 and the surface of the projecting portion 202. Therefore, an insertion resistance is small. As a result, the reinforcing material 63 can be pushed into the accommodating portion 620 with a relatively small pushing force.

Finally, the tip end of the reinforcing material 63 contacts the projection 204. Then, as shown in Step S3 of FIG. 26B, both ends of the reinforcing material 63 are set between the projections 204 at both ends of the accommodating portion 620. In this way, the reinforcing material 63 is accommodated in the accommodating portion 620.

Note that a length of the through-hole 206 in the longitudinal direction of the accommodating portion 620 may be appropriately set from a viewpoint of ease of insertion of the reinforcing material 63.

(3-5) Method of Molding Resin Panel

Next, referring to FIGS. 27 and 28, an apparatus and a method for molding the resin panel 600 of the present embodiment using the mold will be described.

Figure 27:
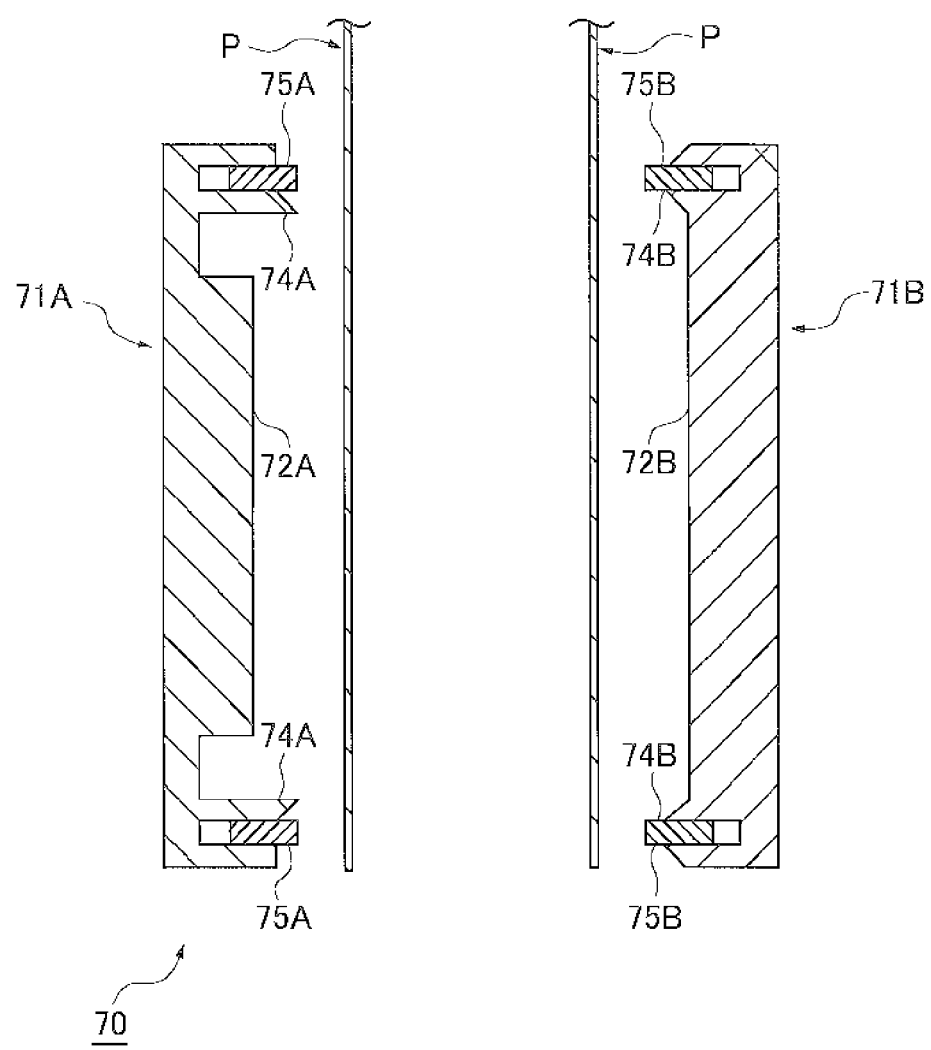
FIG. 27 is a view showing a method of molding the resin panel of the third embodiment.
Figure 28:
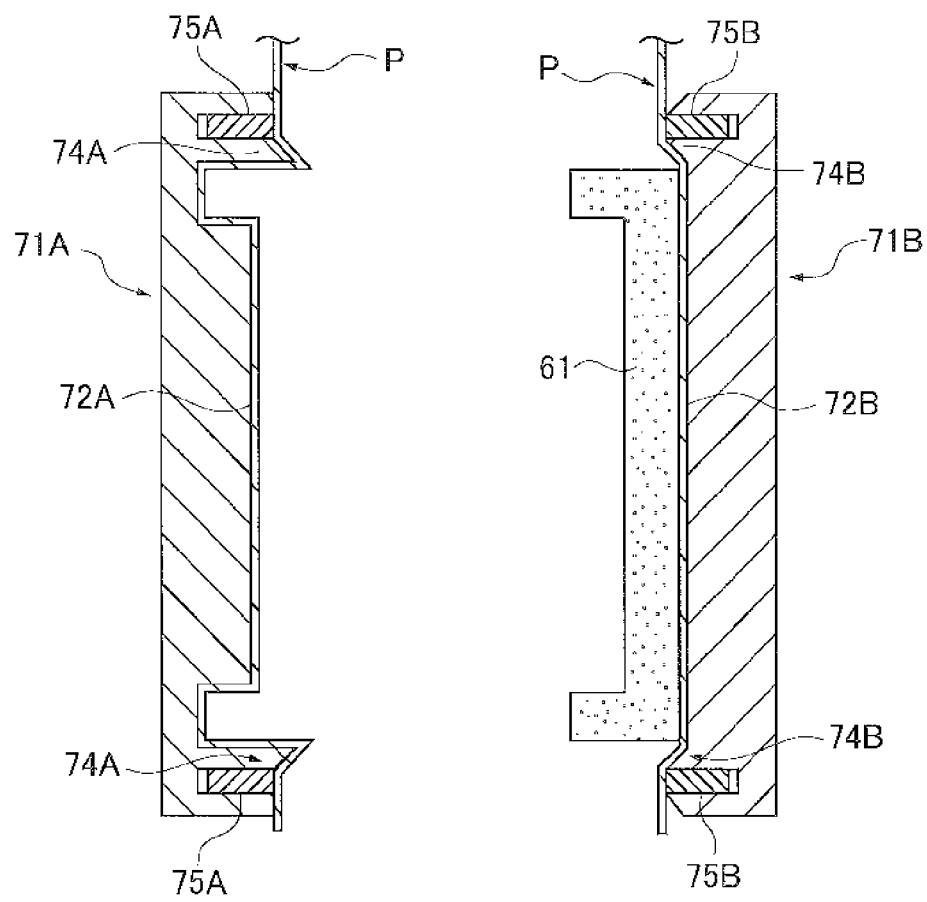
FIG. 28 is a view showing the method of molding the resin panel of the third embodiment.

Referring to FIG. 27, a clamping machine 70 has a pair of split mold blocks 71A and 71B to be moved between the open position and the closed position in a direction substantially perpendicular to the molten resin sheets P and P extruded vertically downward from the extruding machine (not shown). The pair of split mold blocks 71A and 71B is arranged in a state where the corresponding forming surfaces 72A and 72B face each other. The forming surface 72A has a shape corresponding to the front surface 62T of the foam 62.

Pinch-off parts 74A and 74B are respectively formed near the upper and lower ends of the forming surfaces 72A and 72B respectively corresponding to the pair of split mold blocks 71A and 71B. The pinch-off parts 74A and 74B are respectively annularly formed around the forming surfaces 72A and 72B, and project toward the split mold blocks 71B and 71A facing each other. Thus, when clamping the pair of split mold blocks 71A and 71B, apex portions of the respective pinch-off parts 74A and 74B are brought into contact with each other so that parting lines PL are formed on the peripheral edges of the molten resin sheets P and P.

In the pair of split mold blocks 71A and 71B, sliding portions 75A and 75B are provided so as to project from the forming surfaces 72A and 72B around the forming surfaces 72A and 72B. The sliding portions 75A and 75B are provided so that their end surfaces are brought into contact with the molten resin sheets P and P in a state of projecting from the forming surfaces 72A and 72B, and thus an enclosed space is formed between the molten resin sheets P and P and the forming surfaces 72A and 72B of the pair of split mold blocks 71A and 71B.

The vacuum chamber (not shown) is incorporated in the pair of split mold blocks 71A and 71B. The vacuum chamber is connected to a vacuum pump and a vacuum tank (none of which are shown). A communication path (not shown) for vacuum suction is provided between the vacuum chamber and the forming surfaces 72A and 72B.

The pair of split mold blocks 71A and 71B is driven by a mold driving device (not shown) so as to be movable between the open position and the closed position. In the open position, two continuous molten resin sheets P and P can be disposed with a space from each other between the pair of split mold blocks 71A and 71B. The two molten resin sheets P and P are the skin material sheets SA and SB in the resin panel 600 after molding. In the closed position, the pinch-off parts 74A and 74B of the pair of split mold blocks 71A and 71B are in contact with each other.

Next, a method of molding the resin panel 600 will be described.

First, as shown in FIG. 27, the molten resin sheets P and P are extruded vertically downward from the extruding machine and supplied to between the forming surfaces 72A and 72B of the pair of split mold blocks 71A and 71B. At this point, the pair of split mold blocks 71A and 71B is in the open position.

Next, the sliding portions 75A and 75B around the forming surfaces 72A, 72B are projected, so that their end surfaces are brought into contact with the molten resin sheets P and P. Thus, the enclosed space is formed between the molten resin sheets P and P and the forming surfaces 72A and 72B of the pair of split mold blocks 71A and 71B. Then, air in the enclosed space is sucked through the communication path provided between the vacuum chamber and the forming surfaces 72A and 72B. By this suction, the two molten resin sheets P and P are respectively pressed against the forming surfaces 72A and 72B of the pair of split mold blocks 71A and 71B. As shown in FIG. 28, the molten resin sheets are shaped (formed) into a shape along the forming surfaces 72A and 72B, that is, a substantially outer shape of the resin panel 600.

Next, using the manipulator (not shown), the foamed structure 61 is positioned between the pair of split mold blocks 71A and 71B. Then, as shown in FIG. 28, the foamed structure 61 is inserted from the side so as to be pressed against one of the split mold blocks (the split mold block 71B in FIG. 28). Thus, the foamed structure 61 is welded to one molten resin sheet P.

Thereafter, the pair of split mold blocks 71A and 71B moves from the open position to the closed position, to be clamped. Thus, the foamed structure 61 which has been welded to the one molten resin sheet P (the right side in the drawing) is also welded to the other molten resin sheet P (the left side in the drawing). Further, the peripheral edge of the pair of molten resin sheets P and P is welded at the pinch-off parts 74A and 74B of the pair of split mold blocks 71A and 71B. Thus, the parting lines PL are formed.

Finally, by moving the pair of split mold blocks 71A and 71B to the open position again, the molded resin panel 600 separates from the forming surfaces 72A and 72B. Then, the burrs formed around the parting lines PL are cut and removed by the cutter or the like. Thus, the resin panel 600 in which the skin material sheet SA, the foamed structure 61, and the resin sheet SB are laminated is completed.

The third embodiment of the present invention has been described in detail above. However, the foamed structure and the resin panel of the present invention are not limited to the above embodiment. Of course, various improvements or modifications can be made without departing from the scope of the present invention.

A modification of the third embodiment will be described below.

Modification 1

In the above-described embodiment, a case where the first opening 200L of the first side surface 24L and the second opening 200R of the second side surface 24R are formed at the both ends of the accommodating portion 620 has been described. However, the present invention is not limited to this, as long as either one of the first opening 200L or the second opening 200R is formed, it is easy to insert the reinforcing material 63 into the accommodating portion 620.

The both ends of the accommodating portion 620 may not be open. For example, by setting an opening amount in the longitudinal direction of the accommodating portion 620 to be long in one of the through-holes 206L and 206R adjacent to one end of the projecting portions 201 and 202, the reinforcing material 63 can be inserted into the projecting portions 201 and 202 from either one of the through-holes 206L and 206R.

Modification 2

In the above-described embodiment, an example in which the connecting portion 203 and the projection 204 have an integral structure has been described. However, the present invention is not limited to this, and the connecting portion 203 and the projection 204 may be separate bodies. For example, in a plan view of FIG. 19, a through-hole penetrating the front surface 62T and the back surface 62B may be formed between the connecting portion 203 and the projection 204.

Note that, as in the above-described embodiment, by having the integral structure of the connecting portion 203 and the projection 204, a structure in which the end surface of the reinforcing material 63 is supported by both the first foamed portion 621 and the second foamed portion 622 is obtained. Therefore, it is possible to stably accommodate the reinforcing material 63.

Modification 3

In the above-described embodiment, a case where the projections 204L and 204R are respectively formed near the first opening 200L and the second opening 200R has been described. However, the present invention is not limited to this, and at least one of the projections 204L and 204R may be provided inside the position shown in FIG. 19 (that is, on the projecting portions 201 and 202 side) in the longitudinal direction of the accommodating portion 620. In that case, a length in the longitudinal direction of the reinforcing material 63 is set so that the second plate 632 of the reinforcing material 63 is in contact with the projection 204L and/or the projection 204R.

Modification 4

In the above-described embodiment, a case where the reinforcing material 63 having the H-shaped cross-section is attached to the foam has been described. However, a shape of the reinforcing material is not limited thereto.

Figure 29A:
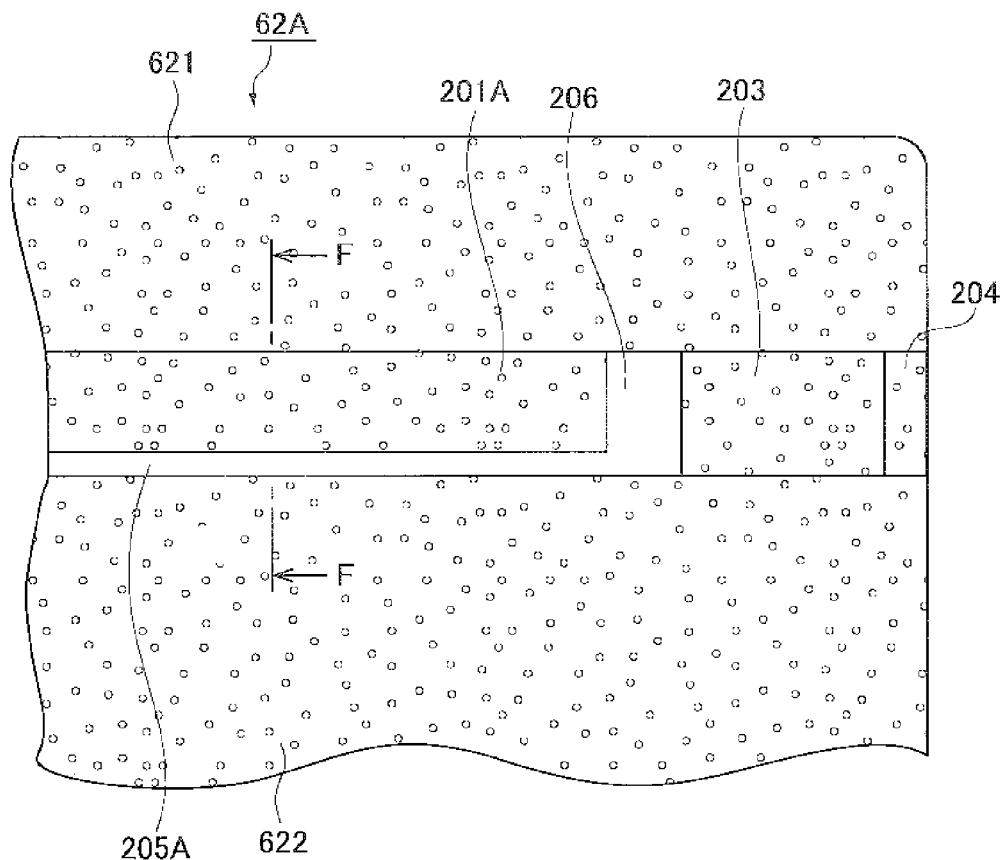
FIG. 29A is a view showing a modification of the foam of the third embodiment.
Figure 29B:
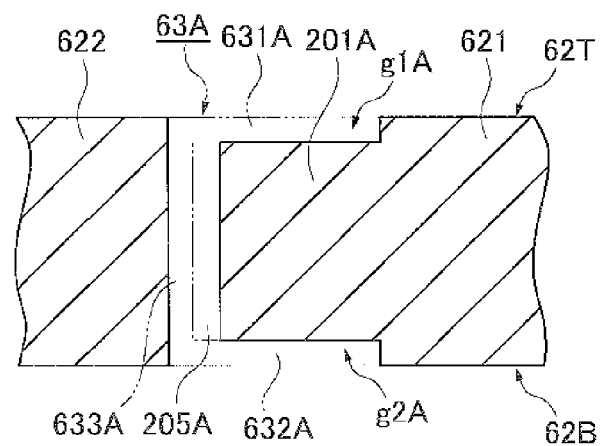
FIG. 29B is a cross-sectional view taken along a line F-F shown in FIG. 29A.

FIGS. 29A and 29B show a foam 62A according to a modification of the embodiment. FIG. 29A shows a plan view corresponding to FIG. 19. FIG. 29B shows a cross-sectional view taken along a line F-F in FIG. 29A.

As shown in FIG. 29B, in the reinforcing material 63A according to the modification, the first plate 631A and the second plate 632A which are linearly extended while facing each other are connected by a connecting plate 633A. As a result, its cross-section is in a U shape.

As shown in FIGS. 29A and 29B, a projecting portion 201A projects from the first foamed portion 621 toward the second foamed portion 622 in a portion where the first foamed portion 621 and the second foamed portion 622 are not connected (that is, a portion where through-holes 205A and 206 are provided in the longitudinal direction of the projecting portion 201A in FIG. 29A). In this modification, there is no projecting portion projecting from the second foamed portion 622 toward the first foamed portion 621.

As shown in FIG. 29B, the thickness of the projecting portion 201A is less than the thickness of the first foamed portion 621. Thus, a groove g1A and a groove g2A are formed on the front surface 62T side and the back surface 62B side. The first plate 631A and the second plate 632A of the reinforcing material 63A are respectively arranged in the groove g1A on the front surface 62T side and the groove g2A on the back surface 62B side.

Even with such a structure, in a state where the reinforcing material 63A is accommodated in the foam 62A, the projecting portion 201A is in a state of being interposed between the first plate 631A and the second plate 632A of the reinforcing material 63A in the thickness direction of the foam 62A. Therefore, after the reinforcing material 63A is attached to the foam 62A, the movement of the reinforcing material 63A in the direction perpendicular to the front surface 62T and the back surface 62B of the foamed body 62A is restricted by the projecting portion 201A. Therefore, the reinforcing material 63A does not fall off in the direction. Furthermore, as in the above-described embodiment, the connecting portion 203 connecting the first foamed portion 621 and the second foamed portion 622 is provided. Therefore, there is no positional displacement between the first foamed portion 621 and the second foamed portion 622 with the reinforcing material 63A as the boundary before and after the reinforcing material 63A is accommodated in the foam 62A. As a result, the dimensional accuracy of the foam 62A is high.

Modification 5

In the foamed structure 61 of the above-described embodiment, the raised portions 25L and 25R are formed according to the shape of the resin panel 600. However, the shape of the foamed structure is not limited to this example but is appropriately designed according to the shape of the resin panel. For example, the foamed structure may be made of only a flat portion. Even when the foamed structure is made of only the flat portion, as long as the first foamed portion 621 and the second foamed portion 622 are connected by the connecting portion 203, there is no positional displacement between the first foamed portion 621 and the second foamed portion 622 with the reinforcing material 63 as the boundary. As a result, an effect that the dimensional accuracy of the foam 62 is high is obtained.

When at least a part of the accommodating portion 620 of the reinforcing material 63 overlaps the raised portion 25 in a plan view of the foam 62 like the foamed structure 61 of the above-described embodiment, it is difficult to adopt a conventional method, that is, a method of assembling the separate first foamed portion 621 and the second foamed portion 622 to the reinforcing material 63 from both sides thereof. Therefore, it is forced to adopt another method which causes deterioration of shape accuracy and/or cost increase, such as forming the raised portion 25 separately from the flat portion 623. In contrast, by applying the present invention to the foamed structure 61, there is an advantage that it is possible to set the accommodating portion 620 of the reinforcing material 63 at a position where at least a part of the accommodating portion 620 of the reinforcing material 63 overlaps the raised portion 25 in a plan view of the foam 62.

Even in the foamed structure having the raised portion, the position of the reinforcing material can be set to a desired position. For example, in a plan view of the foam, at least a part of the accommodating portion of the reinforcing material may not necessarily overlap the projecting portion. In other words, by applying the present invention, it is possible to set the reinforcing material to the desired position in the foamed structure having the flat portion and the raised portion. Therefore, design freedom is improved.

Modification 6

In the above-described embodiment, a case where the projecting portion 201 and the projecting portion 202 are formed at a portion where the first foamed portion 621 and the second foamed portion 622 of the foam 62 are not connected has been described. However, the present invention is not limited to this, for example, as shown in a plan view of FIG. 19, both of the projecting portions 201 and 202 and the connecting portion 203, which are separated from each other with the through-hole 206 interposed therebetween, may be overlapped with each other in a plan view. For example, when a plate thickness of the foam 62 is large, it is possible to form a connecting portion at a portion near the front surface or the back surface, and further, a projecting portion at a center in a plate thickness direction.

(4) Fourth Embodiment

Hereinafter, a resin panel 81 according to a fourth embodiment of the present invention and an interior material 810 installed in the resin panel 81 will be described. The interior material 810 for the resin panel 81 is an example of the foamed structure of the present invention.

(4-1) Resin Panel 81 and Interior Material 810 for Resin Panel 81

Figure 30:
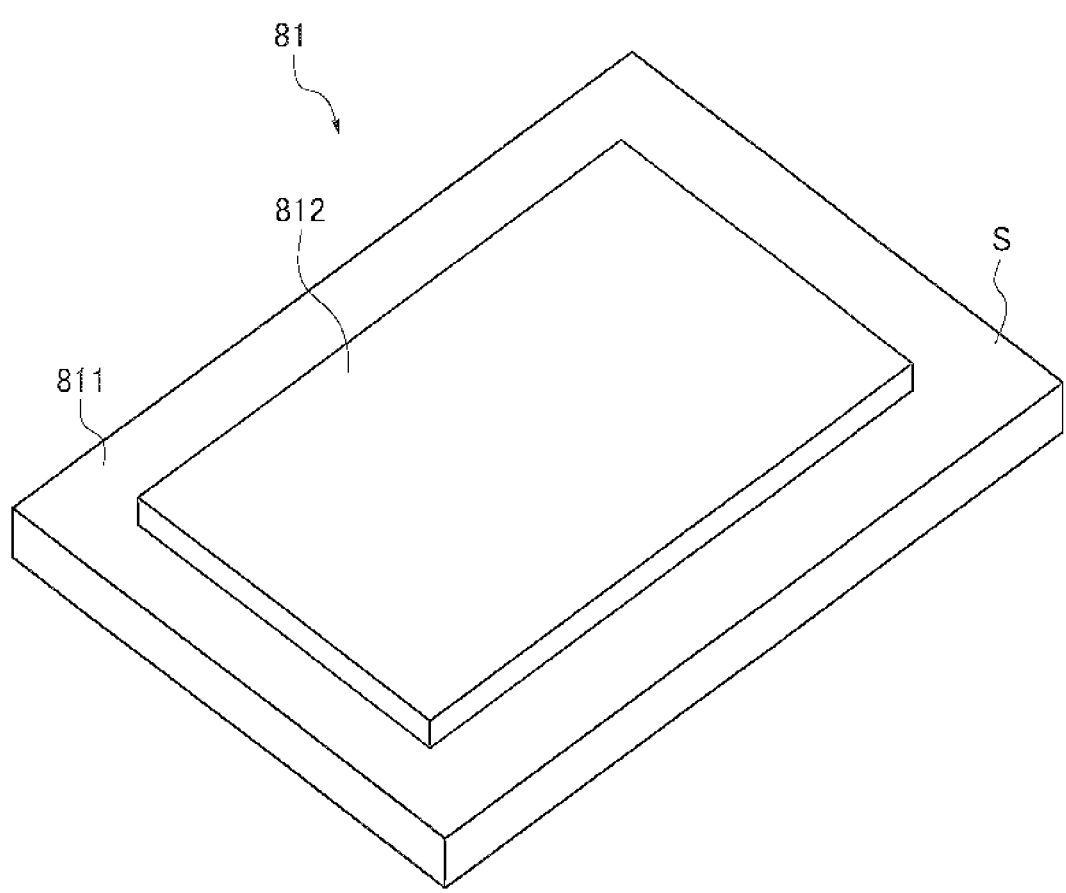
FIG. 30 is a perspective view of the back side of the resin panel of a fourth embodiment.
Figure 31:
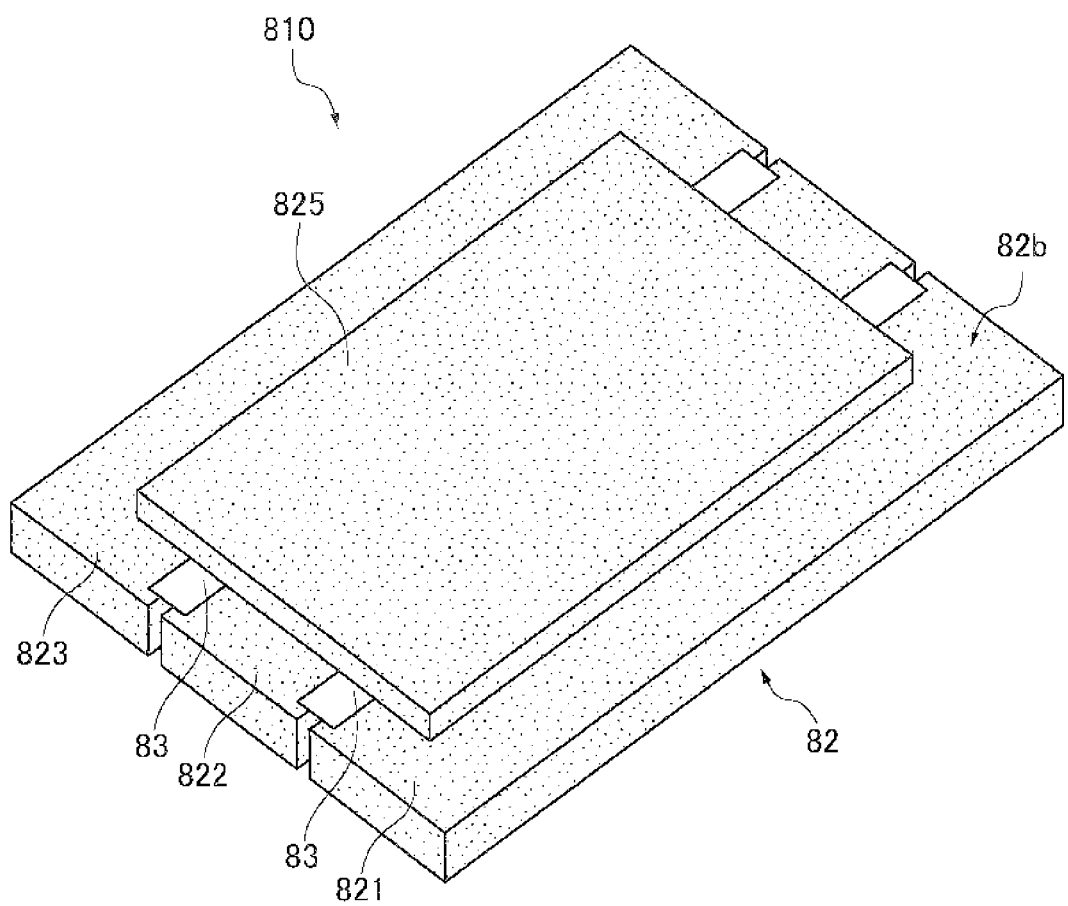
FIG. 31 is a perspective view of a back side of an interior material of the fourth embodiment.
Figure 32:
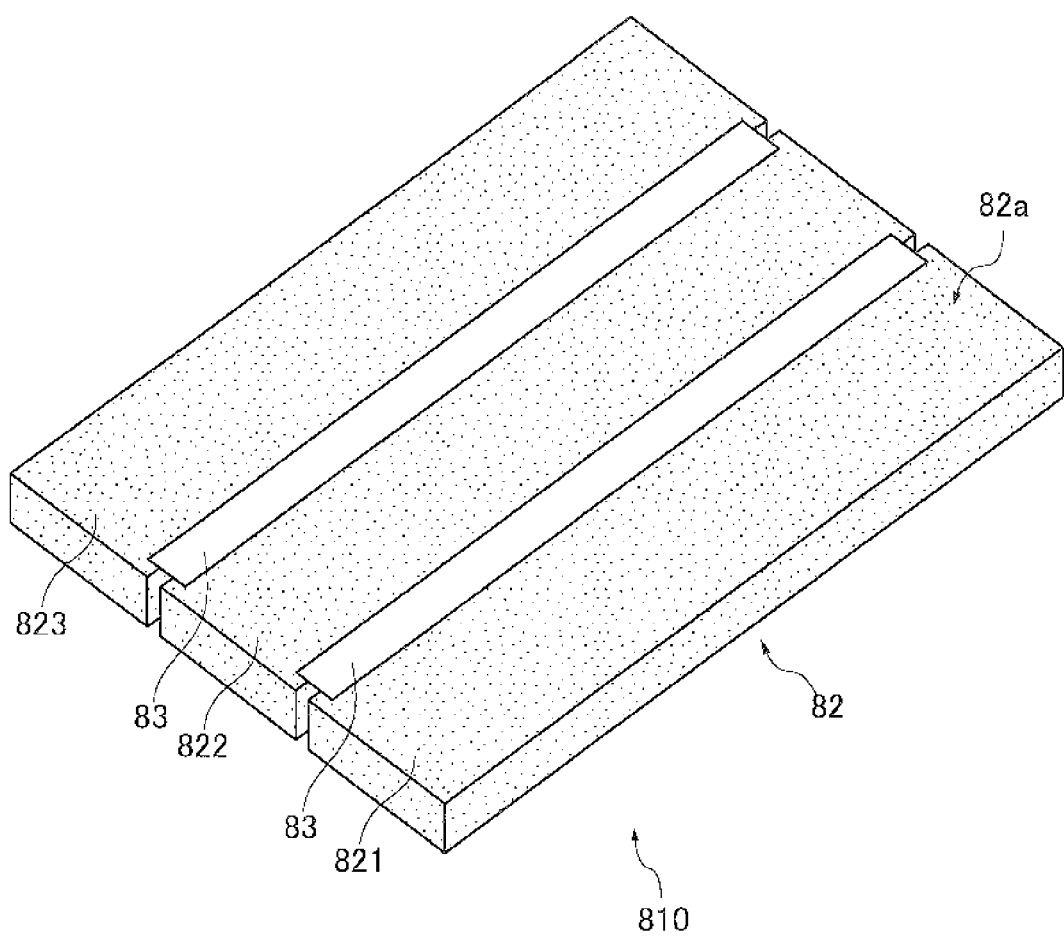
FIG. 32 is a perspective view of a front side of the interior material of the fourth embodiment.
Figure 33:
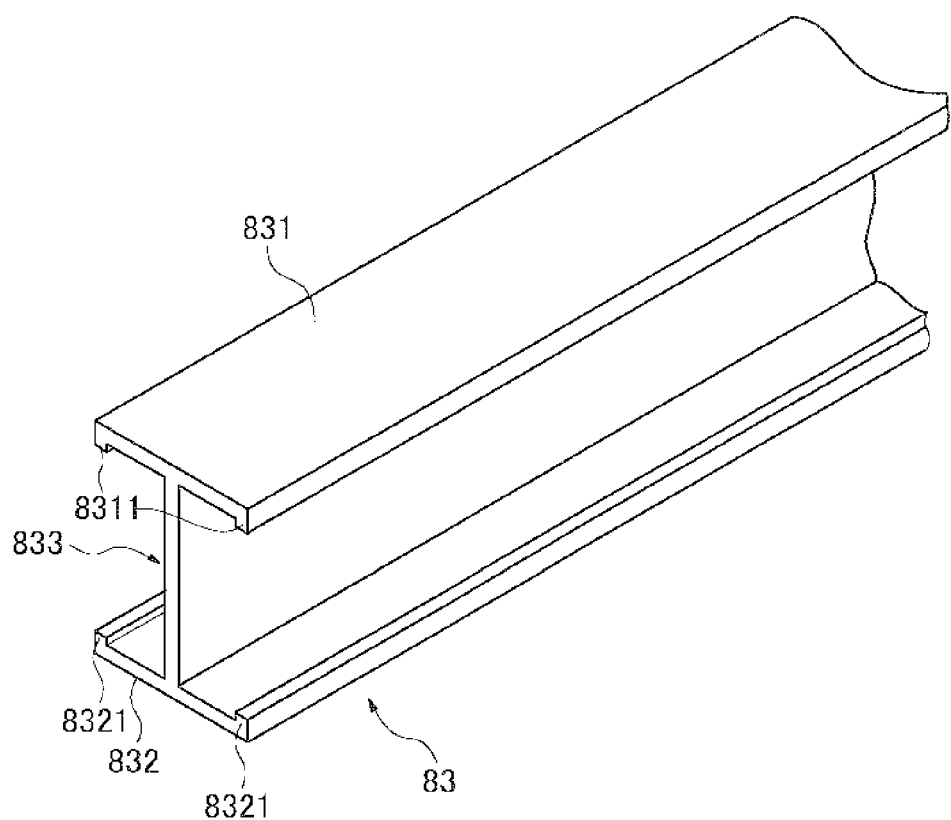
FIG. 33 is a perspective view of the reinforcing material incorporated in the interior material of the fourth embodiment.

First, structures of the resin panel 81 and the interior material 810 of the present embodiment will be described with reference to FIGS. 30 to 33. FIG. 30 is a perspective view of a back side of the resin panel 81 of the present embodiment. FIG. 31 is a perspective view of a back side of the interior material 810 of the present embodiment. FIG. 32 is a perspective view of a front side of the interior material 810 of the present embodiment. FIG. 33 is a perspective view of a reinforcing material 83 incorporated in the interior material 810.

As shown in FIGS. 30 and 31, a surface of the resin panel 81 according to the present embodiment is made of a skin material sheet S of the thermoplastic resin. The interior material 810 is installed in the resin panel 81. That is, the resin panel 81 has a structure including the interior material 810 covered with the skin material sheet S of the thermoplastic resin.

As shown in FIG. 30, an exemplary resin panel 81 in the present embodiment has a form including a raised portion 812 formed on a substantially rectangular parallelepiped base portion 811 on the back side.

In the resin panel 81 of the embodiment, the resin material of the skin material sheet S to be the skin material sheet is not limited. However, in order to ensure the stiffness of the resin panel 81, the resin panel 81 is preferably formed of the non-foamed resin. For example, in consideration of moldability, the resin material of the skin material sheet S may be the resin material obtained by mixing polystyrene (PS) and styrene ethylene butylene styrene block copolymer resin (SEBS) in polypropylene (PP) which is the main material.

As shown in FIGS. 31 and 32, the interior material 810 is a complex structure including a foam 82 including foamed portions 821 to 823 corresponding to a base portion 811 of the resin panel 81, and a foamed portion 825 corresponding to the raised portion 812 of the resin panel 81, and two reinforcing materials 83 fitted into the foam 82. The reinforcing materials 83 are respectively interposed between the foamed portion 821 and the foamed portion 822 and between the foamed portion 822 and the foamed portion 823.

As shown in FIG. 31, the foamed portion 825 rising from a back surface of the foamed portions 821 to 823 is formed on a back surface 82b of the foam 82. As shown in FIG. 32, a front surface 82a of the foam 82 is a substantially flat surface.

As shown in FIG. 33, the reinforcing material 83 includes a pair of elongated first plate-shaped portion 831 and a second plate-shaped portion 832 facing each other with a predetermined amount of gap interposed therebetween, and the connecting plate 33 connecting the first plate-shaped portion 831 and the second plate-shaped portion 832. In an example shown in FIG. 33, the reinforcing material 83 has an H-shaped cross-section (H-shaped reinforcement).

Projections 8311 projecting toward the second plate-shaped portion 832 are provided at both ends of the first plate-shaped portion 831. Projections 8321 projecting toward the first plate-shaped portion 831 are provided at both ends of the second plate-shaped portion 832.

A material of the reinforcing material 83 is not particularly limited. However, the reinforcing material 83 is preferably made of a metal such as aluminum or a hard plastic in order to secure the strength of the resin panel 81. The reinforcing material 83 is molded by, for example, extrusion molding.

A cross-sectional shape of the reinforcing material 83 is not limited to an illustrated shape. For example, the cross-sectional shape may be C shape, U shape, square pipe shape, circular pipe shape or the like. Any shape may be used as long as it can be fitted into and integrated with each foam.

In the resin panel 81 of the embodiment, the foamed portions 821 to 823 and 825 are molded using, for example, the thermoplastic resin. The resin material is not limited. For example, the resin materials include a polyolefin such as polypropylene or polyethylene, an acrylic derivative such as polyamide, polystyrene or polyvinyl chloride, or a mixture of two or more kinds. The expansion ratio of the foamed portions 821 to 823, 825 is not particularly limited. The expansion ratio is, for example, in a range of 1.5 to 60 times, typically 20 or 30 times, preferably 10 to 45 times, more preferably 15 to 35 times.

Examples of the foaming agent which can be used for the foamed portions 821 to 823, 825 in the resin panel 81 of the embodiment include known physical foaming agents, known chemical foaming agents, and mixtures thereof. Examples of applicable physical foaming agents include inorganic physical foaming agents such as air, carbonic acid gas or nitrogen gas, and organic physical foaming agents such as butane, pentane, hexane, dichloromethane, dichloroethane or the like. Examples of chemical foaming agents include organic foaming agents such as azodicarbonamide (ADCA), N, N'-dinitrosopentamethylenetetramine, 4,4'-oxybis (benzenesulfonylhydrazide), diphenylsulfone-3,3'-disulfonylhydrazide, p-toluenesulfonyl semicarbazide, trihydrazinotriazine or azobisisobutyronitrile, and inorganic foaming agents such as mixtures of polycarboxylic acid such as citric acid, oxalic acid, fumaric acid, phthalic acid, malic acid, tartaric acid, cyclohexane-1,2-dicarboxylic acid, camphoric acid, ethylenediaminetetraacetic acid, triethylenetraminehexaacetic acid or nitriloic acid and inorganic carbonate compound such as sodium hydrogencarbonate, aluminum sodium hydrogencarbonate, potassium hydrogencarbonate, ammonium hydrogencarbonate, or ammonium carbonate, or polycarboxylate such as citrate dihydrogen sodium hydrogen or potassium oxalate and the like.

For the purpose of increasing the stiffness and strength, the skin material sheet S and the foamed portions 821 to 823, 825 may be molded using the resin material mixed with the glass filler. As the glass filler, the same glass filler as the glass filler mentioned in the first embodiment may be used.

(4-2) Detailed Structure of Interior Material 810

Next, a detailed structure of the interior material 810 of the present embodiment will be described with reference to FIGS. 34 to 38.

(4-2-1) Structure of Foam 82

First, a structure of the foam 82 will be described with reference to FIGS. 34 to 38.

Figure 34:
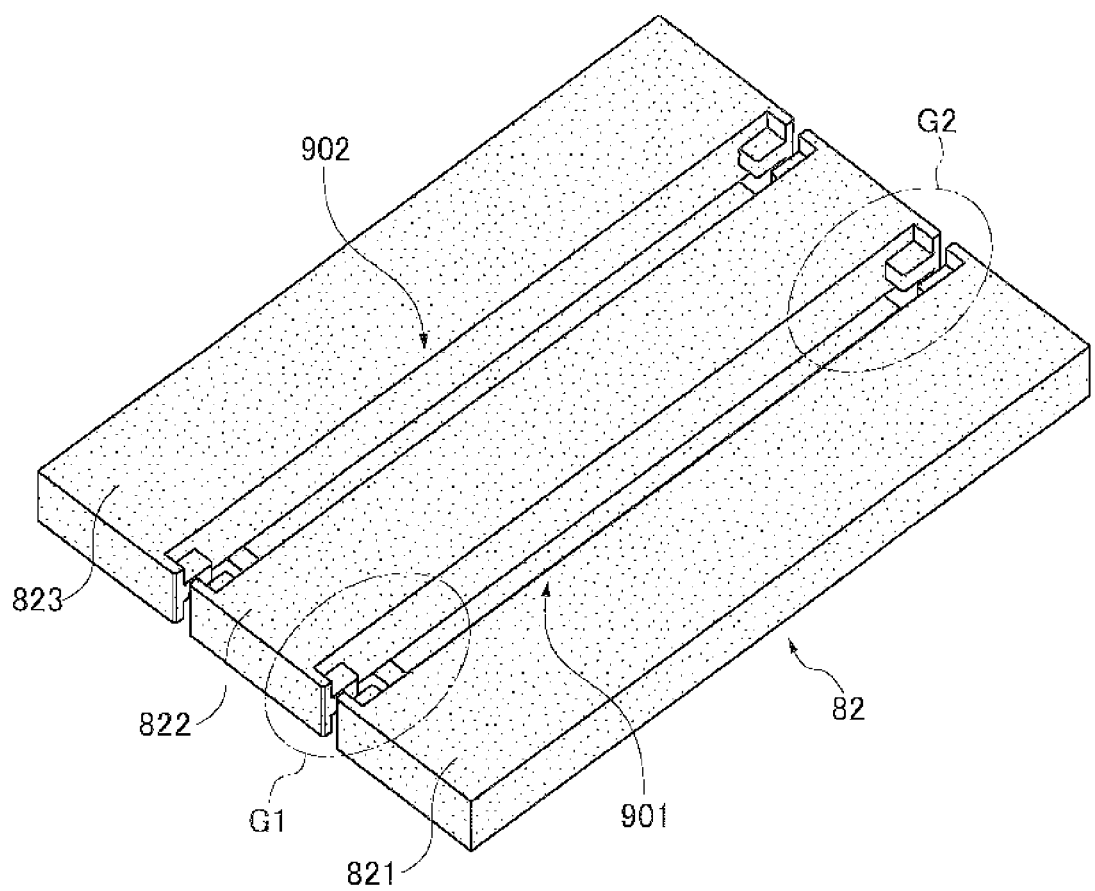
FIG. 34 is a perspective view of the front side of the foam of the fourth embodiment.
Figure 35A:
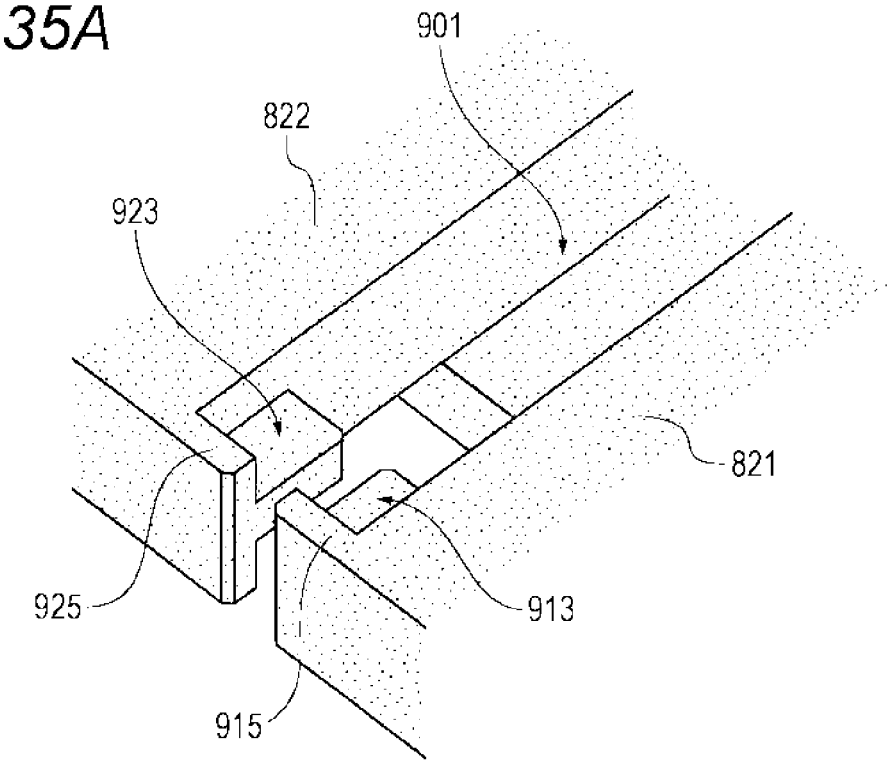
FIG. 35A is an enlarged view of a G1 portion of FIG. 34.
Figure 35B:
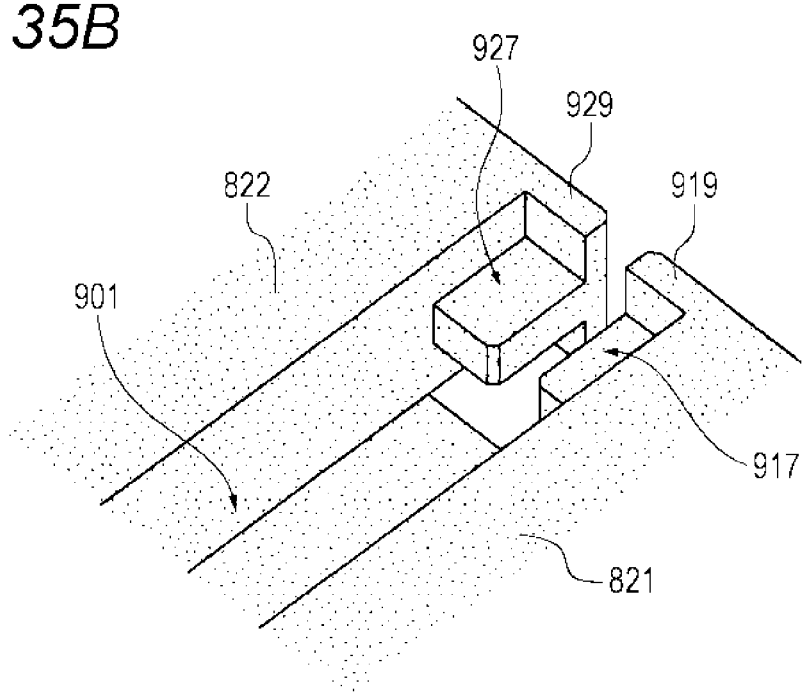
FIG. 35B is an enlarged view of a G2 portion of FIG. 34.
Figure 36:
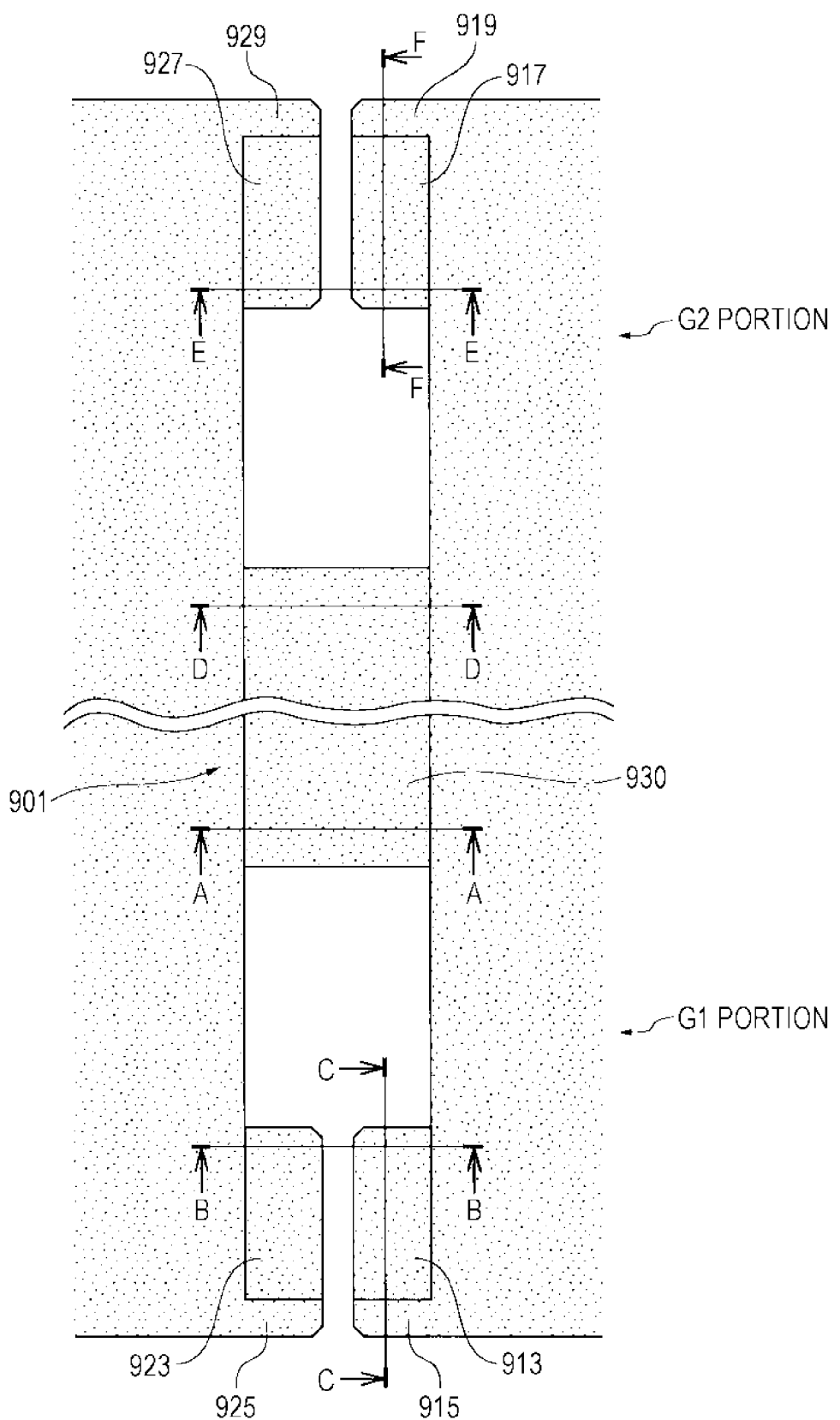
FIG. 36 is a plan view of the G1 portion and the G2 portion of the foam of the fourth embodiment.
Figures 37A, 37B, 37C:
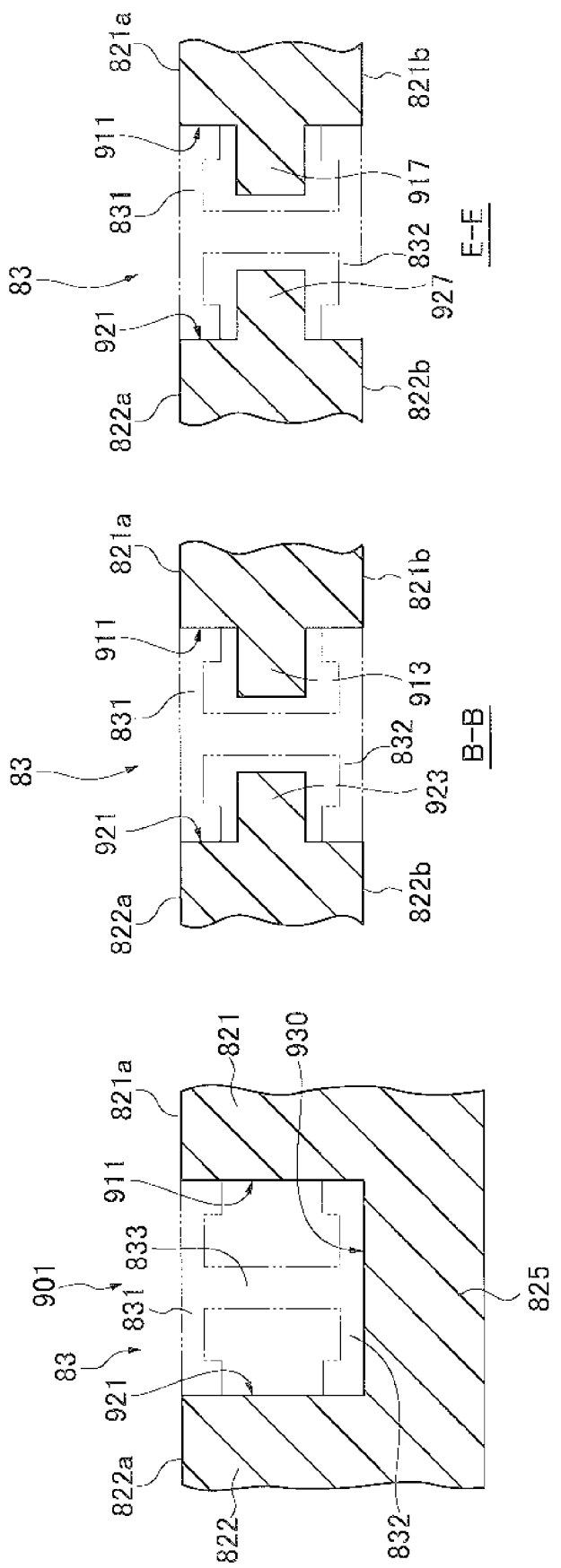
FIG. 37A is a cross-sectional view taken along a line A-A or a line D-D shown in FIG. 36.
FIG. 37B is a cross-sectional view taken along a line B-B shown in FIG. 36.
FIG. 37C is a cross-sectional view taken along a line E-E shown in FIG. 36.
Figure 38A:
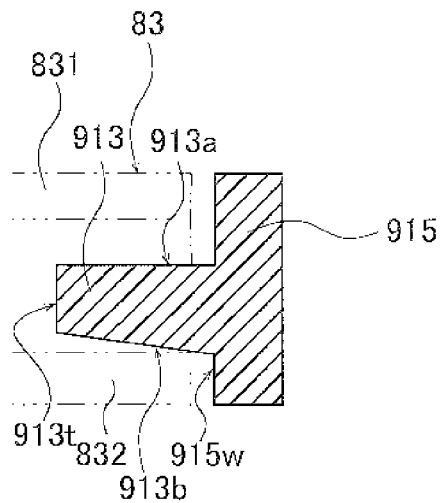
FIG. 38A is a cross-sectional view taken along a line C-C shown in FIG. 36.
Figure 38B:
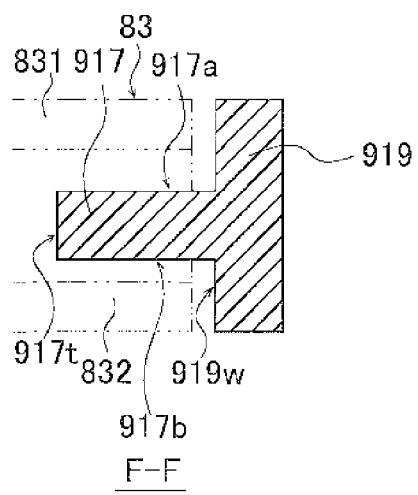
FIG. 38B is a cross-sectional view taken along a line F-F shown in FIG. 36.

FIG. 34 is a perspective view of the front side of the foam 82 of the present embodiment. FIGS. 35A and 35B are respectively enlarged views of a G1 portion and a G2 portion of FIG. 34. FIG. 36 is a plan view of the G1 portion and the G2 portion of the foam 82 of the present embodiment. FIG. 37A is a cross-sectional view taken along a line A-A or a line D-D shown in FIG. 36. FIGS. 37B and 37C are respectively cross-sectional views taken along a line B-B and a line E-E shown in FIG. 36. FIGS. 38A and 38B are respectively cross-sectional views taken along a line C-C and a line F-F shown in FIG. 36.

The foam 82 is molded, for example, by the bead method in-mold foam molding method. As an example of molding by the bead method in-mold foam molding method, see for example JP-A-2014-128938.

As shown in FIG. 34, linear accommodating portions 901, 902 are formed on the front surface of the foam 82 through from one end to the other end. In an example of the present embodiment, both of the accommodating portions 901, 902 have the same shape. The accommodating portion 901 is formed between the foamed portion 821 and the foamed portion 822. The accommodating portion 902 is formed between the foamed portion 822 and the foamed portion 823. Each accommodating portion is provided for disposing the reinforcing material 83 (H-shaped reinforcement) shown in FIG. 4 in the foam 82.

Referring to FIGS. 35A, 35B and 36, in the foam 82, fitting portions 913 and 923 fitted with one end in the longitudinal direction of the reinforcing material 83 and fitting portions 917 and 927 fitted with the other end in the longitudinal direction of the reinforcing material 83 are formed in the G1 portion and the G2 portion near both ends of the accommodating portion 901. Stoppers 915, 925, 919 and 929 are formed in the G1 portion and the G2 portion of the foam 82 in order to reliably inhibit the reinforcing material 83 from falling off from the foam 82 in its longitudinal direction.

In FIG. 36, a bottom face 930 of the accommodating portion 901 is a surface on which the reinforcing material 83 is placed. The bottom face 930 is a surface which is in contact with the second plate-shaped portion 832 of the reinforcing material 83.

A more detailed description will be made below with reference to the cross-sectional views of FIGS. 37A to 37C and 38A and 38B. In FIGS. 37A to 37C and 38A and B, the position of the reinforcing material 83 when the reinforcing material 83 is incorporated in the foam 82 is indicated by imaginary lines. In the following description, the accommodating portion 901 will be referred to. The accommodating portion 902 has the same shape as the accommodating portion 901.

As shown in an A-A cross-section and a D-D cross-section of FIG. 37A, the accommodating portion 901 of the foam 82 is formed with side surfaces 911 and 921 facing each other and a bottom face 930. The side surface 911 is interposed between the bottom face 930 and a front surface 821*a* of the foamed portion 821. The side surface 921 is interposed between the bottom face 930 and a front surface 822*a* of the foamed portion 822.

In a state where the reinforcing material 83 is fitted with the foam 82, the second plate-shaped portion 832 of the reinforcing material 83 is in contact with the bottom face 930. Both side surfaces of the first plate-shaped portion 831 and the second plate-shaped portion 832 of the reinforcing material 83 are in contact with the side surfaces 911 and 921.

In a state where the reinforcing material 83 is in contact with the bottom face 930 of the accommodating portion 901, a depth of the accommodating portion 901 is preferably set such that the front surfaces 821*a* and 822*a* of the foamed portions 821 and 822 and a top surface of the first plate-shaped portion 831 of the reinforcing material 83 are substantially flush with each other. However, the depth of the accommodating portion 901 is not limited thereto.

As shown in FIG. 35A and a cross-section B-B of FIG. 37B, the fitting portions 913 and 923 are formed to project from the side surfaces 911 and 921 of the accommodating portion 901 to directions opposite to each other. The fitting portions 913 and 923 are located in a gap between the first plate-shaped portion 831 and the second plate-shaped portion 832 of the reinforcing material 83, and thus they are fitted with one end in the longitudinal direction of the reinforcing material 83.

As shown in FIG. 35B and a cross-section E-E of FIG. 37C, the fitting portions 917 and 927 are formed to project from the side surfaces 911 and 921 of the accommodating portion 901 to the directions opposite to each other. The fitting portions 917 and 927 are located in the gap between the first plate-shaped portion 831 and the second plate-shaped portion 832 of the reinforcing material 83, and thus they are fitted with the other end in the longitudinal direction of the reinforcing material 83.

As shown in a cross-section C-C of FIG. 38A, the fitting portion 913 is a plate-shaped portion formed in the longitudinal direction of the reinforcing material 83. The fitting portion 913 projects from one end of the reinforcing material 83 into the gap between the first plate-shaped portion 831 and the second plate-shaped portion 832 of the reinforcing material 83, to be fitted with the reinforcing material 83.

A front surface 913*a* of the fitting portion 913 is substantially parallel to the longitudinal direction of the reinforcing material 83, that is, substantially parallel to the top surface of the first plate-shaped portion 831 and the bottom face of the second plate-shaped portion 832. A back surface 913*b* of the fitting portion 913 is inclined from a tip end surface 913*t* of the portion projecting into the gap of the reinforcing material 83 toward the one end of the reinforcing material 83. Therefore, a thickness of the fitting portion 913 in a direction in which the first plate-shaped portion 831 and the second plate-shaped portion 832 are facing each other is increased, from the tip end surface 913*t* of the portion projecting into the gap of the reinforcing material 83 to the one end of the reinforcing material 83.

As shown in a cross-section F-F of FIG. 38B, the fitting portion 917 is a plate-shaped portion formed in the longitudinal direction of the reinforcing material 83. The fitting portion 917 projects from the one end of the reinforcing material 83 into the gap between the first plate-shaped portion 831 and the second plate-shaped portion 832 of the reinforcing material 83, to be fitted with the reinforcing material 83.

The front surface 917a and the back surface 917b of the fitting portion 917 are substantially parallel to the longitudinal direction of the reinforcing material 83, that is, substantially parallel to the top surface of the first plate-shaped portion 831 and the bottom face of the second plate-shaped portion 832. That is, the fitting portion 917 is formed so that its thickness is substantially constant in a direction from the tip end surface 917t of the portion projecting into the gap of the reinforcing material 83 toward the one end of the reinforcing material 83.

As shown in the cross-section C-C of FIG. 38A, the stopper 915 has a wall surface 915w facing one end of the reinforcing material 83 at an end opposite to the tip end surface 913t of the fitting portion 913. Although not shown, the stopper 925 also has a similar wall surface.

As shown in the cross-section F-F of FIG. 38B, the stopper 919 has a wall surface 919w facing the one end of the reinforcing material 83 at the end opposite to the tip end surface 917t of the fitting portion 917. Although not shown, the stopper 929 also has a similar wall surface.

A cross-sectional shape of the fitting portion 923 and the stopper 925 is the same as the cross-section taken along the line C-C in FIG. 38A. A cross-sectional shape of the fitting portion 927 and the stopper 929 is the same as the cross-section taken along the line F-F FIG. 38B.

(4-2-2) Assembly of Interior Material 810

Next, a method of assembling the interior material 810 based on the above-described foam 82 will be described with reference to FIGS. 39A and 39B.

Figure 39A:
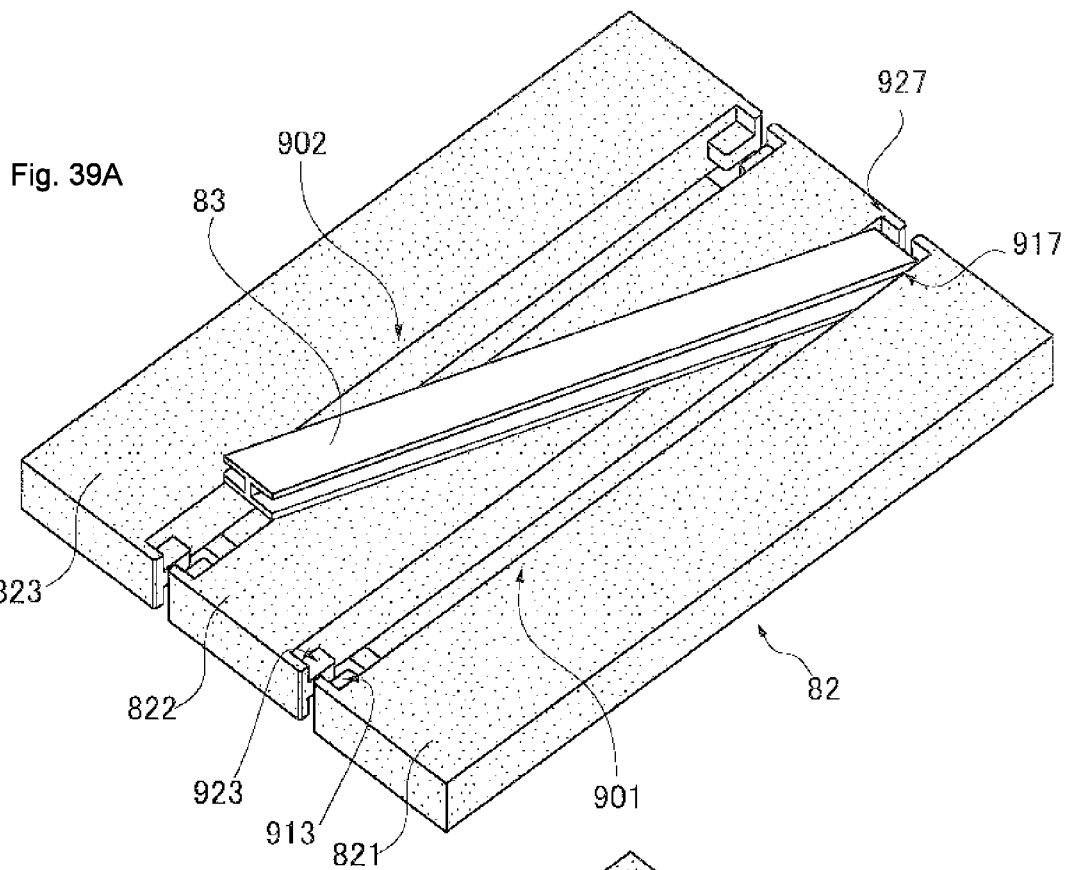
FIGS. 39A and 39B are views for explaining a method of assembling the interior material of the fourth embodiment.
Figure 39B:
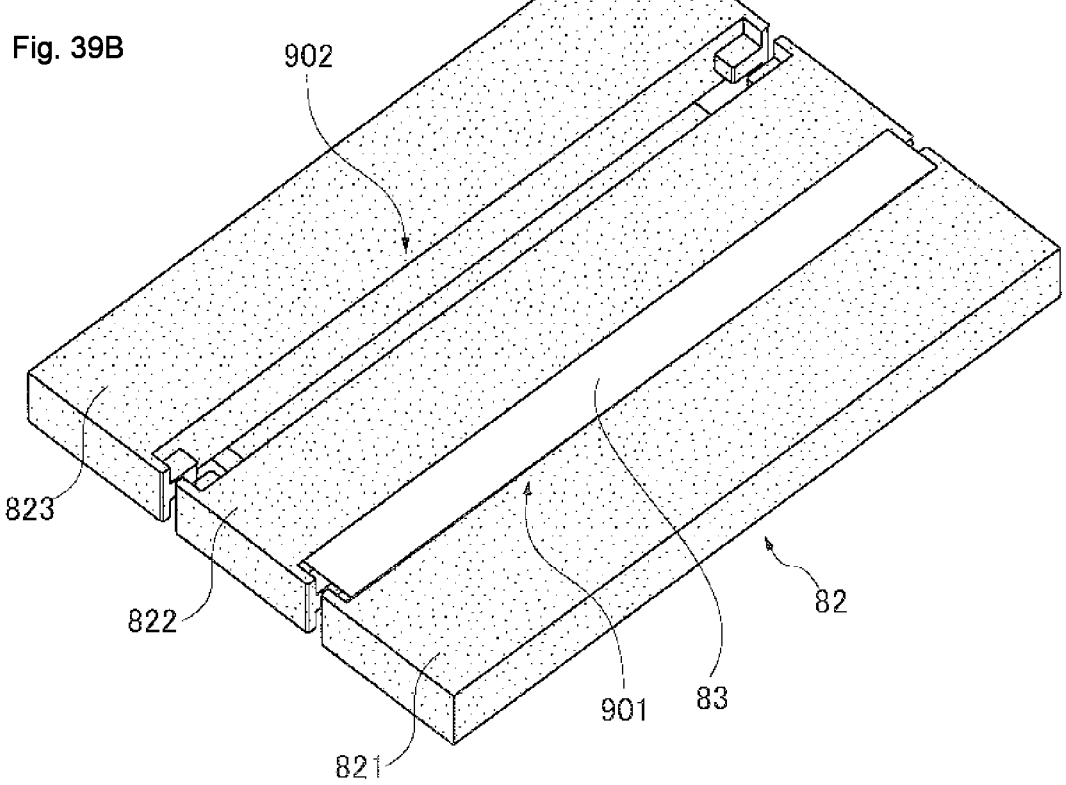

FIGS. 39A and 39B are views for explaining a method of assembling the interior material 810 of the present embodiment. FIGS. 39A and 39B show a procedure for fitting the reinforcing material 83 into the foam 82 in this order.

To assemble the interior material 810, the foam 82 is molded first. Thereafter, the foam 82 is disposed so that the front surface of the foam 82 faces upward.

Then, as shown in FIG. 39A, the reinforcing material 83 is inclined so that one end of the reinforcing material 83 is obliquely downward. In this way, the reinforcing material 83 is pressed against the foam 82 so that the fitting portions 917 and 927 of the foam 82 are inserted into the gap between the first plate-shaped portion 831 and the second plate-shaped portion 832 of the reinforcing material 83 at the one end of the reinforcing material 83. Thus, the one end of the reinforcing material 83 is fitted into the fitting portions 917 and 927 of the foam 82.

Next, as shown in FIG. 39B, at the other end not fitted of the reinforcing material 83, the reinforcing material 83 is positioned so that the fitting portions 913 and 923 of the foam 82 are inserted into a gap between the first plate-shaped portion 831 and the second plate-shaped portion 832 of the reinforcing material 83. Thus, the other end of the reinforcing material 83 is fitted with the fitting portions 913 and 923 of the foam 82.

As shown in the cross-section C-C of FIG. 38A, in a state where the other end of the reinforcing material 83 is fitted into the fitting portions 913 and 923 of the foam 82, the fitting portions 913 and 923 are in a state of projecting into the gap between the first plate-shaped portion 831 and the second plate-shaped portion 832 of the reinforcing material 83.

At this time, the thickness of the fitting portion 913 in the direction in which the first plate-shaped portion 831 and the second plate-shaped portion 832 are facing each other is increased, from the tip end surface 913t of the portion projecting into the gap between the first plate-shaped portion 831 and the second plate-shaped portion 832 of the reinforcing material 83 to the one end of the reinforcing material 83. The same applies to the fitting portion 923. Therefore, the second plate-shaped portion 832 of the reinforcing material 83 is sandwiched between the back surface 913b of the fitting portion 913 and the bottom face 930 (see FIG. 37A) of the accommodating portion 901, and between the back surface (not shown) of the fitting portion 923 and the bottom face 930 of the accommodating portion 901. From this fact, the reinforcing material 83 is positioned in its longitudinal direction.

Furthermore, in the foam 82 of the present embodiment, the stoppers 915, 925, 919 and 929 reliably inhibit the reinforcing material 83 from falling off from the foam 82. In particular, as shown in the cross-section F-F of FIG. 38B, the fitting portion 917 does not sandwich the second plate-shaped portion 832 with the bottom face 930. However, even when the reinforcing material 83 moves toward the fitting portion 917, the reinforcing material 83 does not fall off from the foam 82 by the stopper 919.

FIGS. 39A and 39B shows a case where the reinforcing material 83 is disposed in the accommodating portion 901. Similarly, the reinforcing material 83 is also disposed on the accommodating portion 902. As a result, the two reinforcing materials 83 are fitted into the foam 82. In this way, the interior material 810 is completed.

In the above-described method of assembling the interior material 810, the fitting portions 917 and 927 of the foam 82 are first inserted into the one end of the reinforcing material 83. Thereafter, the fitting portions 913 and 923 of the foam member 82 are inserted into the other end of the reinforcing material 83. However, this order may be interchanged.

A fitting method of the reinforcing material 83 of the present embodiment is suitable when the foamed portion 825 (see FIG. 2) raised on the back surface 82b of the foam 82 is formed. That is, when there is a raised portion on at least one of the front surface and the back surface of the foam, the thickness of the raised portion is relatively large. Therefore, if a method of splitting the foam at the raised portion and then fitting the reinforcing material is adopted, the raised portion having a large thickness is divided into two portions. Therefore, it is inevitable that the stiffness of the raised portion is locally reduced. In contrast, in the present embodiment, the reinforcing material 83 can be fitted without splitting the foam 82 at the foamed portion 825 which is the raised portion. Therefore, it is possible to avoid a local stiffness reduction in the foamed portion 825.

(4-3) Method of Molding Resin Panel 81

Figure 40:
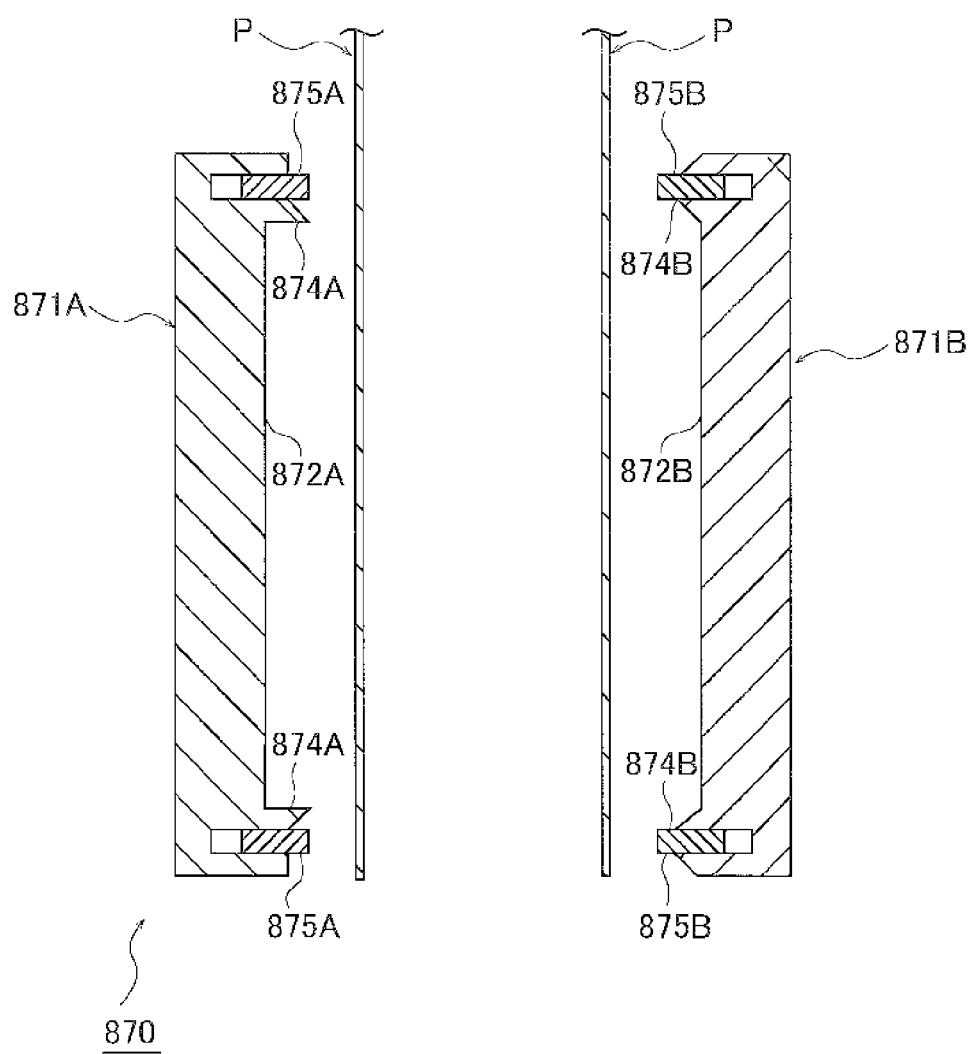
FIG. 40 is a view for explaining a step of molding a skin material of the resin panel of the fourth embodiment.
Figure 41:
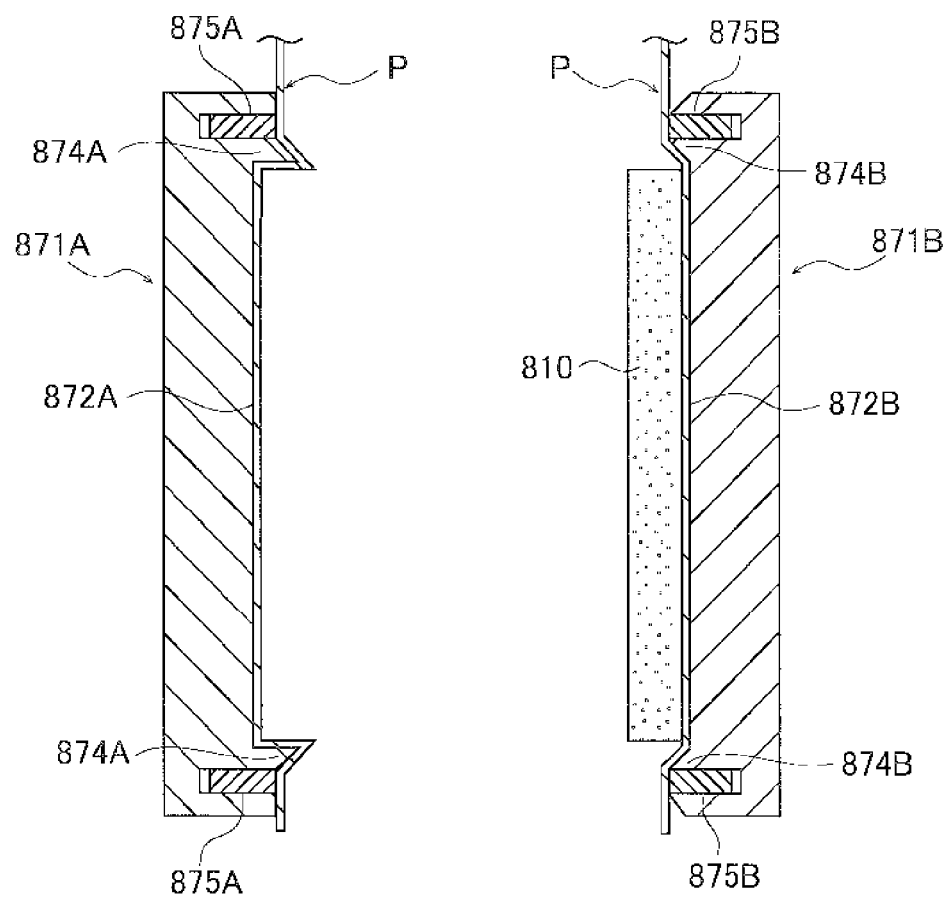
FIG. 41 is a view for explaining the step of molding the skin material of the resin panel of the fourth embodiment.

Next, referring to FIGS. 40 and 41, a method of molding the resin panel 81 including the interior material 810 covered with the skin material sheet S using the mold will be described. FIGS. 40 and 41 are views for explaining steps of molding the skin material sheet S of the resin panel 81 of the present embodiment.

Referring to FIG. 40, a clamping machine 870 has a pair of split mold blocks 871A and 871B to be moved between the open position and the closed position in the direction substantially perpendicular to the molten resin sheets P and P extruded vertically downward from the extruding machine (not shown). The pair of split mold blocks 871A and 871B is arranged in a state where the corresponding forming surfaces 872A and 872B face each other. The forming surface 872A has a shape corresponding to the front surface and the back surface of the foam 82.

Pinch-off parts 874A and 874B are respectively formed near the upper and lower ends of the forming surfaces 872A and 872B respectively corresponding to the pair of split mold blocks 871A and 871B. The pinch-off parts 874A and 874B are respectively annularly formed around the forming surfaces 872A and 872B, and project toward the split mold blocks 871B and 871A facing each other. Thus, when clamping the pair of split mold blocks 871A and 871B, the apex portions of the respective pinch-off parts 874A and 874B are brought into contact with each other so that the parting lines are formed on the peripheral edges of the molten resin sheets P and P.

In the pair of split mold blocks 871A and 871B, sliding portions 875A and 875B are provided so as to project from the forming surfaces 872A and 872B around the forming surfaces 872A and 872B. The sliding portions 875A and 875B are provided so that their end surfaces are brought into contact with the molten resin sheets P and P in a state of projecting from the forming surfaces 872A and 872B, and thus an enclosed space is formed between the molten resin sheets P and P and the forming surfaces 872A and 872B of the pair of split mold blocks 871A and 871B.

The vacuum chamber (not shown) is incorporated in the pair of split mold blocks 871A and 871B. The vacuum chamber is connected to a vacuum pump and a vacuum tank (none of which are shown). A communication path (not shown) for vacuum suction is provided between the vacuum chamber and the forming surfaces 872A and 872B.

The pair of split mold blocks 871A and 871B is driven by a mold driving device (not shown) so as to be movable between the open position and the closed position. In the open position, two continuous molten resin sheets P and P can be disposed with a space from each other between the pair of split mold blocks 871A and 871B. The two molten resin sheets P and P is the skin material sheet S in the resin panel 81 after molding. In the closed position, the pinch-off parts 874A and 874B of the pair of split mold blocks 871A and 871B are in contact with each other.

Next, a method of molding the resin panel 81 will be described.

First, as shown in FIG. 40, the molten resin sheets P and P are extruded vertically downward from the extruding machine and supplied to between the forming surfaces 872A and 872B of the pair of split mold blocks 871A and 871B. At this point, the pair of split mold blocks 871A and 871B is in the open position.

Next, the sliding portions 875A and 875B around the forming surfaces 872A and 872B are projected, so that their end surfaces are brought into contact with the molten resin sheets P and P. Thus, the enclosed space is formed between the molten resin sheets P and P and the forming surfaces 872A and 872B of the pair of split mold blocks 871A and 871B. Then, air in the enclosed space is sucked through the communication path provided between the vacuum chamber and the forming surfaces 872A and 872B. By this suction, the two molten resin sheets P and P are respectively pressed against the forming surfaces 872A and 872B of the pair of split mold blocks 871A and 871B. As a result, as shown in FIG. 41, the two molten resin sheets P and P are shaped (formed) into a shape along the forming surfaces 872A and 872B, that is, a substantially outer shape of the resin panel 81.

Next, using the manipulator (not shown), the interior material 810 assembled as described above is positioned between the pair of split mold blocks 871A and 871B. Then, as shown in FIG. 41, the interior material 810 is inserted from the side so as to be pressed against one of the split mold blocks (the split mold block 871B in FIG. 41). Thus, the interior material 810 is welded to one molten resin sheet P.

At this time, as described above, the reinforcing material 83 is positioned in its longitudinal direction in the interior material 810. Therefore, even when the interior material 810 is disposed so that the longitudinal direction of the reinforcing material 83 is in the vertical direction, it is possible to inhibit the reinforcing material 83 from falling off from the interior material 810.

Thereafter, the pair of split mold blocks 871A and 871B is moved from the open position to the closed position, to be clamped. Thus, the interior material 810 which has been welded to the one molten resin sheet P (the right side in the drawing) is also welded to the other molten resin sheet P (the left side in the drawing). Further, the peripheral edge of the pair of molten resin sheets P and P is welded at the pinch-off parts 874A and 874B of the pair of split mold blocks 871A and 871B, and the parting lines PL are formed.

Finally, the pair of split mold blocks 871A and 871B is moved to the open position again to separate the molded resin panel 81 from the forming surfaces 872A and 872B. In this way, the burrs formed around the parting line PL are cut and removed by the cutter or the like. Thus, the resin panel 81 having a structure in which the interior material 810 is covered with the skin material sheet S is completed.

In the above-described method of molding the resin panel 81, a case where the molten resin sheet P is pressed against the forming surfaces 872A and 872B of the pair of split mold blocks 871A and 871B by suction has been described. However, the present invention is not limited thereto, and a fluid such as air may be blown onto the molten resin sheet P to press the molten resin sheet P against the forming surfaces 872A and 872B of the pair of split mold blocks 871A and 871B (blow molding).

The fourth embodiment of the present invention has been described in detail above. However, the resin panel and the foamed structure of the present invention are not limited to the above embodiment. Of course, various improvements or modifications can be made without departing from the scope of the present invention.

In the fitting portion 913 shown in the cross-section C-C of FIG. 38A, a case where the back surface 913b is inclined from the tip end surface 913t of the portion projecting into the gap between the first plate-shaped portion 831 and the second plate-shaped portion 832 of the reinforcing material 83 to the one end of the reinforcing material 83 has been exemplified. However, the present invention is not limited to this, and it is sufficient that the thickness of the fitting portion is increased from the tip end surface 913t of the portion projecting into the gap between the first plate-shaped portion 831 and the second plate-shaped portion 832 of the reinforcing material 83 to the one end of the reinforcing material 83. The inclined surface is not limited to the back surface 913b.

Figure 42A:
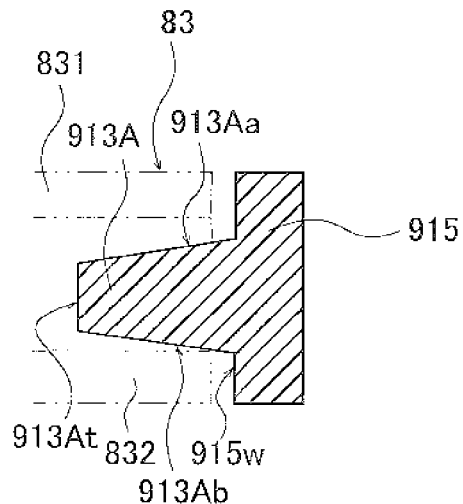
FIG. 42A is a cross-sectional view taken along the line C-C shown in FIG. 36 in a modification.
Figure 42B:
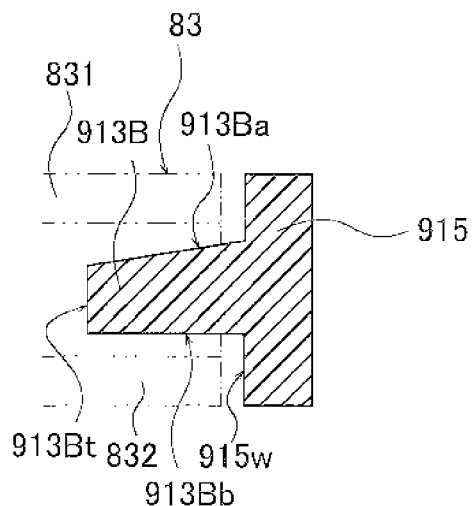
FIG. 42B is a cross-sectional view taken along the line C-C shown in FIG. 36 in another modification.

For example, like a fitting portion 913A of a modification shown in FIG. 42A, both of the front surface 913a and a back surface 913Ab may be inclined from the tip end surface 913At of the portion projecting into the gap between the first plate-shaped portion 831 and the second plate-shaped portion 832 of the reinforcing material 83 to the one end of the reinforcing material 83. Like a fitting portion 913B of a modification shown in FIG. 42B, the front surface 913Ba may be inclined from the tip end surface 913Bt of the portion projecting into the gap between the first plate-shaped portion 831 and the second plate-shaped portion 832 of the reinforcing material 83 to the one end of the reinforcing material 83.

In the above-described embodiment, as shown in FIGS. 35A, 35B, 38A and 38B, a case where the fitting portion and the stopper are connected has been described. However, the present invention is not limited to this, but the fitting portion and the stopper may be formed separately from each other. In that case, in FIGS. 35A and 35B, for example, a position where the fitting portions 913 and 923 project from the side surface of the accommodating portion 901 may be located closer to a center of the accommodating portion 901.

In the above-described embodiment, a case where the stoppers 915, 919, 925 and 929 are formed in the foam 82 has been described. However, at least one of the stoppers may not be provided. Or, no stopper may be provided. Even when the stopper is not provided, the reinforcing material 83 is positioned as long as the reinforcing material 83 is held by the fitting portion. Therefore, a possibility that the reinforcing material 83 falls off from the foam 82 is extremely low.

In the above-described embodiment, as described in FIGS. 35A, 35B and 36, a case where fitting portions are provided on both end sides of the accommodating portion 901 has been described. However, the present invention is not limited to this, and the fitting portion may be provided only on one end side of the accommodating portion 901. Even in that case, when the reinforcing material 83 is held by the fitting portion on the one end side of the accommodating portion 901, the reinforcing material 83 can be positioned.

In the above-described embodiment, the front surface and/or the back surface of one of the pair of fitting portions (for example, the fitting portion 913 and the fitting portion 923) facing each other across the bottom face 930 may be an inclined surface. Or, the front surface and/or the back surface of both of the fitting portions may be inclined surfaces.

Figure 43B:
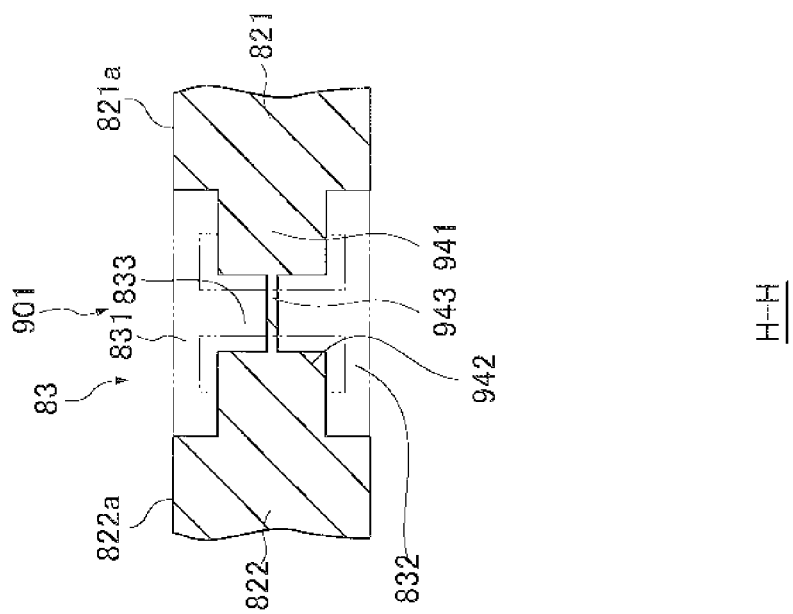
FIG. 43B is a cross-sectional view taken along a line H-H shown in FIG. 43A.
Figure 43A:
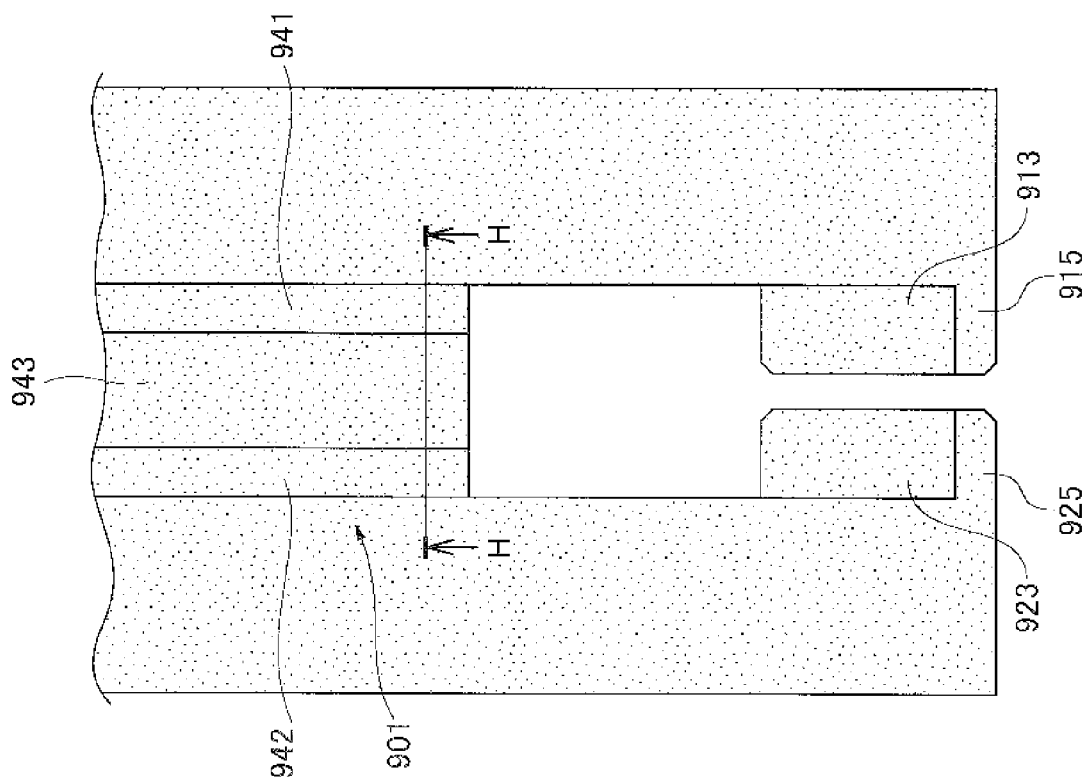
FIG. 43A is a view for explaining the foam according to the modification.

The reinforcing material 83 may be fitted into the foam 82 by inserting two foamed portions obtained by splitting the molded foam from one side and the other side of the reinforcing material 83. A foam according to such a modification is shown in FIGS. 43A and 43B. FIGS. 43A and 43B are views for explaining the foam according to the modification. FIG. 43A shows a part of a plan view of the foam, and FIG. 43B shows a cross-section H-H of FIG. 43A. In FIG. 43B, the reinforcing material 83 disposed after splitting is indicated by imaginary lines.

In the modification shown in FIGS. 43A and 43B, the accommodating portion 901 has a projecting portion 941 projecting from the end portion of the foamed portion 821, a projecting portion 942 projecting from the end portion of the foamed portion 822, and a thin portion 943 interposed between the projecting portion 941 and the projecting portion 942. After the foam is molded, the foam is split at the thin portion 943. The projecting portion 941 is inserted into one side of the reinforcing material 83 in the longitudinal direction of the reinforcing material 83. The projecting portion 942 is inserted into the other side of the reinforcing material 83 in the longitudinal direction of the reinforcing material 83. As a result, the reinforcing material 83 is fitted into the foam 82.

It goes without saying that the shape of the fitting portion is appropriately changed according to the cross-sectional shape of the reinforcing material. That is, when the cross-sectional shape of the reinforcing material is the C shape, the U shape, the square pipe shape, the circular pipe shape or the like, the shape of the fitting portion can be set so that the thickness of the fitting portion is larger or so that a surface pressure between the fitting portion and the reinforcing material is higher from the tip end surface of the portion located in the gap in the reinforcing material of the fitting portion to the one end of the reinforcing material.

The invention claimed is:
1. A resin panel comprising:
a core material;
a reinforcing material integrally having a first plate provided on a front surface of the core material, a second plate provided on a back surface of the core material, and a connecting plate connecting the first plate and the second plate, the reinforcing material being attached to the core material from a side wall surface forming an outer edge of the core material;
a skin material covering the core material and the reinforcing material; and
a fastened member which is attached to the skin material by a fastening member penetrating the skin material and the first plate or the second plate of the reinforcing material,
wherein the first plate and the second plate of the reinforcing material are arranged at an inward position with respect to a reference line defined by the side wall surface of the core material when the core material is viewed in a plan view.
2. The resin panel according to claim 1, wherein a plate thickness of a plate penetrated by the fastening member is less than that of the connecting plate, the penetrated plate being at least one of the first plate and the second plate of the reinforcing material.
3. The resin panel according to claim 1, wherein a recess for placing at least one of the first plate and the second plate of the reinforcing material is formed in the core material, so that the front surface of the core material and a front side plate surface of the first plate of the reinforcing material are flush with each other or the back surface of the core material and a back side plate surface of the second plate of the reinforcing material are flush with each other.
4. The resin panel according to claim 1, wherein
the core material is provided with a cutout formed inwardly from the outer edge thereof, and
the connecting plate of the reinforcing material is inserted into the cutout.

* * * * *